US012695500B1

(12) United States Patent
Torosyan et al.

(10) Patent No.: US 12,695,500 B1
(45) Date of Patent: Jul. 28, 2026

(54) SYSTEMS AND METHODS FOR DETECTING CELLULAR SERVICE ACCESS REQUESTS FROM TERRESTRIAL USER EQUIPMENT AT A SATELLITE

(71) Applicant: Space Exploration Technologies Corp., Hawthorne, CA (US)

(72) Inventors: Arthur Torosyan, Burbank, CA (US); Ramakrishna Akella, San Diego, CA (US); Martin S. McCormick, Studio City, CA (US)

(73) Assignee: Space Exploration Technologies Corp., Starbase, TX (US)

( * ) Notice: Subject to any disclaimer, the term of this patent is extended or adjusted under 35 U.S.C. 154(b) by 298 days.

(21) Appl. No.: 18/627,815

(22) Filed: Apr. 5, 2024

Related U.S. Application Data

(60) Provisional application No. 63/461,830, filed on Apr. 25, 2023.

(51) Int. Cl.
*H04B 7/185* (2006.01)

(52) U.S. Cl.
CPC ..... *H04B 7/18513* (2013.01); *H04B 7/18519* (2013.01)

(58) Field of Classification Search
CPC ........................ H04B 7/18513; H04B 7/18519
See application file for complete search history.

(56) References Cited

U.S. PATENT DOCUMENTS

| | | | |
|---|---|---|---|
| 10,439,706 B2 | 10/2019 | Michaels | |
| 11,546,726 B2 | 1/2023 | Speidel et al. | |
| 2018/0254825 A1 | 9/2018 | Speidel et al. | |
| 2022/0255619 A1 | 8/2022 | Yu et al. | |
| 2023/0179990 A1 | 6/2023 | Speidel et al. | |
| 2023/0247506 A1 | 8/2023 | Xu et al. | |
| 2023/0319891 A1* | 10/2023 | Yeo ................... H04W 56/0035 370/329 | |
| 2023/0354410 A1 | 11/2023 | Ye et al. | |

* cited by examiner

*Primary Examiner* — Curtis B Odom

(74) *Attorney, Agent, or Firm* — Polsinelli PC

(57) ABSTRACT

A satellite computer system is configured to detect access request signals from terrestrial user equipment (UE). The satellite includes an antenna configured to send and receive signals to the UE on a radio access network (RAN) via beams that define cells of the RAN. The satellite computer system can perform steps that can include one or more of: detecting a coarse time offset of one or more access signals embedded in a signal received within a PRACH slot; detecting information identifying a root of a Zadoff-Chu sequence underlying each of the one or more access signals; generating, based on the identified root, potential pairs of frequency and time offset values for the access signals; selecting, based on the detected coarse time offset, one of the potential pairs; and sending, to the UE based on the selected pair, an access response formatted according to the RAN.

20 Claims, 18 Drawing Sheets

1400

RECEIVING A SIGNAL IN THE PRACH SLOT, WHEREIN AN ORBITAL MOTION OF THE SATELLITE CAUSES ONE OR MORE ACCESS SIGNALS EMBEDDED IN THE RECEIVED SIGNAL TO INCLUDE A TIMING OFFSET VARIATION AND A FREQUENCY OFFSET VARIATION ACROSS ONE OR MORE LOCATIONS OF ONE OR MORE UE — 1402

SAMPLING THE RECEIVED SIGNAL TO OBTAIN SAMPLE VALUES — 1404

DETECTING, BASED ON THE SAMPLE VALUES, A COARSE TIME OFFSET OF THE ONE OR MORE ACCESS SIGNALS WITHIN THE PRACH SLOT — 1406

DETECTING, BASED ON THE SAMPLE VALUES, THE $u^{TH}$ ROOT OF THE ONE OR MORE ACCESS SIGNALS — 1408

GENERATING, FOR EACH OF THE ONE OR MORE ACCESS SIGNALS BASED ON THE DETECTED $u$TH ROOT, POTENTIAL PAIRS OF AN INTEGER NUMBER OF PERIODS FREQUENCY OFFSET AND A TIME OFFSET — 1410

SELECTING, BASED ON THE DETECTED COARSE TIME OFFSET, ONE OF THE POTENTIAL PAIRS AS CORRESPONDING TO AN ACTUAL FREQUENCY OFFSET AND AN ACTUAL TIME OFFSET — 1412

SENDING, TO THE UE BASED ON THE SELECTED PAIR FOR THE CORRESPONDING ACCESS SIGNAL, AN ACCESS RESPONSE FORMATTED ACCORDING TO THE RADIO ACCESS NETWORK — 1414

GATEWAY TERMINAL

CELL 302 WITH ~LOW NO. OF
ACTIVE USER TERMINALS 112

CELL 302 WITH INTERMEDIATE NO. OF
ACTIVE USER TERMINALS 112

CELL 302 WITH ~HIGH NO. OF
ACTIVE USER TERMINALS 112

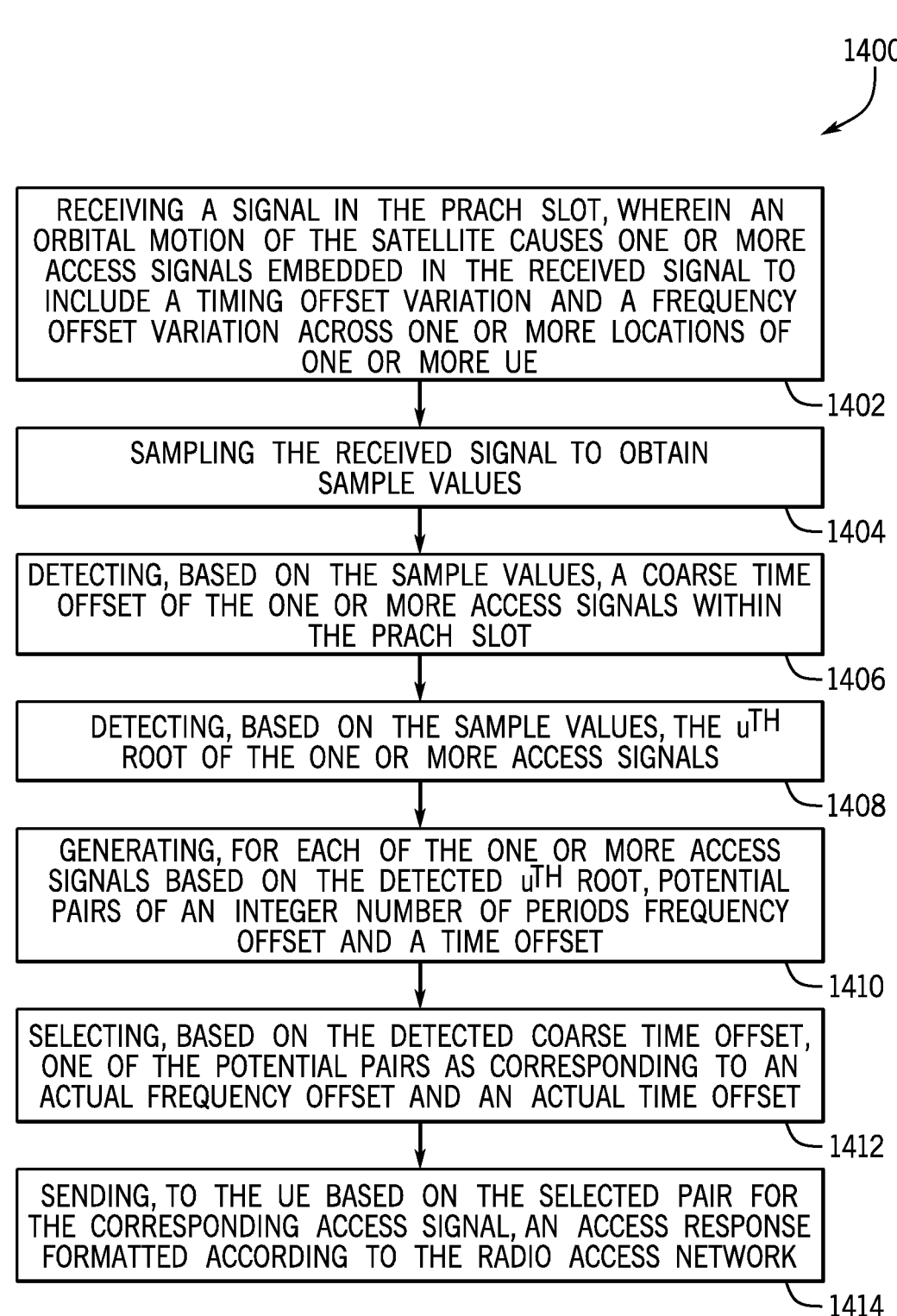

1400

RECEIVING A SIGNAL IN THE PRACH SLOT, WHEREIN AN ORBITAL MOTION OF THE SATELLITE CAUSES ONE OR MORE ACCESS SIGNALS EMBEDDED IN THE RECEIVED SIGNAL TO INCLUDE A TIMING OFFSET VARIATION AND A FREQUENCY OFFSET VARIATION ACROSS ONE OR MORE LOCATIONS OF ONE OR MORE UE

1402

SAMPLING THE RECEIVED SIGNAL TO OBTAIN SAMPLE VALUES

1404

DETECTING, BASED ON THE SAMPLE VALUES, A COARSE TIME OFFSET OF THE ONE OR MORE ACCESS SIGNALS WITHIN THE PRACH SLOT

1406

DETECTING, BASED ON THE SAMPLE VALUES, THE $u^{TH}$ ROOT OF THE ONE OR MORE ACCESS SIGNALS

1408

GENERATING, FOR EACH OF THE ONE OR MORE ACCESS SIGNALS BASED ON THE DETECTED $u^{TH}$ ROOT, POTENTIAL PAIRS OF AN INTEGER NUMBER OF PERIODS FREQUENCY OFFSET AND A TIME OFFSET

1410

SELECTING, BASED ON THE DETECTED COARSE TIME OFFSET, ONE OF THE POTENTIAL PAIRS AS CORRESPONDING TO AN ACTUAL FREQUENCY OFFSET AND AN ACTUAL TIME OFFSET

1412

SENDING, TO THE UE BASED ON THE SELECTED PAIR FOR THE CORRESPONDING ACCESS SIGNAL, AN ACCESS RESPONSE FORMATTED ACCORDING TO THE RADIO ACCESS NETWORK

SYSTEMS AND METHODS FOR DETECTING CELLULAR SERVICE ACCESS REQUESTS FROM TERRESTRIAL USER EQUIPMENT AT A SATELLITE

CROSS-REFERENCE TO RELATED APPLICATIONS

The present application claims the benefit of, and priority to, U.S. Provisional Patent Application No. 63/461,830 filed Apr. 25, 2023 entitled "SYSTEMS AND METHODS FOR DETECTING CELLULAR SERVICE ACCESS REQUESTS FROM TERRESTRIAL USER EQUIPMENT AT A SATELLITE", the contents of which are hereby incorporated by reference in their entirety.

TECHNICAL FIELD

The present technology pertains to using satellites to provide cellular telecommunications base station services to terrestrial user equipment, and more specifically to detecting, at a satellite, access requests from terrestrial user equipment.

BACKGROUND

Terrestrial cellular telecommunication networks typically rely on Earth-based cellular towers for wireless communication in designated radio frequency bands with user equipment (for example, mobile phones, cellular-enabled computer devices, and the like). The Earth-based cellular towers implement a radio access network (RAN) that links the user equipment to functionality for handling voice calls and SMS messages and providing Internet connectivity, for example. However, communications coverage by Earth-based cellular towers is limited or unreliable in some areas, particularly (but not only) in less developed regions of the world.

The use of satellites to provide cellular telecommunication links to terrestrial user equipment has been proposed. However, the accepted telecommunications standards implemented by off-the-shelf user equipment are designed for conditions that include stationary, terrestrial base station hardware, and thus the user equipment can operate successfully within only a limited range of signal latency and Doppler shift between the user equipment and the base station hardware. The relative position and velocity of satellites passing in range of the user equipment fall well outside this limited range of signal latency and Doppler shift. Accordingly, standard methods for detecting requests for service (for example, on random access channels) from terrestrial user equipment are insufficient at a base station implemented on a satellite.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure introduces a novel approach to detecting, at a satellite, access requests from terrestrial user equipment on a physical random access channel (PRACH). The PRACH detector disclosed herein makes use of special properties of the Zadoff-Chu sequence, which underlies the PRACH waveform in radio access network standards such as 4G LTE and 5G NR. In particular, the PRACH detector disclosed herein leverages properties of complex IQ values sampled from the signal received in the PRACH slot at the satellite to correct for the significant Doppler shifts and signal timing shifts in the PRACH slot signal caused by the relative motion of the satellite.

In accordance with an embodiment of the present disclosure, a satellite computer system for a satellite is provided. The satellite includes at least one antenna configured to send and receive signals to terrestrial user equipment (UE) on a radio access network (RAN) via a plurality of beams, each of the beams having a beam footprint that defines a cell of the RAN. The RAN defines a physical random access channel (PRACH) slot and an access signal format used by the UE to request an uplink allocation from a base station platform implemented on the satellite during the PRACH slot. The access signal format (1) is based on a Zadoff-Chu (ZC) sequence having a uth root, and (2) has at least one copy of a preamble having a preamble length. The satellite computer system includes at least one processor in communication with a memory, the memory storing computer-readable instructions that are executable to cause the at least one processor to perform steps that can include one or more of: receiving, via the at least one antenna, a signal in the PRACH slot, wherein an orbital motion of the satellite causes one or more access signals, transmitted in the access signal format by the one or more UE and embedded in the received signal, to include a timing offset variation and a frequency offset variation across one or more locations of the one or more UE; sampling the received signal to obtain sample values, wherein the sample values represent complex values; detecting, based on the sample values, a coarse time offset of the one or more access signals within the PRACH slot; detecting, based on the sample values, information identifying the uth root of each of the one or more access signals; generating, for each of the one or more access signals based on the identified uth root, potential pairs of a number of periods frequency offset $L_n$ and a time offset $T_n$; selecting, for each of the one or more access signals based on the detected coarse time offset, one of the potential pairs $(L_n, T_n)$ as corresponding to an actual frequency offset and an actual time offset; and sending, to the one or more UE based on the selected pair for the corresponding access signal, an access response formatted according to the RAN.

In accordance with another embodiment of the present disclosure, a method implemented by a satellite computer system on a satellite is provided. The satellite includes at least one antenna configured to send and receive signals to terrestrial user equipment (UE) on a radio access network (RAN) via a plurality of beams, with each of the beams having a beam footprint that defines a cell of the RAN. The RAN defines a physical random access channel (PRACH) slot and an access signal format used by the UE to request an uplink allocation from a base station platform implemented on the satellite during the PRACH slot. The access signal format (1) is based on a Zadoff-Chu (ZC) sequence having a uth root, and (2) has at least one copy of a preamble having a preamble length. The method can include steps including one or more of: receiving, via the at least one antenna, a signal in the PRACH slot, wherein an orbital motion of the satellite causes one or more access signals, transmitted in the access signal format by the one or more UE and embedded in the received signal, to include a timing offset variation and a frequency offset variation across one or more locations of the one or more UE; sampling the received signal to obtain sample values, wherein the sample values represent complex values; detecting, based on the sample values, a coarse time offset of the one or more access signals within the PRACH slot; detecting, based on the sample values, information identifying the uth root of each of the one or more access signals; generating, for each of the one or more access signals based on the identified uth root, potential pairs of a number of periods frequency offset $L_n$ and a time offset $T_n$; selecting, for each of the one or more access signals based on the detected coarse time offset, one of the potential pairs $(L_n, T_n)$ as corresponding to an actual frequency offset and an actual time offset; and sending, to the one or more UE based on the selected pair for the corresponding access signal, an access response formatted according to the RAN.

BRIEF DESCRIPTION OF THE DRAWINGS

In order to describe the manner in which the above-recited issues can be addressed, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 14 illustrates an example method in accordance with embodiments of the present disclosure.

DESCRIPTION OF EXAMPLE EMBODIMENTS

Figure 1A:
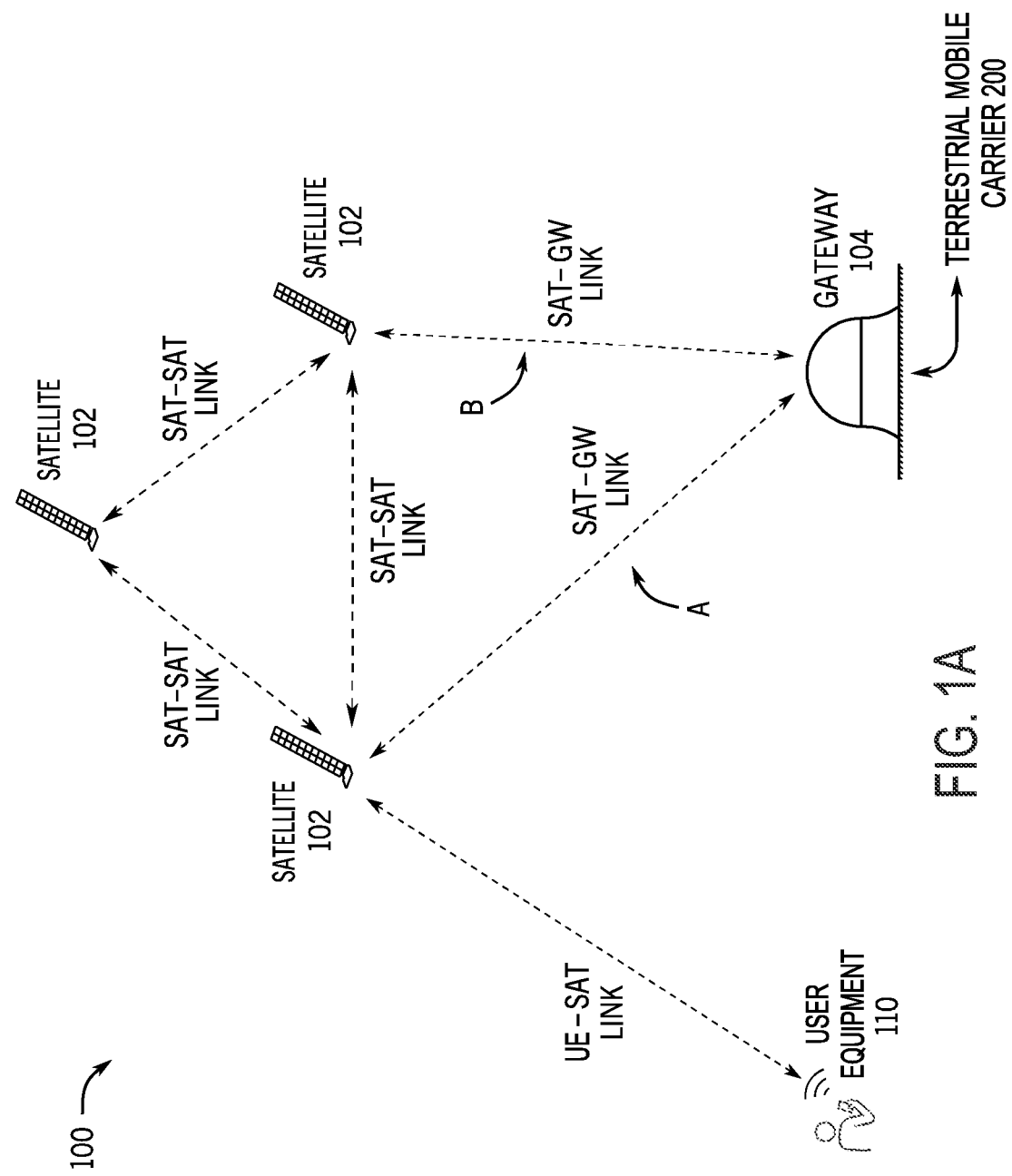
FIG. 1A illustrates a simplified schematic of an exemplary satellite telecommunications system in accordance with embodiments of the present disclosure.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment. Such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Elements of a Satellite Telecommunications System

Figure 1B:
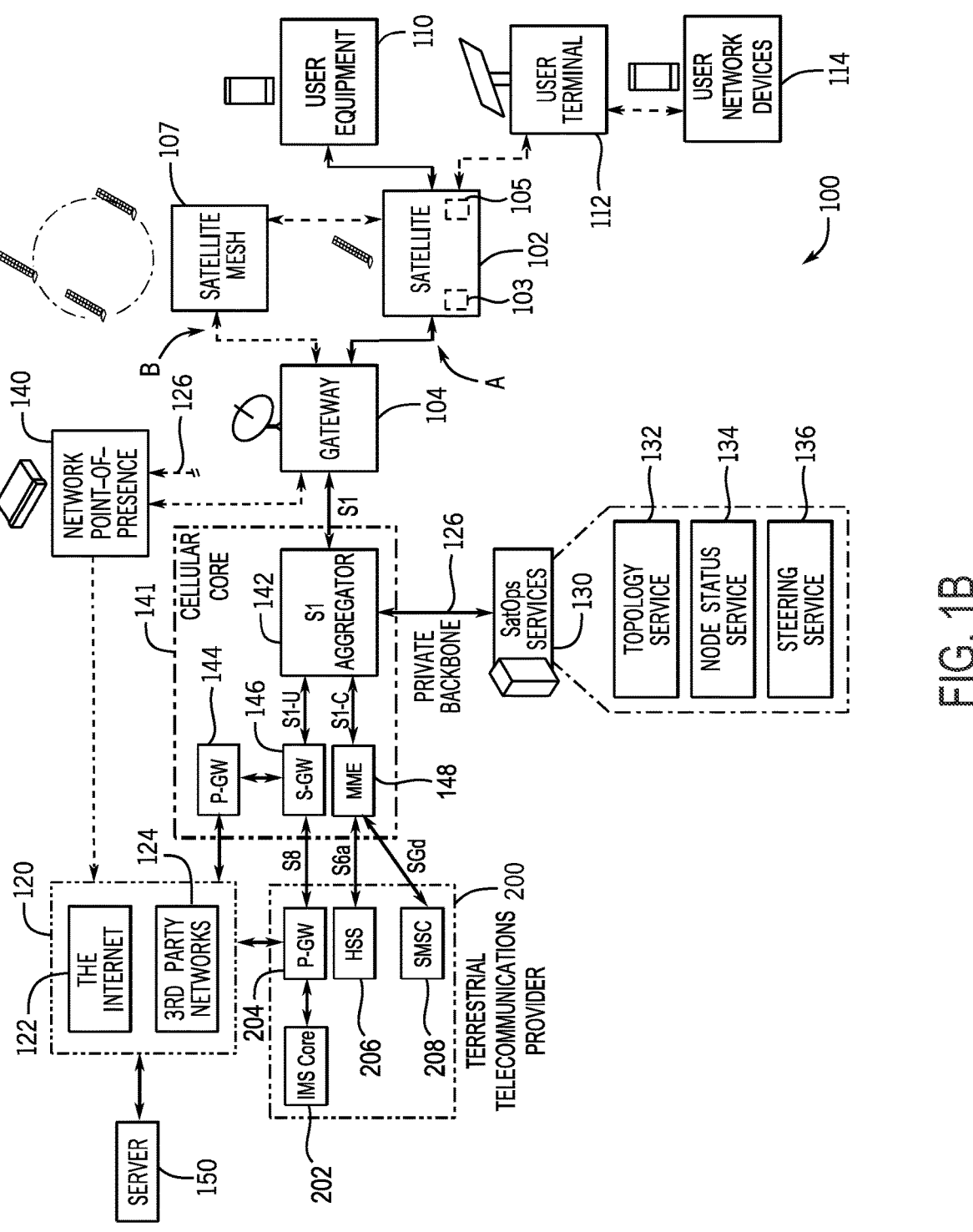
FIG. 1B illustrates a simplified block diagram of the satellite telecommunications system of FIG. 1A in accordance with embodiments of the present disclosure.

FIG. 1A is a simplified schematic, and FIG. 1B is a simplified block diagram, of elements of an exemplary satellite telecommunications system 100 in communication with user equipment (UE) 110. UE 110 may be any device that is capable of communicating with a standard terrestrial cellular phone tower and base station via a radio access network (RAN). For example, UE 110 may be an off-the-shelf mobile phone or other device implementing the 4G LTE communication standard. Alternatively, UE 110 may implement another standard compatible with terrestrial cellular service, such as but not limited to the 5G NR standard. For example, Earth-based or terrestrial UE 110 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a stationary object, such as a balloon, or a mobile object, such as an automobile or an airplane.

The satellite 102 provides a base station platform, in lieu of a conventional terrestrial cell phone tower and base station, for communicating with the UE 110. The base station platform provided by the satellite 102 includes both hardware and processing capability sufficient to implement the base station platform in a fashion that enables direct communication with the UE 110, with no hardware or software modifications required for standard-compliant UE 110. For example, in an embodiment in which the RAN is implemented using the 4G LTE standard, the satellite 102 hosts an Evolved Node B (eNodeB) platform.

UE 110 may establish a wireless UE-SAT link with one of the satellites 102 using a standard random access protocol of the RAN within a radio frequency (RF) band allocated for cellular communications. The cellular RF band may be allocated directly to the satellite telecommunications system 100 by a regulatory jurisdiction in which the UE 110 is located, or may be sub-allocated to the satellite telecommunications system 100 by the terrestrial telecommunications provider 200. For example, each of the satellites 102 may include one or more phased array antennas 105 (shown in FIG. 7A) for transmitting and receiving RF signals in the cellular RF band. In some embodiments, the phased array antenna 105 may include separate antenna arrays for transmitting and for receiving. Alternatively, the phased array antenna 105 may be implemented with transmitting and receiving performed by a same antenna array. In addition, the UE 110 may include a standard antenna (not shown) for off-the-shelf terrestrial user equipment, such as, for example, an internal Global System for Mobile Communication (GSM) antenna, for transmitting and receiving RF signals in the cellular RF band. However, other types of communication links are also contemplated for implementing the UE-SAT link.

The elements of the satellite telecommunications system 100 are capable of communication with each other via a mesh topology. The term "mesh topology" refers to the configuration of the elements as nodes in a mesh network. The various nodes in the mesh network coordinate with one another to efficiently route data in order to respond to requests for user data. As will be discussed in more detail herein, the configuration of the nodes in the mesh topology changes dynamically in satellite telecommunications system 100 to account for factors such as the motion of the satellites 102 relative to the Earth's surface and, in some cases, relative motion among the satellites 102. For example, as part of the network mesh topology of the satellite telecommunications system 100, certain satellites 102 may communicate directly with each other in a satellite mesh topology 107.

In addition to the satellites 102, the satellite telecommunications system 100 also includes a gateway terminal 104 on Earth. Each satellite 102 includes an onboard satellite computer system 103 programmed to manage communications with UE 110, gateway terminals 104, and other satellites 102, using one or more antennas (e.g., RF antennas and/or laser communication terminals) of the satellite. In particular, the satellite computer system 103 routes communications to and from UE 110, and to and from other nodes of the system, through the respective satellite 102 as part of the network mesh topology.

In some embodiments, in addition to providing cellular telecommunications service to UE 110, the satellite telecommunications system 100 may simultaneously provide Internet Protocol (IP) network connectivity to user terminals 112 that include a system-specific antenna. User terminals 112 may be installed at a house, a business, a vehicle (e.g., a land-, air-, or sea-based) vehicle, or another Earth-based location where a user desires to obtain communication access or Internet access via the satellites 102. An Earth-based user terminal 112 may be a mobile or non-mobile terminal connected to Earth or as a non-orbiting body positioned near Earth. For example, an Earth-based user terminal 112 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a stationary object, such as a balloon, or a mobile object, such as an automobile or an airplane.

For example, the user may connect one or more network devices 114 such as desktop computers, laptops, mobile devices, Internet of Things (IoT)-enabled devices, and the like (collectively, "customer equipment") locally to the user's user terminal 112 and obtain access via satellites 102 to the Internet. Although the local connection between the customer equipment and the user terminal is illustrated as a WiFi router 118 (or more broadly a WiFi mesh), other types of wired or wireless local communication are also contemplated.

The gateway terminal 104 serves as a satellite access gateway for the satellite(s) 102 to communicate with one or more terrestrial telecommunications providers 200. Each terrestrial telecommunications provider 200 may be an independent operator of one or more standard Earth-based telecommunications networks. In the exemplary embodiment, satellite telecommunications system 100 has no native users, but instead provides service solely through roaming relationships with the one or more terrestrial telecommunications providers 200. In other words, UE 110 are not registered and authorized directly for use on the satellite telecommunications system 100, but are registered and authorized for use on the terrestrial telecommunications provider 200 and may connect via the satellite telecommunications system 100 when connectivity to the Earth-based cellular towers associated with the terrestrial telecommunications provider 200 is unavailable or unreliable. However, embodiments are also contemplated in which the satellite telecommunications system 100 provides cellular services directly to native users, without interfacing through an independent terrestrial telecommunications provider 200.

The gateway terminal 104 may be connected to a cellular core 141 of the satellite telecommunications system 100. The cellular core 141 may be hosted at one or more terrestrial locations which may be connected to a terrestrial private network, referred to as a "private backbone" 126, of the satellite telecommunications system 100. In the exemplary embodiment, the private backbone 126 may be implemented on an Internet-based secure cloud platform, such as Microsoft Azure® or Amazon Web Services® (AWS) by way of non-limiting examples. However, other implementations of the private backbone 126 are also contemplated. In some embodiments, an instance of the cellular core 141 is co-located with each gateway terminal 104, and may be physically wired to the gateway terminal 104.

In the exemplary embodiment, the cellular core 141 hosts an aggregator node 142 that provides an interface between the satellites 102 and the core telecommunications functionality of the satellite telecommunications system 100. For example, in a 4G LTE implementation, the cellular core 141 includes Evolved Packet Core (EPC) functionality. More specifically, each satellite 102 functions as an eNodeB, and the aggregator node 142 provides an S1 interface between the eNodeBs on multiple satellites 102 and the EPC functionality. In the example, the cellular core 141 may include one or more of a Packet Data Network Gateway (P-GW) 144 of the EPC, a user plane interface S1-U to a Serving Gateway (S-GW) 146 of the EPC, and a control plane interface S1-C to a mobility management entity (MME) 148 of the EPC. It is contemplated that the cellular core 141 may provide additional or alternative core functionality, and the aggregator node 142 may provide other suitable interfaces to multiple satellites, either in a 4G LTE implementation or other RAN implementations.

In the exemplary embodiment, the P-GW 144 provides a point-of-presence on one or more ground-based IP networks 120, such as the Internet 122 or another ground-based IP network 124. For example, the "other" type of ground-based IP network 124 may represent a limited access third-party network, such as but not limited to a cloud computing data center. P-GW 144 may allocate IP addresses to the UE 110 and enable the cellular core 141 to access data from the ground-based IP network 120 (e.g., from one or more servers 150) and provide the data back through the satellite telecommunications system 100 to the UE 110.

In the exemplary embodiment, S-GW 146 provides an interface to a separate P-GW 204 of the terrestrial telecommunications provider 200. For example, in a 4G LTE implementation, the interface is an S8 interface. P-GW 204 of the terrestrial telecommunications provider 200 may cooperate with an IP Multimedia Subsystem (IMS) core 202 of the terrestrial telecommunications provider 200 to enable the terrestrial telecommunications provider 200 to independently provide UE 110 with access to the one or more ground-based IP networks 120 (such as the Internet 122). Each terrestrial telecommunications provider 200 may make arrangements with the satellite telecommunications system 100 as to whether, and in what circumstances, to provide IP network access to the UE 110 via P-GW 144 as opposed to via P-GW 204.

In the exemplary embodiment, MME 148 provides an interface to a Home Subscriber Server (HSS) 206 of the terrestrial telecommunications provider 200. For example, in a 4G LTE implementation, the interface is an S6a interface. The HSS 206 is a database including subscription information of UE 110 with the terrestrial telecommunications provider 200, as well as other information regarding UE 110.

In the exemplary embodiment, MME 148 also provides an interface to a Short Message Service Center (SMSC) 208 of the terrestrial telecommunications provider 200. For example, in a 4G LTE implementation, the interface is an SGd interface. The SMSC 208 routes text messages to and from UE 110.

The communication signal paths in the satellite telecommunications system 100 may also include a link between the user terminal 112 and one of the satellites 102 in the mesh, which may be referred to as a UT-SAT link. In the exemplary embodiment, the UT-SAT link is implemented as a Ku-band radio frequency (RF) link. For example, the user terminal 112 and each of the satellites 102 may include one or more phased array antennas for transmitting and receiving RF signals in the Ku band. In the exemplary embodiment, the phased array antenna used by the satellite 102 for communicating with the user terminals 112 is a separate antenna from the phased array antenna 105 used by the satellite 102 for communicating with the UE 110. However, other types of communication links are also contemplated for implementing the UT-SAT link, for example, other bands or other types of links including optical links. Moreover, while only one user terminal 112 and three satellites 102 are illustrated, satellite telecommunications system 100 may include millions of user terminals 112 and many thousands of satellites 102, and different ones of the user terminals 112 and satellites 102 may use different types of communication links to establish the UT-SAT link.

The illustrated communication signal paths in the satellite telecommunications system 100 include a link between the satellite 102, or one of the satellites 102 in the mesh, and the gateway terminal 104, which may be referred to as a SAT-GW link. In the exemplary embodiment, the SAT-GW link is implemented as a Ka-band radio frequency (RF) link. For example, the gateway terminal 104 and each of the satellites 102 may include a parabolic antenna for transmitting and receiving RF signals in the Ka band. However, other types of communication links are also contemplated for implementing the SAT-GW link. For example, the satellites 102 may also include laser communication terminals, as described below, and the gateway terminal 104 may also include one or more laser communication terminals for communication with the satellites 102 when atmospheric weather conditions are favorable for ground-to-space (and space-to-ground) laser transmission. Moreover, while only one gateway terminal 104 and three satellites 102 are illustrated, satellite telecommunications system 100 may include hundreds of gateway terminals 104 and many thousands of satellites 102, and different ones of the gateway terminals 104 and satellites 102 may use different types of communication links to establish the SAT-GW link.

The illustrated communication signal paths in the satellite telecommunications system 100 may further include links between respective pairs of the satellites 102 in the satellite mesh topology 107, which may be referred to as SAT-SAT links. In the exemplary embodiment, the SAT-SAT links are implemented as optical frequency links, or simply "optical" or "laser-based" links. For example, each of the satellites 102 also includes one or more laser communication terminals for transmitting and receiving laser-based (e.g., optical) signals. The laser communication terminals may be dynamically oriented with respect to the satellite 102 on which they are mounted to enable the laser communication terminals of each satellite 102 to track, and maintain the SAT-SAT links 106 with, other satellites 102 in relative motion with respect to the satellite 102. In the exemplary embodiment, each of the satellites 102 includes multiple laser communication terminals that may be independently oriented to enable each satellite to simultaneously maintain SAT-SAT links with multiple other satellites 102. However, other types of communication links are also contemplated for implementing the SAT-SAT links. Moreover, while only three satellites 102 are illustrated, satellite telecommunications system 100 may include many thousands of satellites 102, and different pairs of the satellites 102 may use different types of communication links to establish the respective SAT-SAT link between them. Additionally, one or more of the satellites 102 may not be configured to establish SAT-SAT links with other satellites 102.

In some instances, communications between the UE 110 and the cellular core 141 may be routed through a particular satellite 102 via a UE-SAT link, and through that same satellite directly to and from the gateway terminal 104 via a SAT-GW link, as shown in path A, without being routed through any other satellites 102. In other words, in some instances it is not necessary for the satellite 102 to utilize or maintain SAT-SAT links with other satellites, or even to be capable of establishing SAT-SAT links with other satellites, for the satellite telecommunications system 100 to route communications between the UE 110 and the gateway terminal 104. In other instances, communications between the cellular core 141 and the UE 110 having a UT-SAT link with the particular satellite 102 may be routed through a different satellite 102 that has established a SAT-GW link with the gateway terminal 104, as shown in path B, using one or more SAT-SAT links between the satellites 102 in the satellite mesh topology 107.

In the exemplary embodiment, satellite telecommunications system 100 also includes satellite operations ("SatOps") services 130 connected to the cellular core 141 from a centralized location. In the exemplary embodiment, the cellular core 141 is connected to the centralized SatOps services 130 via the private backbone 126. The SatOps services 130 may transmit various operational and management instructions to the cellular core 141 and the gateway terminal 104, as well as to the satellites 102 (via the gateway terminal). The SatOps services 130 may transmit various operational and management instructions to the cellular core 141.

The gateway terminal 104 may also be connected to a point-of-presence (PoP) 140 on the one or more ground-based IP networks 120. For example, a dedicated PoP 140 may be co-located with each gateway terminal 104, and may be physically wired to the gateway terminal 104. The PoP 140 may access data from the ground-based IP network 120 (e.g., from one or more servers 150) and provide the data back through the satellite telecommunications system 100 to the user terminal 112 and network device 114. In addition, the PoP 140 may be connected to the SatOps services 130 via the private backbone 126. The SatOps services may transmit various operational and management instructions to the gateway terminal 104, as well as to the satellites 102 (via the gateway terminal) and to the user terminals 112 (via the gateway terminal and the satellites).

In some embodiments, the PoP 140 co-located with each gateway terminal 104 may be implemented on a common hardware platform with the cellular core 141 co-located with that gateway terminal 104. However, separate hardware implementations of the PoP 140 and the cellular core 141 are also contemplated.

Satellite Constellation

For global coverage having reduced latency, satellite telecommunications system 100 employs non-geostationary satellites, and more specifically low-Earth orbit (LEO) satellites 102. Geostationary-Earth orbit (GEO) satellites orbit the equator with an orbital period of exactly one day at a high altitude, flying approximately 35,786 km above mean sea level. Therefore, GEO satellites remain in the same area of the sky as viewed from a specific location on Earth. In contrast, LEO satellites orbit at a much lower altitude (typically less than about 2,000 km above mean sea level), which reduces Earth-satellite signal travel time and therefore reduces communication latency relative to GEO satellites.

However, a stable low-Earth orbit necessarily corresponds to a much shorter orbital period as compared to GEO satellites. For example, at a particular altitude, a LEO satellite 102 may orbit the Earth, for example, once every 95 minutes. Further in the exemplary embodiment, the low-Earth orbits of satellites 102 are prograde. Therefore, LEO satellites do not remain stationary relative to a specific location on Earth, but rather advance generally eastward with respect to the Earth's surface. In addition, the lower orbital altitude means that, as compared to a GEO satellite, a LEO satellite has a more limited line of sight. For example, a LEO satellite in an equatorial orbit would not have a "line of sight" for direct communication with user terminals or gateway terminals at middle or upper latitudes on Earth, such as at locations L1 (corresponding to Los Angeles, California) and L2 (corresponding to Seattle, Washington) identified in FIG. 2.

Figure 2:
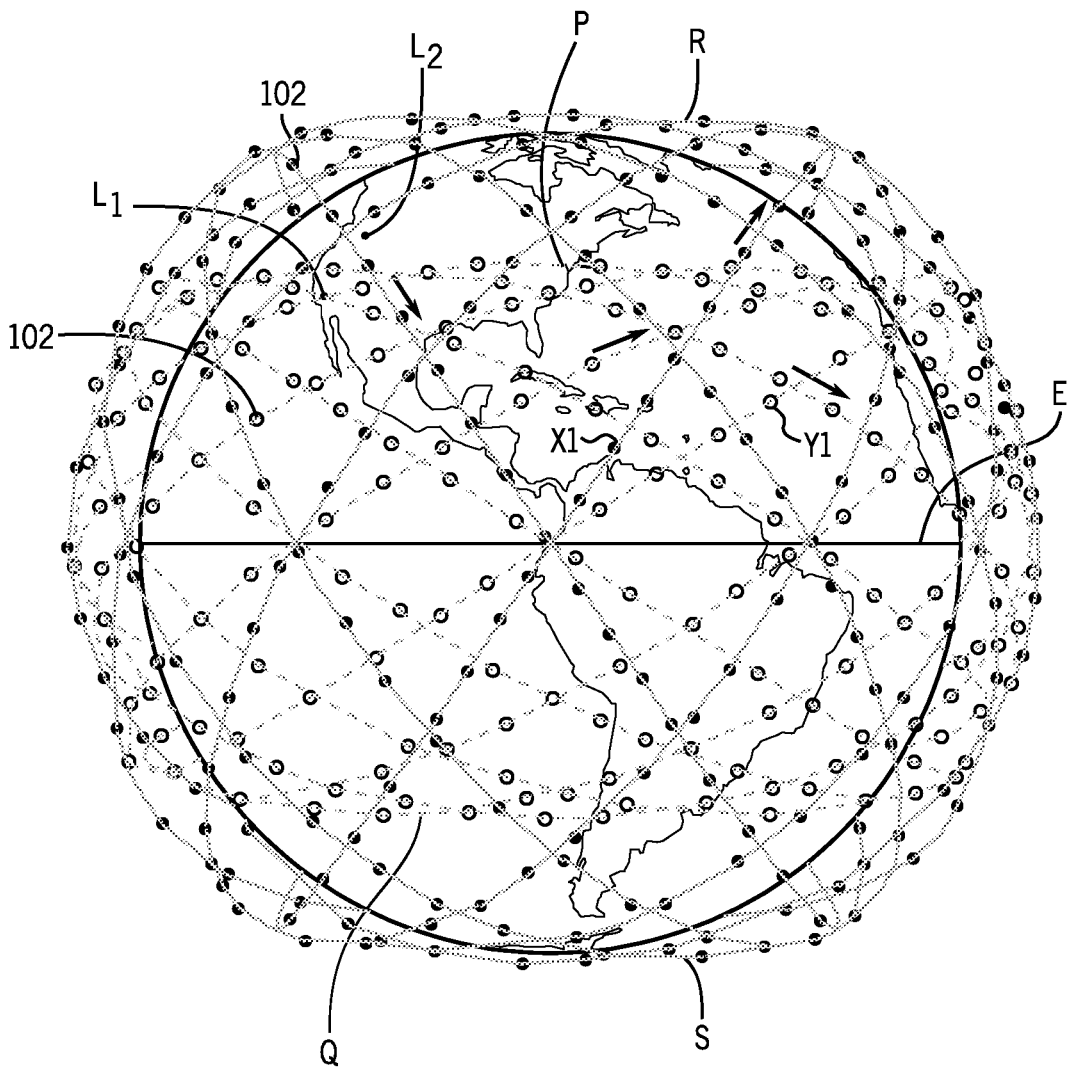
FIG. 2 is a schematic showing exemplary planar orbital patterns of a group of satellites, which may be used in the satellite telecommunications system of FIG. 1A, around a rotating Earth in accordance with embodiments of the present disclosure.

Accordingly, satellite telecommunications system 100 may include a large number, for example several thousand, satellites 102 arranged in a constellation of inclined orbits that ensures that at least some satellites 102 are always crossing the sky within range of user terminals 112 at any given Earth latitude and longitude. One non-limiting embodiment is illustrated in FIG. 2, which is a schematic showing an example of satellite planar orbital patterns X1 and Y1 of satellites 102 around a rotating Earth. In FIG. 2, the satellites in pattern X1 are represented by closed circles, and the satellites in pattern Y1 are represented by open circles, with arrows illustrating a general direction of travel of the satellites in each string. Each satellite string may include a number of equally spaced or substantially equally spaced satellites 102. More specifically, in a frame that rotates with the Earth, satellites 102 in the first string X1 are in discrete orbits sharing a first inclination, and satellites 102 in the second string Y1 are in discrete orbits sharing a second inclination different from the first inclination.

The angle of inclination of the satellites typically corresponds to an upper and lower limiting Earth latitude (indicated as P and Q for satellite string X1, and as R and S for satellite string Y1) of the orbital paths of the satellites. Although two strings at different inclinations are illustrated, other numbers of strings, such as one string or more than two strings, are also contemplated. Moreover, the illustrated angles of inclination are examples, and other angles of inclination for a single string or for multiple strings are also contemplated. Orbital patterns X1 and/or Y1 may be designed as repeating ground track systems, or may have a drifting pattern relative to the Earth's rotation rate.

Due to the inclination of the orbits, in addition to the general eastward motion of the satellites relative to the Earth's surface, each satellite 102 spends half its orbital period ascending from south to north over the Earth's surface, and the other half of its orbital period descending from north to south.

Ground Terminal Mesh Topology

Figure 3:
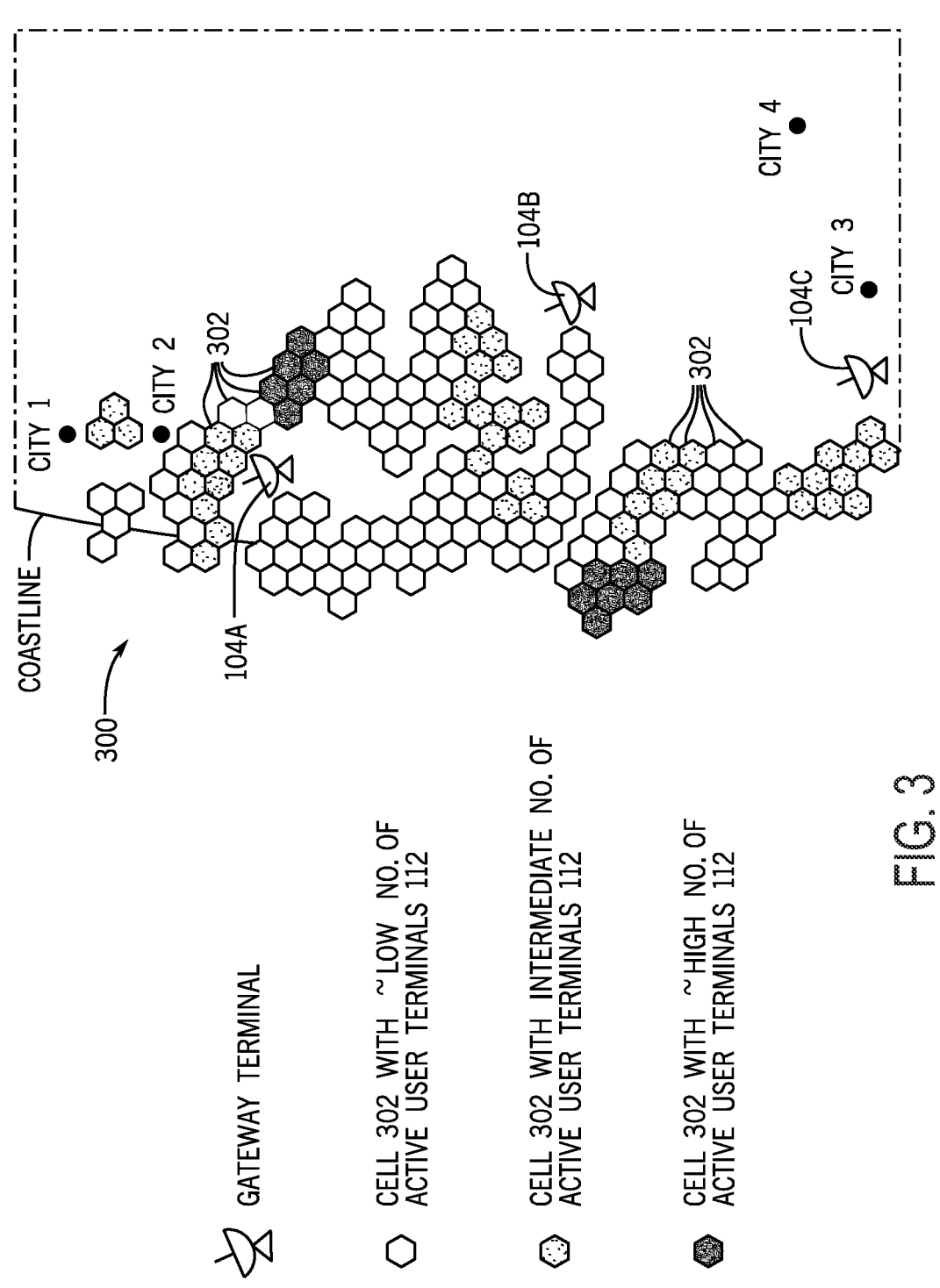
FIG. 3 illustrates a not-to-scale aerial view of an exemplary ground area that may be provided Internet service by the satellite telecommunications system of FIG. 1A, including user terminals grouped into Internet service cells, and gateway terminals.
Figure 4:
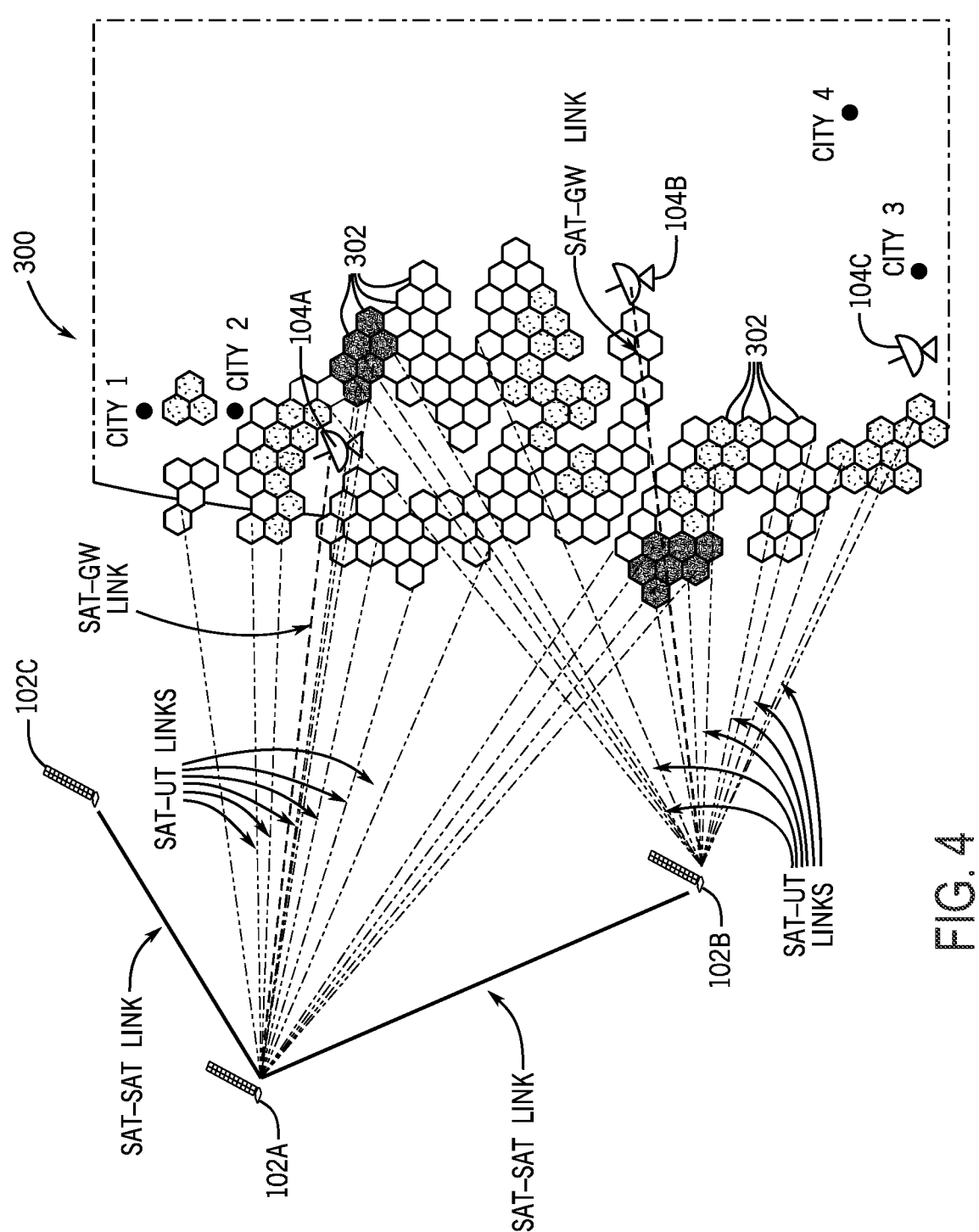
FIG. 4 illustrates a not-to-scale aerial view of the ground area shown in FIG. 3 being serviced by certain exemplary satellites of the group in communication with the user terminals and the gateway terminals.

FIG. 3 illustrates a not-to-scale aerial view of an exemplary ground area 300 that may be serviced by the satellite telecommunications system 100. More specifically, the ground area 300 may include a number of user terminals 112 that may transmit requests for user data to be serviced ultimately by, e.g., server 150 (shown in FIG. 1B) or other data sources on the ground-based IP network 120. The requests for user data, and the data responsive to the requests, may be routed to and from the user terminals via the PoP 140 through the network topology of the satellite telecommunications system 100. FIG. 4 illustrates a not-to-scale aerial view of requests from, and responses to, ground area 300 via the ground-based IP network 120 being serviced by example satellites 102A, 102B, and 102C of the group of satellites 102 in communication with example

Figure 5:
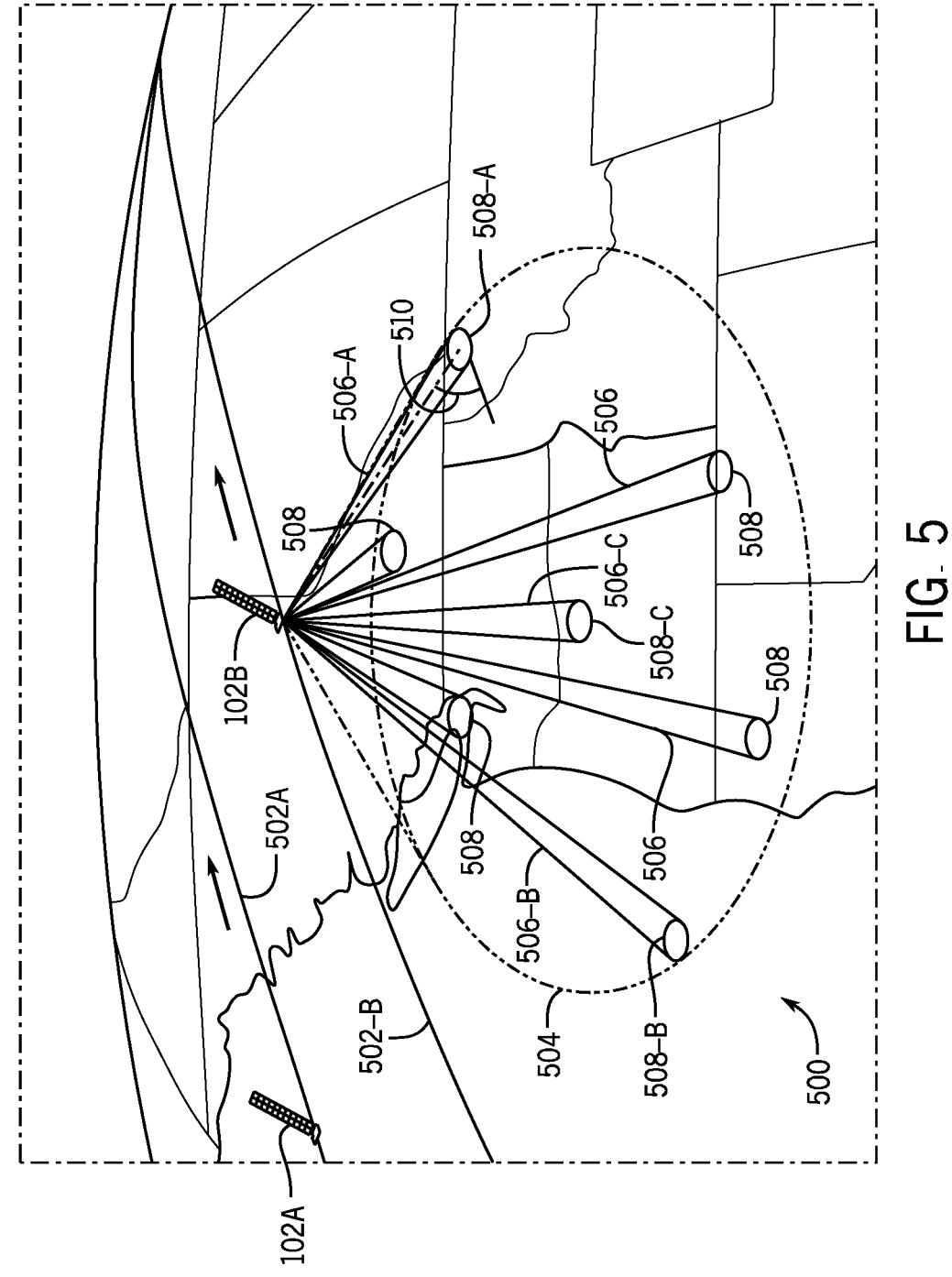
FIG. 5 illustrates a not-to-scale aerial view of an exemplary ground area that may be provided cellular communications service by the satellite telecommunications system of FIG. 1A, including beams and beam footprints of one of the satellites, in accordance with embodiments of the present disclosure.

12 gateway terminals 104A, 104B, and 104C. FIG. 5 illustrates a not-to-scale aerial view of an exemplary ground area 500 that may simultaneously be provided cellular communications service via the cellular core 141 of the satellite telecommunications system 100, including representative beams 506 and beam footprints 508 of one of the satellites 102. For example, access to the cellular core 141 may be provided to UE 110 via a first phased array antenna carried by at least a subset of the satellites 102, and access to the ground-based IP network 120 may be simultaneously provided to the user terminals 112 via a second phased array antenna carried by the satellites 102 that is physically separate from the first phased array antenna. However, embodiments are also contemplated in which the satellite telecommunications system 100 provides cellular communications service to UE 110 via the cellular core 141, but does not support separate access to the ground-based IP network 120 by user terminals 112 via the PoP 140.

The network topology of the satellite telecommunications system 100 may be analogized to a map of roads (travel routes) interconnecting a group of cities (nodes). For road travel between two cities separated by a significant distance, several different road routes may be available, each using roads that connect a different set of intermediate cities. One must know which intermediate cities are connected by roads, and how much traffic there will be on each road, in order to select the best travel route between the two cities.

Similarly, for data travel between two nodes in the satellite telecommunications system 100 (e.g., between a UE 110 and a terrestrial telecommunications provider 200, or between a user terminal 112 and a data source on the ground-based IP network 120 (shown in FIG. 1B)), several different network routes may be available, each using links that connect a different set of intermediate nodes (i.e., satellites and gateways). One must know which satellites are within the field of view of the UE 110 or user terminal 112, which satellites and gateways are connected by data links, and how much traffic there will be on each link, in order to select the best data route between the UE and the cellular core 141 or between the user terminal and the PoP 140. The topology of the satellite telecommunications system 100 is more complex than a road map, however, because the "roads" (data communication routing through the mesh topology) must be frequently reconfigured to accommodate the relative motion of the satellites 102 with respect to the UE 110 and the ground terminals 112 and 104, and in some cases the relative motion of the satellites 102 with respect to each other. In some embodiments, the reconfiguration must occur once or more per minute to accommodate the relative motion of the satellites 102.

With reference to FIGS. 3 and 4, in the exemplary embodiment, the ground area 300 includes user terminals 112 grouped into IP service cells 302 that are geographically fixed relative to the Earth. Although each IP service cell 302 is illustrated as a hexagonally shaped area, IP service cells 302 of any shape are contemplated. Moreover, although the IP service cells 302 are illustrated as having a particular size, other sizes of IP service cells 302 are contemplated. IP service cell size may be a function of multiple factors including, but not limited to, altitude of the satellite constellation, number of satellites in the satellite constellation, number of Earth-based user terminals, geography, etc. The ground area 300 also includes one or more gateway terminals 104.

In some embodiments, the user terminals 112 in each IP service cell 302 are further grouped into different network traffic "lanes" within the IP service cell 302. The lanes may be, but need not be, associated with particular geographical subregions within the IP service cell 302. Each combination of an IP service cell 302 and lane may be uniquely identified in the network addressing scheme utilized by the satellite telecommunications system 100, such that all user terminals 112 in a specific IP service cell and lane can be addressed as a group. For example, if the network addressing scheme is structured similar to Internet Protocol (IP) addressing, each IP service cell and lane may be associated with a unique network address prefix.

As noted above, a PoP 140 may be co-located with each gateway terminal 104. In some embodiments, each user terminal 112 is configured to address requests for user data to a particular PoP 140 on the ground-based IP network 120, which may be referred to as the "home" PoP for the user terminal. In some embodiments, the user terminals 112 are assigned to a "home" PoP 140 on a per-service cell or per-lane basis. The home PoP 140 may be assigned based on a physical proximity of the service cell to the gateway terminal 104 associated with the home PoP 140. For example, user terminals 112 in the IP service cells 302 near the top of FIG. 3 may be assigned to the PoP associated with the gateway terminal 104A as their home PoP, user terminals 112 in the IP service cells 302 near the middle of FIG. 3 may be assigned to the PoP associated with the gateway terminal 104B as their home PoP, and user terminals 112 in the IP service cells 302 near the bottom of FIG. 3 may be assigned to the PoP associated with the gateway terminal 104C as their home PoP. Alternatively, these home PoP assignments may only apply to user terminals 112 in a first lane of their respective IP service cells in FIG. 3, and user terminals 112 in a second lane of the IP service cells 302 near the top of FIG. 3 may be assigned to the PoP associated with the gateway terminal 104B as their home PoP, user terminals 112 in a second lane of the IP service cells 302 near the middle of FIG. 3 may be assigned to the PoP associated with the gateway terminal 104C as their home PoP, and user terminals 112 in a second lane the IP service cells 302 near the bottom of FIG. 3 may be assigned to the PoP associated with the gateway terminal 104A as their home PoP. Other distributions of lanes within the illustrated IP service cells to home PoPs at the illustrated gateway terminals are also contemplated. The approach of assigning home PoPs based on geographic proximity tends to reduce a signal travel time through the satellite telecommunications system 100 for the requests for user data. However, other methods of assigning a "home" PoP 140 to each user terminal for the addressing of requests for user data are also contemplated. The home PoP 140 handles each request for user data by accessing resources on the ground-based network 120 or nodes of the satellite telecommunications system 100 to obtain the requested data, and by accessing the SatOps services 130 to obtain routing instructions for returning the requested data.

With reference to FIGS. 1-4, as a result of the motion of satellites 102 relative to the Earth's surface, a particular satellite 102 may be in a position to establish communication with the user terminals 112 in a particular IP service cell 302 for only a limited time window, such as less than ninety minutes, less than sixty minutes, less than thirty minutes, less than fifteen minutes, less than five minutes, or less than one minute. In the exemplary embodiment, the SatOps services 130 include a topology service 132 that assigns, to each IP service cell 302 (and in some embodiments to each lane within the IP service cell), one or more of the satellites 102 to be available for linking with the user terminals 112 on a slot-by-slot basis, in which each slot represents a period of time.

The period of time, i.e., time slot length, may be selected to accommodate the limited time windows over which any particular satellite may be within the field of view of the user terminals in that IP service cell. Time slot length may be a function of orbital velocity of the satellite constellation (which in turn may be a function of altitude of the satellite constellation), number of satellites in the satellite constellation, size of the IP service cells, etc. In the exemplary embodiment, the time slot length is between 10 and 20 seconds inclusive. For example, each time slot may be 15 seconds long. However, other time slot lengths are also contemplated.

The topology service 132 may transmit topology schedule data to the user terminals 112 in each IP service cell 302 on a regular basis (e.g., via the gateway terminal 104 and the satellite 102 that are currently in communication with the IP service cell 302 associated with the respective user terminal 112). The topology schedule data transmitted to the user terminals specifies one or more of the satellites 102 that will be available for connectivity to the respective user terminal 112 during one or more future time slots. The topology schedule data may also include pointing instructions for the phased array antenna of the user terminal (or for the appropriate antenna for other types of UT-SAT links) needed to establish and maintain the corresponding UT-SAT link during the time slot, as derived from data provided by the node status service 134 for the relative motion of the satellite and the user terminal. In conjunction with the arrival of the future time slot, the user terminal 112 initiates a UT-SAT link with one of the satellites 102 specified by the topology schedule data for that time slot. In the exemplary embodiment, the SatOps services 130 also includes a steering service 136 that is programmed to manage the routing of the many data requests from, and responses to, user terminals 112 through the network topology of the satellite telecommunications system 100.

The timing of the regular transmission of the topology schedule data to the user terminals may be selected to balance several factors. For example, transmitting the topology schedule data for each time slot well in advance of the arrival of the future time slot helps to ensure that the topology schedule data propagates through the gateways and satellites to the user terminals in time to enable the user terminals to re-orient their respective phased array RF beams when the future time slot arrives. On the other hand, transmitting the topology schedule data for each time slot a relatively short time in advance of the arrival of the future time slot enables the topology service 132 to account for more up-to-date satellite and gateway statuses and ground demand data in assigning IP service cells to satellites. For example, the SatOps services 130 may include a node status service 134 that monitors the satellites 102 and gateway terminals 104. The node status service may provide projected satellite orbital positions during future time slots based on the position, velocity, and altitude of each satellite. The node status service may also provide data indicating Internet connectivity and performance of the PoP 140 associated with each gateway terminal 104, and/or data indicating weather-based signal attenuation prediction data for each gateway terminal 104. The node status service 134 may further evaluate the health and operability of each satellite and gateway, for example, by tracking a slew rate and alignment performance of each parabolic antenna of the satellite or gateway to determine a current capability of the parabolic antenna to establish and track links. Other types of health and/or status monitoring of the nodes in satellite telecommunications system 100 are also contemplated. The topology service 132 may be programmed to avoid assigning a potential link between nodes if the node status data suggests the link would be unreliable. Additionally or alternatively, the topology service 132 may be programmed to assign a reliability label to a link between nodes if some node status data suggests the link would be unreliable during one or more time slots, and to include the reliability label in data provided to the steering service 136, so that the steering service 136 can take the potential unreliability of the link into account for data routing decisions during the one or more time slots.

In some embodiments, the factors involved in advance transmission timing for the topology schedule data may be balanced advantageously by regularly transmitting the topology schedule data to the user terminals in each IP service cell at an advance transmission time of five to ten minutes in advance of the one or more future time slots associated with the topology schedule data. However, other advance transmission times are also contemplated.

As discussed above with respect to user terminals, a particular satellite 102 also may be in a position to establish communication with a particular gateway terminal 104 for only a limited time window. In the exemplary embodiment, the topology service 132 also assigns each satellite 102 to one of the gateway terminals 104 on the slot-by-slot basis. The topology service 132 may transmit topology schedule data to the gateway terminals and to the satellites on a regular basis (e.g., via the gateway terminal 104 that is currently in communication with the respective satellite 102). The topology schedule data specifies an expected connectivity between each gateway terminal 104 and one or more satellites 102 during one or more future time slots. The topology schedule data transmitted to each satellite 102 may also include pointing instructions for the parabolic RF antenna of the satellite (or for the appropriate antenna for other types of SAT-GW links), and likewise the topology schedule data transmitted to each gateway terminal 104 may also include pointing instructions for the parabolic RF antenna of the gateway terminal (or for the appropriate antenna for other types of SAT-GW links), needed to establish and maintain the corresponding SAT-GW link during the time slot, as derived from data provided by the node status service 134 for the relative motion of the satellite and the gateway terminal. In conjunction with the arrival of the future time slot, the satellite 102 initiates a SAT-GW link with the gateway terminal 104 specified by the topology schedule data for that time slot.

The timing of the advance transmission may be based on advance timing factors similar to those discussed above. For example, the satellites and gateways terminals may need to receive the topology schedule data sufficiently in advance of the future time slot to calculate and execute slewing of their respective parabolic RF antennas as required by the topology schedule data for that future time slot. In some embodiments, the advance transmission time for the topology schedule data to the satellites and the gateway terminals is five to ten minutes in advance of the one or more future time slots associated with the topology schedule data. However, other advance transmission times are also contemplated.

For example, as illustrated in FIG. 4, three satellites 102A, 102B, and 102C are approaching ground area 300 at the start of a particular time slot. The IP service cells 302 in the ground area have varying numbers of active user terminals 112. The user terminals 112 in each IP service cell 302 have previously received topology schedule data for the particular time slot, specifying satellites 102A, 102B, and 102C as being available for UT-SAT links during the particular time slot. Accordingly, in conjunction with the arrival of the time slot, the various user terminals 112 in ground area 300 establish respective links with satellite 102A, 102B, or 102C for communication with satellite telecommunications system 100.

Because the user terminal 112 may independently determine which satellite to establish a UT-SAT link with, the SatOps services 130 does not know in advance which satellite 102 will be in communication with which user terminal 112. In some embodiments, each time a user terminal 112 successfully establishes a new UT-SAT link with one of the satellites 102, the SatOps services 130 associates, in a memory, the user terminal with the lane of network traffic corresponding to the current linked satellite. The SatOps services 130 provides that association as part of the network data to the steering service 136, to enable data routing through the proper current network lane back to the user terminal.

Similarly, the satellites 102A, 102B, and 102C have previously received topology schedule data for the particular time slot shown in FIGS. 3 and 4, specifying gateway terminals 104A, 104B, and 104C as being available for SAT-GW links during the particular time slot. Accordingly, in conjunction with the arrival of the time slot, the various satellites 102 establish respective SAT-GW links with gateway terminals 104A, 104B, and 104C for communication with satellite telecommunications system 100. The topology schedule data provided to the satellites 102 may specify a prioritized sequence of gateway terminals for link attempts, or may simply identify a non-prioritized list of candidate gateway terminals that are available to establish links, in which case the satellite is programmed to select for itself an order in which the satellite will attempt to establish a link with each of the listed gateway terminals.

There may be several advantages in providing the satellites 102 with more than one candidate gateway terminal 104 for establishing a SAT-GW link during a given time slot. For example, satellite 102A receives topology schedule data including a list of candidate gateway terminals 104C, 104A, and 104B, but may be blocked from establishing a high-quality link with gateway terminal 104C by weather-based signal attenuation. The list of candidates in the topology schedule data enables the satellite to quickly move to establish a link with the next candidate gateway terminal during the same time slot. In addition, there may be an upper limit on the number of SAT-GW links that can be maintained by each gateway terminal 104A, 104B, and 104C. For example, this may be due to a physical limitation on the number of satellites that can be tracked simultaneously by the parabolic RF antennas at each gateway terminal site, and some of the parabolic antennas may occasionally not track as expected for short periods. Accordingly, some satellites 102 may be blocked from linking to one or more of the candidate gateway terminals in the topology schedule data because other satellites were first to take the available channels. Again, the list of candidate gateway terminals in the topology schedule data enables the blocked satellite to quickly move to establish a link with the next candidate gateway terminal during the same time slot.

Satellite Mesh Topology

The term "satellite mesh topology" refers specifically to the network interconnectivity among the group of satellites 102 as nodes within the overall mesh network, and the configuration of the satellite mesh topology 107 changes dynamically over time in the satellite telecommunications system 100 to account for relative motion among the satellites 102 and other factors.

One factor that affects the satellite mesh topology 107 is that each satellite 102 can only link directly to a limited number of other satellites 102 at any given time, due to each satellite 102 having a finite number of laser communication terminals (and/or other SAT-SAT communication devices). In other words, at any given time, each satellite 102 is capable of establishing a direct network connection to only a few other satellites 102 out of potentially thousands of satellites in the constellation. In one embodiment, each satellite 102 has five laser communication terminals available to link to other satellites 102. However, embodiments in which one or more of the satellites 102 has a different number of laser communication terminals (or a different number of other SAT-SAT communication devices) are also contemplated.

In the exemplary embodiment, the topology service 132 assigns SAT-SAT links among pairs of satellites 102 on the slot-by-slot basis. The topology service 132 may include the link assignments in the topology schedule data transmitted to each satellite 102 on the regular basis, as discussed above (e.g., via the satellite access gateway terminal 104 currently in communication with the respective satellite 102). More specifically, the topology schedule data may specify a connectivity of the respective satellite 102 to other satellites in the satellite mesh topology 107 during the one or more future time slots. The topology schedule data may also include pointing instructions for each of the satellite's laser communication terminals (or for the appropriate antenna for other types of SAT-SAT links) needed to establish and maintain the specified SAT-SAT links during the time slot, as derived from data provided by the node status service 134 for the relative motion of the pair of satellites. In conjunction with the arrival of the future time slot, the satellite computer system 103 dynamically establishes SAT-SAT links with the other satellites specified by the topology schedule data for that time slot, as well as the SAT-GW link with the gateway terminal 104 specified for that time slot.

In the exemplary embodiment, the topology service 132 is programmed to select SAT-SAT links for the satellite mesh topology 107 for each time slot in a way that increases (for example, maximizes or approximately maximizes) the interconnectivity of the satellites 102 via the SAT-SAT links. For example, the topology service 132 may be programmed to attempt to meet a constraint that every satellite 102 has a communication path through the satellite mesh topology 107 to every other satellite 102 during every time slot. In other words, if the constraint is met, a communication between any two satellites 102 can be routed using solely SAT-SAT links, if desired, with no need for routing through ground terminals. For another example, if complete interconnectivity among the satellites cannot be achieved for a time slot, the algorithm that selects among alternative SAT-SAT link maps for the satellite mesh topology may be programmed to assign a beneficial weight to SAT-SAT link maps in proportion to a degree to which they approach complete interconnectivity. However, embodiments are also contemplated in which complete interconnectivity, or a higher degree of interconnectivity, among the satellites is not weighted as heavily in assigning the satellite mesh topology 107.

Another factor that affects the satellite mesh topology 107 is that a satellite cannot switch a SAT-SAT link instantaneously from one satellite to another, due to physical constraints. For example, the laser communication terminal on the satellite may, in some circumstances, require a few seconds to slew into position and acquire a necessary alignment to establish network communication with the laser communication terminal of the satellite to be linked.

Another factor that affects the duration of each SAT-SAT link is that reliable links can typically be established only within a limited physical distance range between the satellites, due to parameters such as a line-of-sight requirement for laser-based links and/or tracking and pointing accuracy limitations of the laser communication terminals. In some embodiments, reliable SAT-SAT links are possible only between LEO satellites that are within a distance range from about 400 kilometers (about 250 miles) to about 2500 kilometers (about 1,500 miles). Satellite velocity is another factor that affects the duration of each SAT-SAT link. In particular, reliable communication links between each satellite 102 and other satellites 102 can typically be established only within a threshold relative velocity between the satellites. For example, the laser communication terminals on a first satellite 102 may not be able to reliably track and point at a second satellite 102 as that second satellite moves at a high relative velocity through the first satellite's field of view, even if the distance between the first and second satellites is within the limited physical distance range. Yet another factor that affects the duration of each SAT-SAT link, as well as the overall network topology, is satellite altitude. Satellites 102 within the constellation may be placed at differing orbital altitudes, for example within an altitude band about a nominal altitude of the satellite string. Satellites 102 have different velocities at different orbital altitudes. Thus, satellites 102 in relatively close proximity at a certain time, and moving in the same general direction, but at different ends of the orbital altitude band tend to separate from each other over a relatively short time as compared to satellites 102 in relatively close proximity at a certain time, moving in the same general direction, and at close to the same altitude. Still another factor that affects the satellite mesh topology 107 is the differing demand levels from user equipment user terminals 112 in different IP service cells 302 during each time slot, or from UE 110 in different geographical sub-areas that may be covered by the cellular RF beams of each satellite. SAT-SAT links may be assigned in part based on satellite positions relative to one or more IP service cells 302, clusters of UE 110, or gateway terminals 104. For example, satellites 102 passing over a high-demand ground area (e.g., a geographic area that includes a high density of active UE 110 or IP service cells 302 having a relatively high density of active user terminals 112) during a time slot may be preferentially linked to satellites passing over nearby lower-demand ground areas, in order to give the steering service 136 more opportunities to distribute data routing for the high-demand ground area among a broader range of network paths with only small increases in communication latency. The topology service 132 may be programmed to evaluate one or more of the factors above in determining the SAT-SAT link topology schedule data for each of the time slots. For example, as discussed above, the node status service 134 may provide status data, e.g., position, velocity, altitude, health, and operability, of each satellite, which may include tracking a slew rate and alignment performance of each laser communication terminal on the satellite to determine a capability of the terminal to acquire and maintain reliable links. The topology service 132 may use such data from the node status service 134 in selecting the satellite mesh topology 107 for each time slot.

As noted above, the topology service 132 may be programmed to transmit the SAT-SAT link topology schedule data to the satellites on the same regular basis, such as five to ten minutes in advance of the one or more future time slots, as is used to transmit general mesh topology schedule data to the nodes. However, other advance transmission times are also contemplated.

Cellular RF Beam Mapping

Returning to FIG. 5, as noted above, the satellites 102 may also provide cellular communications service to the ground area 500 via the cellular core 141 of the satellite telecommunications system 100. The ground area 500 may be co-extensive with, or overlap, the ground area 300 in which user terminals 112 are serviced. For example, access to the cellular core 141 may be provided to UE 110 via a first phased array antenna 105 (shown in FIG. 7A) carried by at least a subset of the satellites 102, and access to the ground-based IP network 120 may simultaneously be provided to the user terminals 112 via a second phased array antenna (not shown) carried by the satellites 102 that is physically separate from the first phased array antenna. Alternatively, the ground area 500 may not overlap with ground area 300 or may not include any user terminals 112 serviced by the satellites 102. In some embodiments, for example, the satellites 102 support access to the cellular core 141 by UE 110 in the ground area 500, but do not support separate access to the ground-based IP network 120 by user terminals 112.

In particular, in FIG. 5, satellites 102 A and 102B are moving generally northeast over the ground area 500 along respective orbital paths 502A and 502B, with the satellite 102A slightly behind and to the north of the satellite 102B. As shown in FIG. 4, three gateway terminals 104A, 104B, and 104C are available to establish SAT-GW links with the satellites 102A and 102B as they pass over the ground area 500, and each satellite 102A and 102B may establish a SAT-GW link for each time slot as directed by the topology schedule data.

In the exemplary embodiment, each of the satellites 102 implements a base station platform that supports multiple cells, and the carrier for each cell is implemented by a corresponding RF beam 506 of the phased array antenna 105. For example, in a 4G LTE implementation, the satellite base station platform is an eNodeB that supports up to 256 cells (also referred to as sectors), and the phased array antenna 105 (or, optionally, plurality of phased array antennas 105) of the satellite generates up to 256 separate directional RF beams 506 as the carriers for each cell (although only seven beams 506 are illustrated in FIG. 5 for clarity of illustration). However, other numbers of beams/cells per satellite 102 are also contemplated, either in a 4G LTE implementation or other RAN implementations. Each beam 506 intersects the surface of the Earth at a centerline incidence angle 510 and has a corresponding beam footprint 508 at or near the surface. The beam footprint 508 defines a service area of the cell, such that UE 110 in the beam footprint 508 are able to access the satellite telecommunications system 100 using the corresponding beam 506. The eNodeB implemented by the satellite routes communications with the UE 110 in each beam footprint through the satellite's current SAT-GW link and the cellular core 141, as shown in FIG. 1B.

As the satellite 102B passes over the ground area 500, the position of each UE 110 on the surface constantly changes relative to the position of the satellite 102B. In the exemplary embodiment, the topology service 132 of the SatOps services 130 includes a cellular planning component programmed to compensate for the relative motion of the satellites in order to ensure continued connectivity of the UE 110. For example, at the moment in time illustrated in FIG. 5, the satellite 102B has a field of regard 504, which is an area that the phased array antenna 105 can potentially reach with beams 506. The beams generated by the satellite include a forwardmost beam 506-A with a footprint 508-A, a rearmost beam 506-B with a footprint 508-B, and a nadir beam 506-C with a footprint 508-C. (Additional beams generated by the satellite are not illustrated in FIG. 5 for purposes of clarity of illustration.) As the satellite 102B moves onward, if there is no adjustment in the direction of emanation of the beams 506 from the satellite 102B, the beam footprint 508-A will move away from the UE 110 that were communicating via the beam 506-A, the beam footprint 508-B will move away from the UE 110 that were communicating via the beam 506-B, and the beam footprint 508-C will move away from the UE 110 that were communicating via the beam 506-C.

In some embodiments, in order to provide continued connectivity to the UE 110 in each geographic sub-area of the ground area 500, the beams 506 may be re-directed (that is, the beam angle from the phased array antenna 105 may be changed) to keep the footprint 508 on the same sub-area as the satellite 102B moves along the path 502. This may be referred to as "sliding" the beams. For example, the incidence angle 510 of the beam 506-A would steadily approach 90 degrees as the satellite 102 moves towards a position directly over the geographic sub-area covered by beam footprint 508-A in FIG. 5, and then continue to grow steadily past 90 degrees towards 180 degrees as the satellite moves away to the northeast, such that the beam footprint 508-A remains located on the same geographic sub-area throughout the pass through the satellite's field of regard 504.

Additionally or alternatively, the beams 506 may be held at a constant beam angle from the phased array antenna as the satellite 102B moves overhead, and communication with the UE 110 may be handed over to a different beam 506 with a footprint 508 that moves over the geographic sub-area as the footprint of the initial beam leaves the sub-area. This may be referred to as "gliding" the beams. For example, the geographic sub-area initially covered by beam footprint 508-A (at the instant in time shown in FIG. 5) would eventually be covered by beam footprint 508-C as the satellite moves directly overhead, and then covered by beam footprint 508-B just before the geographic sub-region is left behind by the field of regard 504 as the satellite 102B moves away. (The geographic sub-area would also be covered by intermediate beam footprints 508 distributed between footprints 508-A and 508-C, and between 508-C and 508-B, associated with beams 506 that are not included in FIG. 5 for purposes of clarity of illustration.) The UE 110 in that geographic sub-area may be handed over to the next following beam in sequence as each successive beam footprint covers the sub-area. As the final footprint 508-B for the satellite leaves the geographic sub-area, the UE 110 in the sub-area may next be handed over to a beam of the next following satellite 102A in the group of satellites 102, and so forth.

In some gliding beam implementations, the satellites 102 may utilize one or more standard handover procedures associated with the RAN implementation to pass the UE 110 in the geographic sub-area from beam to beam as the satellites move overhead. For example, each beam originating from a satellite is a defined cell of the same base station platform, and handovers between beams of the same satellite 102 (i.e., intra-satellite handovers) may be accomplished without involvement of the cellular core 141. Likewise, the beams from different satellites communicating with the same cellular core 141 are defined as cells of the same RAN, and within-network handover procedures may be used. In a 4G LTE implementation, such handovers may be accomplished using the X2 or S1 interfaces.

In some embodiments, the topology service 132 may use a dynamic combination of sliding and gliding beams to meet requirements for cellular services requested by UE 110 within the ground area 500, under constraints imposed by the network topology considerations discussed above and, in some cases, by a concomitant need to meet independent data flow requirements to and from user terminals 112 using the same satellites 102 and gateway terminals 104. More specifically, the topology service 132 may allocate a direction and power of the available beams of the phased array antenna 105 of each satellite 102 on the slot-by-slot basis, as discussed above, to ensure coverage of active UE 110 in the geographic sub-areas within the field of regard 504 during the time slot. The topology planning service may also ensure that the network topology for the time slot includes sufficient backhaul capacity for cellular communications data from the satellites 102 through the gateway terminals 104 (potentially using the satellite mesh topology 107 as an intermediate link) to the cellular core 141. The topology service may transmit, via the gateway terminals 104, SAT-GW link instructions, SAT-SAT link instructions, and beam plan instructions for each time slot to the satellites 102 as part of the topology schedule data. The beam plan instructions may be used by the satellite computer system 103 to command the phased array antenna 105 to generate the beams 506 during each time slot in accordance with the beam direction and power allocations determined by the topology service 132.

Satellite Effects on Cellular Signal Latency and Doppler Shift

Figure 6:
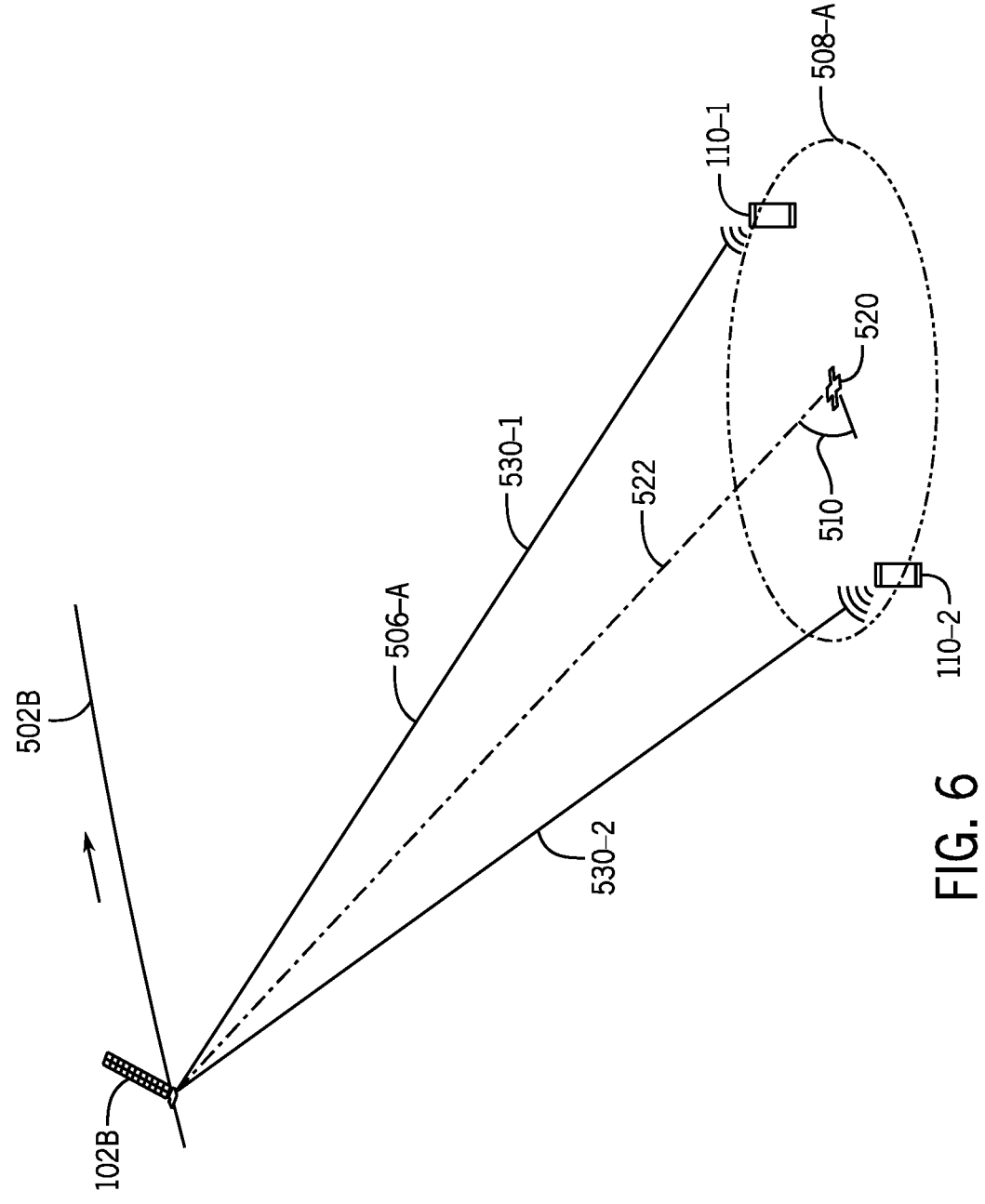
FIG. 6 illustrates a not-to-scale schematic diagram of a geometry of one of the beams and beam footprints of FIG. 5 in accordance with embodiments of the present disclosure.

FIG. 6 illustrates a not-to-scale schematic diagram of a geometry of beam 506-B and beam footprint 508-B from FIG. 5. With reference to FIGS. 5 and 6, beam 506-B is the RF carrier for one of the cells of the base station platform on the satellite 102B, and the footprint 508-B defines a service area of the cell, as noted above.

Under typical RAN protocols such as 4G LTE and 5G NR, as users move throughout the coverage area of a cell, UE transmission timing is controlled by the network through procedures defined by the RAN standard so that uplink signals from all UE 110 in the service area of a cell arrive at the base station at approximately the same time. For example, the uplink signals all arrive within the cyclic prefix duration. (As understood by those of ordinary skill, a cyclic prefix (CP) is appended before a data symbol and is an identical copy of a last portion of the data symbol, generally in order to facilitate avoidance of data loss during transmission. The CP duration is defined by the standard.) In addition, the timing offset between uplink/downlink frame N at the base station remains constant (typically close to zero). The base station instructs the UE to time UE transmissions so that an uplink frame N from the UE arrives at the base station aligned in time based on when the transmission of the corresponding downlink frame N from the base station to the UE occurs. This is referred to as the downlink-uplink subframe offset in some protocols.

Typical RAN protocols are designed for terrestrial applications where the base station is stationary and the UE 110 are expected to be within a threshold distance of the base station. For example, with respect to signal latency, the 4G LTE and 5G NR standards are designed for a round-trip travel time of a wireless signal from the base station to a UE 110, and back to the base station, of less than 1 millisecond. With respect to Doppler shift, the 4G LTE and 5G NR standards are designed for an extreme case of a UE 110 travelling on a high speed train, where the maximum Doppler could be up to 0.28 parts per million (ppm), which corresponds to about 750 Hz for a carrier frequency of 2.7 GHz. Typical RAN protocols have been designed to handle downlink frame timing, random access by UE 110, and other procedures up to these levels of signal latency and Doppler shift without sacrificing performance.

In a LEO satellite-based communication system such as satellite telecommunications system 100, due to the relative velocity of the satellite base station in a LEO system over the ground, the signal propagation delay and Doppler shift are much larger than in terrestrial cellular networks, and in addition the ranges over which the propagation delay and Doppler shift vary are much larger. For example, for a UE 110 in the beam footprint 508-A at the instant in time shown in FIG. 5, if the satellite 102B is at an altitude of 525 km and the incidence angle 510 is 37 degrees, the latency for a signal transmitted from the satellite to the UE could be as large as 3 milliseconds and the Doppler shift could be as large as 20 ppm (which corresponds to about 5,400 Hz for a carrier frequency of 2.7 GHz). Moreover, as the satellite moves along the orbital path 502B, and the geographic sub-area covered by footprint 508-A transitions from the leading edge of the field of regard 504 (as shown in FIG. 5) to directly underneath the satellite 102B, the one-way signal latency from the satellite 102B to the UE 110 in footprint 508-A may be reduced by more than 1 millisecond, and the Doppler shift could change as much as 0.35 ppm per second.

In addition to the Doppler effect on carrier frequency, the motion of the satellite 102B during this time causes signals transmitted from the satellite to appear to the UE 110 as arriving compressed in time. For example, after one second a downlink frame boundary within the signal transmitted by the satellite would arrive at the UE 110 approximately 20 microseconds earlier than the UE 110 expected it based on the RAN standard downlink frame timing, and the UE would not be able to decode the signal. Similarly, as the satellite moves away from the UE 110, the downlink frame timing would appear expanded in time, and the UE would not be able to decode the signal.

To counteract these effects, the satellite computer system 103 can use knowledge of the satellite motion with respect to the UE 110, and adjust the symbol rate and frame timing of its transmitted signal, so the signal received by the UE 110 arrives within the limits of the RAN standard being used. In other words, while the satellite 102B is moving towards the geographic sub-area covered by a beam, the satellite computer system 103 can cause the phased array antenna 105 to transmit data on that beam slightly expanded in time; likewise, when the satellite 102B is moving away from the geographic sub-area covered by the beam, the satellite computer system 103 can cause the phased array antenna 105 to transmit data on that beam slightly compressed in time. This is referred to as SFO (sample frequency offset) and delay pre-compensation. The satellite computer system 103 can use a similar approach for processing signals received from the UE 110 ("uplink" transmissions) in the geographic sub-area covered by the beam, referred to as SFO and delay post-compensation.

It should be noted that the effects above are described for a UE 110 at a single location in the beam footprint 508-A, but significant variations in signal latency and Doppler shift may also occur within the footprint of each beam 506. For example, with reference to FIG. 6, the parameter ranges discussed above may apply to a signal 522 received at a UE located at a reference location 520 within the beam footprint 508-A. In the example embodiment, the reference location

520 corresponds to a center of the beam footprint, however, other locations within the beam footprint may alternatively be used as the reference point. There may simultaneously be a first UE 110-1 at a leading edge of the beam footprint receiving a signal 530-1, and a second UE 110-1 at a trailing edge of the beam footprint receiving a signal 530-2. In some non-limiting examples, the radius of the beam footprint 508-A could be in a range from about 20 kilometers (about 12 miles) to about 60 kilometers (about 37 miles). Thus, in addition to the magnitude of the Doppler shift present in signal 522, the difference in the Doppler shift between signals 530-1 and 530-2 could be greater than one ppm. Therefore, even after the satellite computer system 103 applies a Doppler correction to the signals to be transmitted by the beam 506-A based on the Doppler shift at the reference location 520, a significant residual Doppler shift may still be present in signals 530-1 and 530-2.

Moreover, under typical RAN protocols, each UE calibrates its uplink Doppler correction from the downlink signal it receives from the satellite. Accordingly, when UE 110-1 and 110-2 calibrate their respective uplink frequencies, the residual difference in Doppler shift in received signals 530-1 and 530-2 will be multiplied by a factor of two in uplink signals sent by the UE 110-1 and 110-2 (i.e., the uplink frequency will include both the mis-calibration of the uplink frequency due to the residual Doppler shift in the downlink signal 530-1 or 530-2, plus the same physical residual Doppler shift after the uplink is corrected at the satellite for Doppler shift based on the expected reference location value).

The satellite computer system 103 can be configured to send signal data to, and receive signal data from, the phased array antenna 105 of the satellite 102. Moreover, the satellite computer system 103 can be programmed to implement the necessary steps to correct the signal data received from, and transmitted to, the UE 110 for the out-of-standard effects caused by the use of the satellites 102 as base station platforms. Encapsulating these corrections within the satellite computer system 103 to bring the signals within the RAN standard avoids any need for modification of the UE 110 to use the satellite telecommunications system 100, and thus enables the UE 110 to switch seamlessly between standard terrestrial base station networks and the satellite telecommunications system 100.

In the example embodiment, the satellite computer system 103 calculates the expected Doppler shift for signals received from the reference location 520 (e.g., the center of the cell) at a series of points in time, based on the satellite's trajectory relative to the reference location 520, and applies a corresponding Doppler correction value to the data stream received from the phased array antenna to post-compensate for the CFO present in the received signal. The Doppler correction value for each beam may change over time. For example, if the beam is steered to maintain the beam footprint on the same geographic sub-area as the satellite 102 moves towards, over, and then past the geographic sub-area, then the Doppler shift for signals originating at the reference location 520 continuously changes as the satellite 102 moves towards, over, and then past the reference location 520. The Doppler correction values for each point in time may be calculated in advance, stored, and then applied to the incoming data stream as the point in time arrives. Other implementations of Doppler correction with respect to the cell reference location 520 are also contemplated.

In some embodiments, the satellite computer system 103 can also adjust for a timing offset of the data stream for each beam 506 based on its signal path length to the reference location 520. The signal propagation delay among beams 506 differs. For example, as shown in FIG. 5, the signal path length (and hence the propagation delay) for nadir beam 506-C is much shorter than the signal path length for the forwardmost beam 506-A and the rearmost beam 506-B. The satellite computer system 103 can adjust the timing of the data stream for one or more beams to account for the differences in propagation delay corresponding to the signal path lengths.

Example Implementation of a PRACH Detector

Notably, as discussed above with reference to FIG. 6, the timing offset and Doppler correction based on the reference location 520 is typically not sufficient, by itself, to bring the timing offset and Doppler shift for the signals from every UE 110 in the cell within the limits of the RAN protocols, as some UE 110 may still exhibit significant residual timing offsets and Doppler shifts. However, the beam timing and Doppler corrections based on the reference location can be sufficient to enable some additional signal processing at the satellite computer system 103 to correct for the residual timing offset and frequency offset in the signals with respect to each UE 110 at different locations within the beam footprint relative to the reference location 520, and/or moving with different relative velocities.

In the example embodiment, the satellite computer system 103 includes a PRACH detector 1000 configured to detect requests for an uplink allocation from UE 110 that are attempting to join the RAN. More specifically, the RAN protocol typically defines a physical random access channel (PRACH) slot and an access signal format that should be used by UE 110 to request the uplink allocation from the base station platform. In some embodiments, the PRACH detector 1000 uses special properties of the access signal format to detect the access signal despite the residual timing offset and Doppler shift of the UE 110 that originated the signal, and also provides a precise correction for the residual timing and Doppler offset that can be used in the access response message from the satellite base station platform implemented by the satellite computer system 103.

Figure 7:
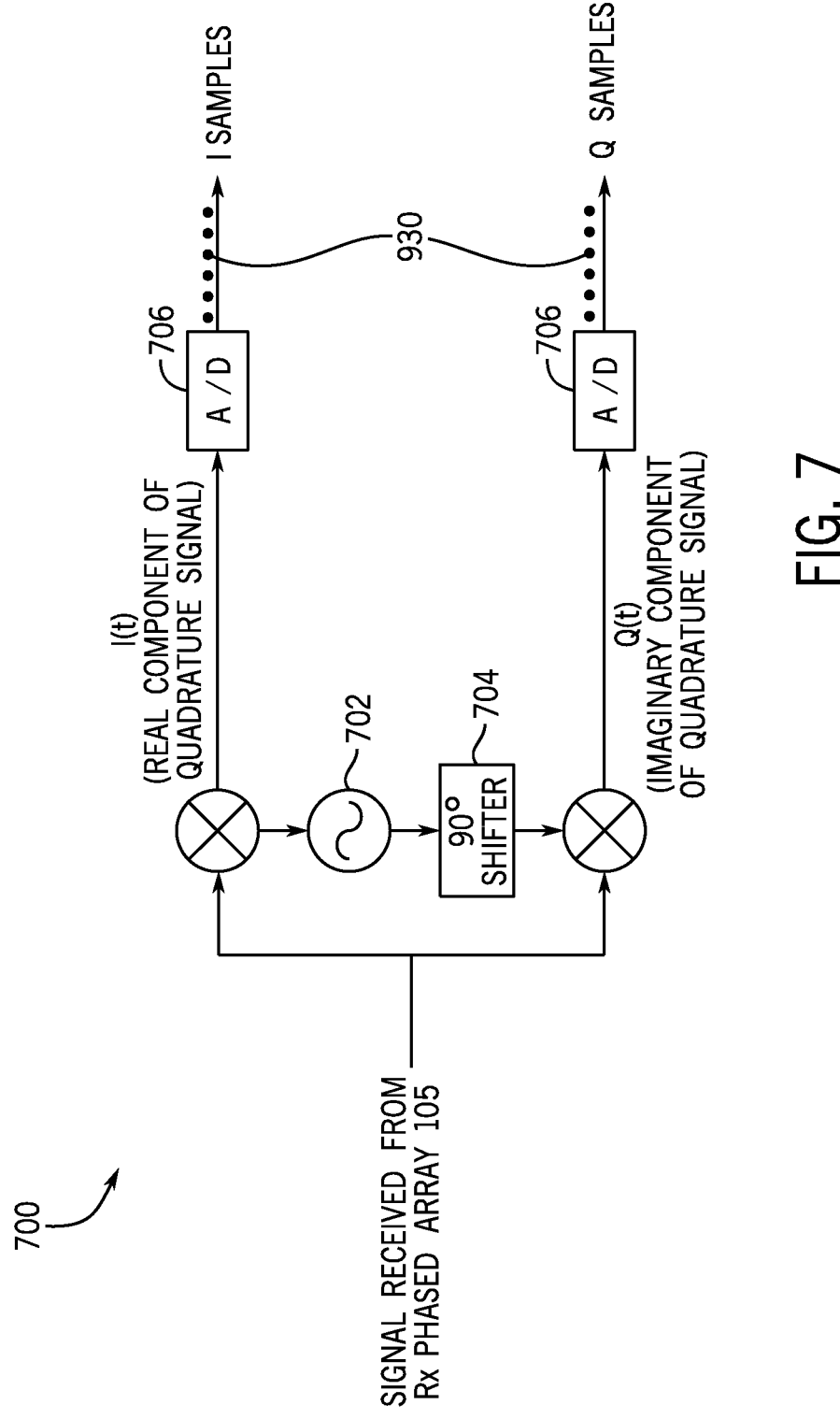
FIG. 7 illustrates a schematic block diagram of an exemplary quadrature sampler that may be used on satellites of the satellite telecommunications system of FIG. 1A.
Figures 9A, 9B:
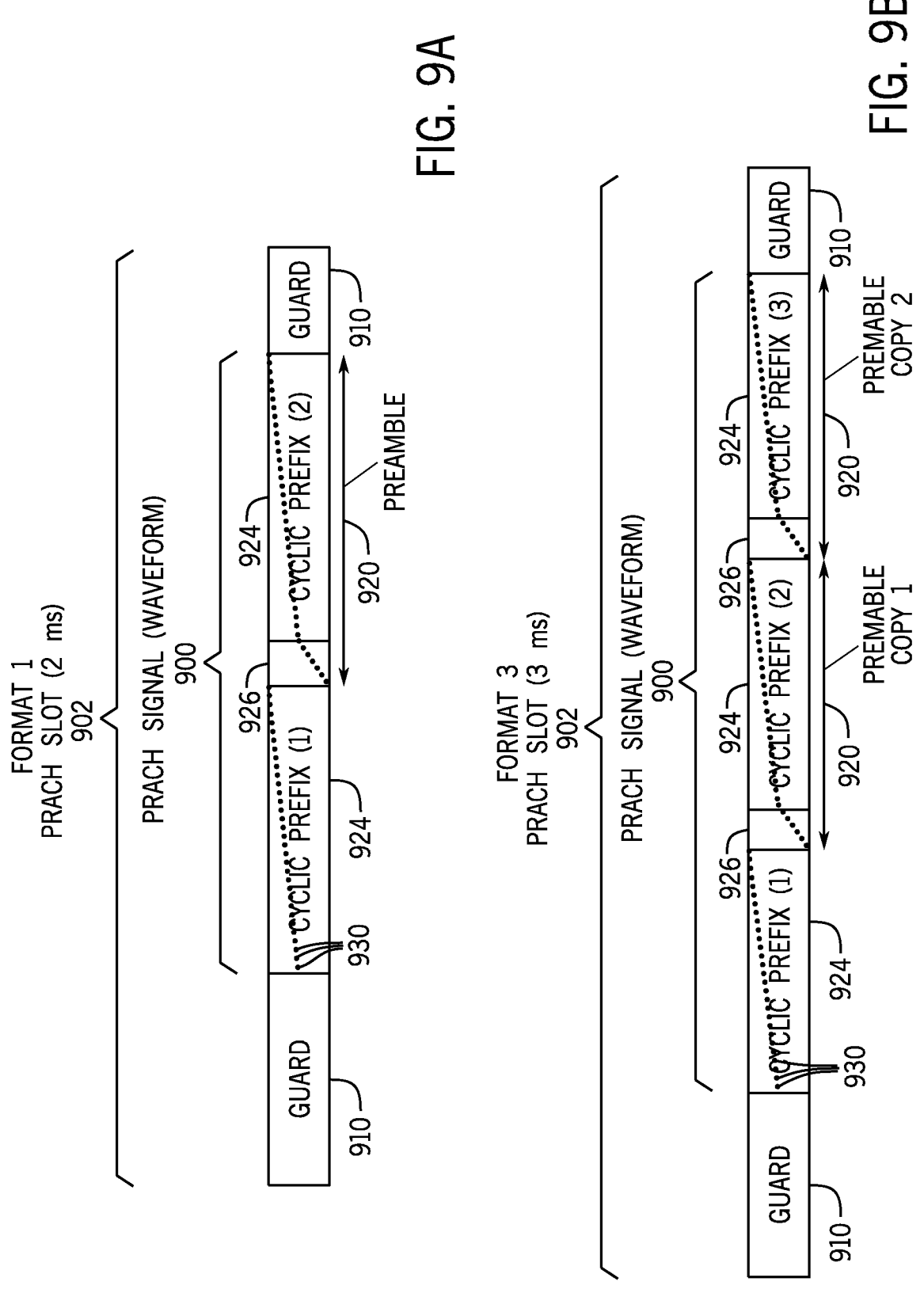
FIG. 9A illustrates a schematic representation of an exemplary Format 1 physical random access channel (PRACH) waveform that may be transmitted by a user equipment shown in FIG. 1A.
FIG. 9B illustrates a schematic representation of an exemplary Format 3 PRACH waveform that may be transmitted by a user equipment shown in FIG. 1A.
Figure 10:
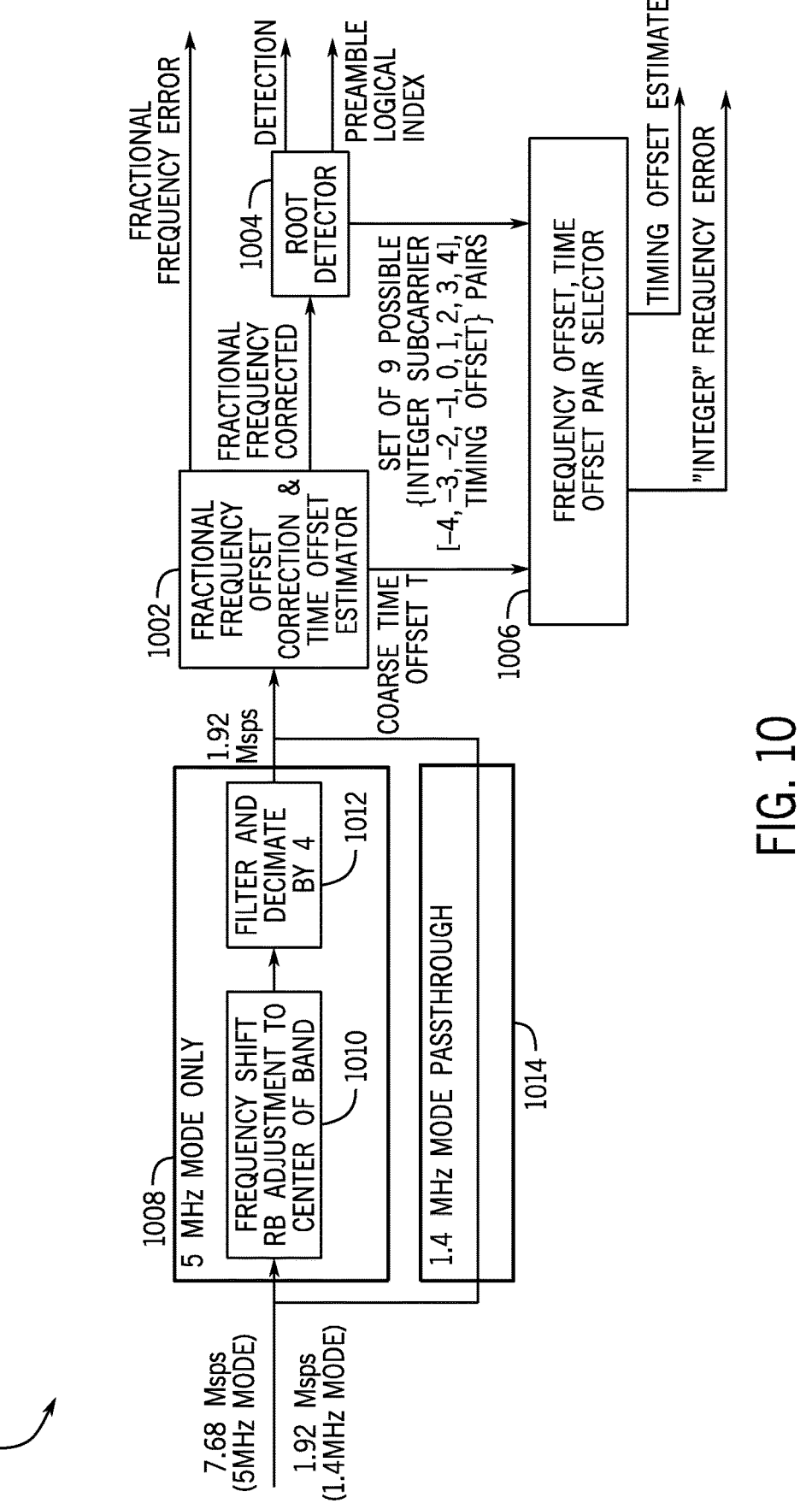
FIG. 10 illustrates a schematic block diagram of an exemplary PRACH detector that may be used on satellites of the satellite telecommunications system of FIG. 1A.

FIG. 7 illustrates a schematic block diagram of an example embodiment of a quadrature sampler 700 that may be used to process the signal received from the phased array antenna 105. FIG. 9A illustrates a schematic representation of an example Format 1 physical random access channel (PRACH) waveform 900, and FIG. 9B illustrates a schematic representation of an example Format 3 PRACH waveform 900, that may be transmitted by the UE 110 seeking access to the satellite telecommunications system 100. FIG. 10 illustrates a schematic block diagram of an example embodiment of a PRACH detector that may be implemented by the satellite computer system 103.

The PRACH waveform typically includes a preamble sequence 920 that is based on a Zadoff-Chu (ZC) sequence, which is known to have properties that facilitate detection of the sequence even under poor signal-to-noise ratio (SNR) conditions. Non-limiting example formats available for the PRACH waveform in 4G LTE and 5G NR implementations of the RAN include Format 1 and Format 3, which are illustrated in FIGS. 9A and 9B, respectively. It should be understood that the approaches described below can be applied to other formats, whether in 4G LTE, 5G NR, or other RAN protocols. A ZC sequence may be generated by the equation:

$$x_u(n) = e^{-j\frac{\min(n+1)}{N_{ZC}}}, 0 \le n \le N_{ZC} - 1 \quad (1)$$

and the length $N_{ZC}$ of the Zadoff-Chu sequence is 839 for Formats 1 and 3. The value of u is also an integer between 1 and Nzc−1. Each UE 110 selects the root u to use for the PRACH waveform under constraints broadcast by the base station platform operating on the satellite 102. Notably, the base station does not know in advance, and cannot predict, which root u (from among a set of available u values allocated to the UE based on the constraints broadcast by the base station) will be selected by the UE 110.

The RAN defines a PRACH slot 902, within the frame structure used by the RAN, in which the UE 110 transmits the PRACH waveform 900. Each UE 110 determines the format to use for the PRACH waveform based on parameters broadcast by the base station platform operating on the satellite 102. If Format 1 is used, the PRACH slot 902 has a length of 2 milliseconds. If Format 3 is used, the PRACH slot 902 has a length of 3 milliseconds.

If Format 1 is used, the PRACH waveform 900 includes one copy of the preamble sequence 920. In addition, an end portion of the preamble sequence 920 is copied and appended to the front of the PRACH waveform 900 as a cyclic prefix (CP) 924. A leading portion 926 of the preamble sequence 920 is not part of the CP 924. The Format 1 PRACH waveform 900 has a duration of about 1.48 milliseconds, leaving an unused or "guard" portion 910 of the PRACH slot 902 with a duration of about 0.52 milliseconds to account for residual signal propagation delay. In the example embodiment, the uplink signal from the UE 110 is compensated, upstream from the PRACH detector 1000, for signal propagation delay based on the reference location 520 in the beam footprint 508, as discussed above. This enables the PRACH waveform 900 to land somewhere within the PRACH slot 902. The precise location within the PRACH slot 902 is based on residual signal propagation delay at UE locations different from the reference location.

If Format 3 is used, the PRACH waveform 900 includes two copies of the preamble sequence 920, the end portion of the preamble sequence 920 is again copied and appended to the front of the PRACH waveform 900 as the CP 924, and the leading portion 926 of the preamble sequence 920 is not part of the CP 924. The format 3 PRACH waveform 900 has a duration of about 2.28 milliseconds, leaving the guard portion 910 of the PRACH slot 902 with a duration of about 0.72 milliseconds to account for residual signal propagation delay. Again, the upstream signal propagation delay compensation enables the PRACH waveform 900 to land somewhere within the PRACH slot 902 based on residual signal propagation delay at UE locations different from the reference location.

In the example embodiment, the incoming continuous signal transmitted by the UE 110 and received by the phased array antenna 105 is sampled using the quadrature sampler 700. The quadrature sampler 700 converts the continuous time-domain signal into complex-valued samples 930 that include a real component and an imaginary component. In other words, the quadrature sampler produces a sequence of samples, and each sample 930 includes a pair of values I and Q.

For example, the quadrature sampler 700 may include a sine wave generator 702 and a phase shifter 704. The output of the sine wave generator 702 is multiplied against the incoming signal to obtain a real component I(t) of the signal, and also is phase-shifted 90 degrees by the phase shifter 704 and multiplied against the incoming signal to obtain an imaginary component Q(t) of the signal. The real and imaginary components I(t) and Q(t) are then sampled by analog-to-digital (A/D) converters 706 to produce the complex-valued samples 930 including pairs of I and Q values. Other implementations of the quadrature sampler 700 are also contemplated. In some embodiments, the quadrature sampler 700 is implemented by the satellite computer system 103 upstream from the PRACH detector 1000. However, it is contemplated the quadrature sampler 700 may be implemented at other locations as well, including within the PRACH detector 1000.

In some implementations, the A/D converters 706 convert the real and imaginary components I(t) and Q(t) into samples 930 at 1.92 mega-samples per second (Msps). At this sample rate, the number of samples in each portion of the PRACH waveform 900 are as shown in Table 1:

TABLE 1

| | format 3 | format 1 |
|---|---|---|
| PRACH waveform 900 (without guard time) | 4386 | 2850 |
| PRACH slot 902 (PRACH waveform plus guard time) | 5760 | 3840 |
| Guard portion 910 | 1374 | 990 |
| Cyclic Prefix (CP) 924 | 1314 | 1314 |
| Leading portion 926 (not part of CP) | 222 | 222 |
| Each copy of preamble sequence 920 | 1536 | 1536 |
| All preamble sequence(s) | 3072 | 1536 |

The examples used below will be based on the 1.92 Msps sample rate, however, other sample rates are also contemplated. Representative samples 930 are illustrated in the PRACH waveform 900 in FIGS. 9A and 9B, but are not intended to represent the full number of samples in each portion of the waveform, nor are they intended to represent actual numerical sample values, other than to visually "differentiate" them as different samples and to generally illustrate which portions of the waveform are repeated.

The PRACH detector 1000 is configured to detect one or more instances of the PRACH waveform 900 in the PRACH slot 902 within signals received via the phased array antenna 105 from UE 110. As discussed above, due to the motion of the satellite 102 relative to the terrestrial UE 110, the Doppler shift in the incoming signal could be as large as 20 ppm (which corresponds to about 5,400 Hz for a carrier frequency of 2.7 GHz). Other potential ranges for the Doppler shift are possible for different satellite altitudes, beam angles of incidence, etc. Moreover, although in the example embodiment the signal propagation latency has been corrected, upstream from the PRACH detector 1000, for the reference location 520 in the beam footprint 508, residual signal timing differences between the reference location 520 and the location of each UE 110 sending the PRACH waveform 900 may still be significant.

FIG. 10 illustrates a schematic block diagram of an exemplary PRACH detector 1000. The PRACH detector makes use of special properties of the ZC sequence, which underlies the PRACH waveform 900, and also of properties of the complex IQ values in the samples 930, to correct for the significant residual Doppler shifts and residual signal timing shifts in the signal caused by the relative motion of the satellite.

In the example embodiment, the PRACH detector 1000 divides the detection problem into a coarse detector 1002, programmed to determine a coarse time offset present in the signal input to the PRACH detector 1000, and a root-detector 1004 that accurately identifies the root u selected by the UE 110 to generate the ZC sequence in the PRACH waveform 900. Once the root u is determined, the root detector 1004 can reconstruct a reference ZC sequence for comparison to the signal input to the PRACH detector 1000, which may include both a frequency offset and a time offset relative to the reference signal. Because the signal time offset and signal frequency offset have interrelated effects on the ZC sequence, as will be described below, the root detector 1004 by itself can only produce a plurality of possible pairs (f, T) of frequency offset and time offset that would produce the received signal from the reference signal based on the detected root u.

However, while direct use of the coarse time offset as an estimate of the residual signal time offset may not have sufficient accuracy, by itself, to enable successful operation of the UE 110 on the RAN, the coarse time offset is nevertheless sufficiently accurate to be closest to the true T value in the sets (f, T) produced by the root detector 1004. In other words, the coarse time offset produced by the coarse detector 1002 can reliably be used to select the true pair (f, T) from the output of the root detector 1004. The architecture includes a pair selector 1006 programmed to apply the output of the coarse detector 1002 to the output of the root detector 1004 to select the true values of frequency offset f and time offset T.

In some embodiments, the PRACH detector 1000 includes a preprocessor 1008 for channel bandwidth modes in which the PRACH allocation occupies less than the entire band. More specifically, in some RAN channel bandwidth modes, the PRACH allocation is within some contiguous resource block (RB) space (i.e., some frequency range) that occupies less than the entire channel frequency band. The preprocessor 1008 may include a frequency shifter 1010 configured to shift the contiguous RB frequency range to the center of the band, and also may include a decimator 1012 configured to normalize the sample rate.

In the illustrated example, which is non-limiting, the preprocessor 1008 is configured for a 5 MHz channel bandwidth mode in 4G LTE, sampled at 7.68 Msps. The frequency shifter 1010 shifts the frequency of the incoming signal to the PRACH detector 1000 as necessary to center the frequency range of the resource blocks allocated for PRACH (which is known by the satellite computer system 103, since the allocation is set by the base station platform). In addition, the decimator 1012 decimates the samples by a factor of four from the 7.68 Msps rate (and applies an anti-aliasing filter in some embodiments) to produce an equivalent input signal based on a 1.92 Msps sample rate. A similar approach is contemplated for other channel bandwidth modes. Different implementations of the preprocessor 1008 are also contemplated.

By contrast, for channel bandwidths in which the PRACH allocation occupies the entire band, the preprocessor 1008 is not necessary, and the PRACH detector 1000 simply passes the incoming signal through to the coarse detector 1002, designated as a pass-through path 1014. This is illustrated in FIG. 10 for the 1.4 MHz mode in 4G LTE, in which the PRACH allocation occupies the entire band. Accordingly, the preprocessor 1008 enables the PRACH detector 1000 to handle multiple RAN and channel bandwidth modes, with the downstream processing being independent of the channel bandwidth mode. For example, as the satellite 102 passes over different geographical areas, the UE 110 may be required to operate in different modes, and the PRACH detector 1000 is configured to switch seamlessly among the modes. However, different implementations of the PRACH detector 1000 are also contemplated.

In some embodiments, the input signal includes separate signals (denoted as Vpol, Hpol) from, respectively, Vertical and Horizontal Polarization receive antennas within the phased array antenna 105. As discussed in more detail below, in some such embodiments, the PRACH detector 1000 is configured to process the Vpol and Hpol signals separately, and then combine the results for improved detection of the PRACH waveform 900.

Figure 8A:
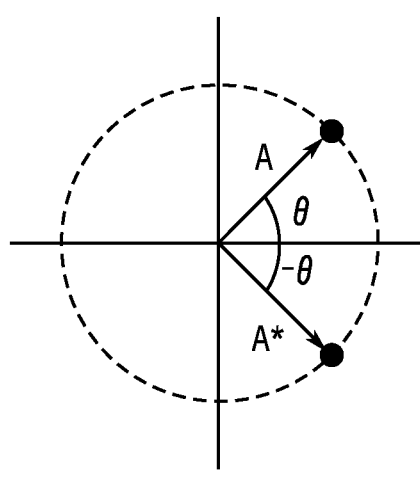
FIGS. 8A and 8B illustrate a mathematical property of complex numbers that may be used on satellites of the satellite telecommunications system of FIG. 1A.
Figure 8B:
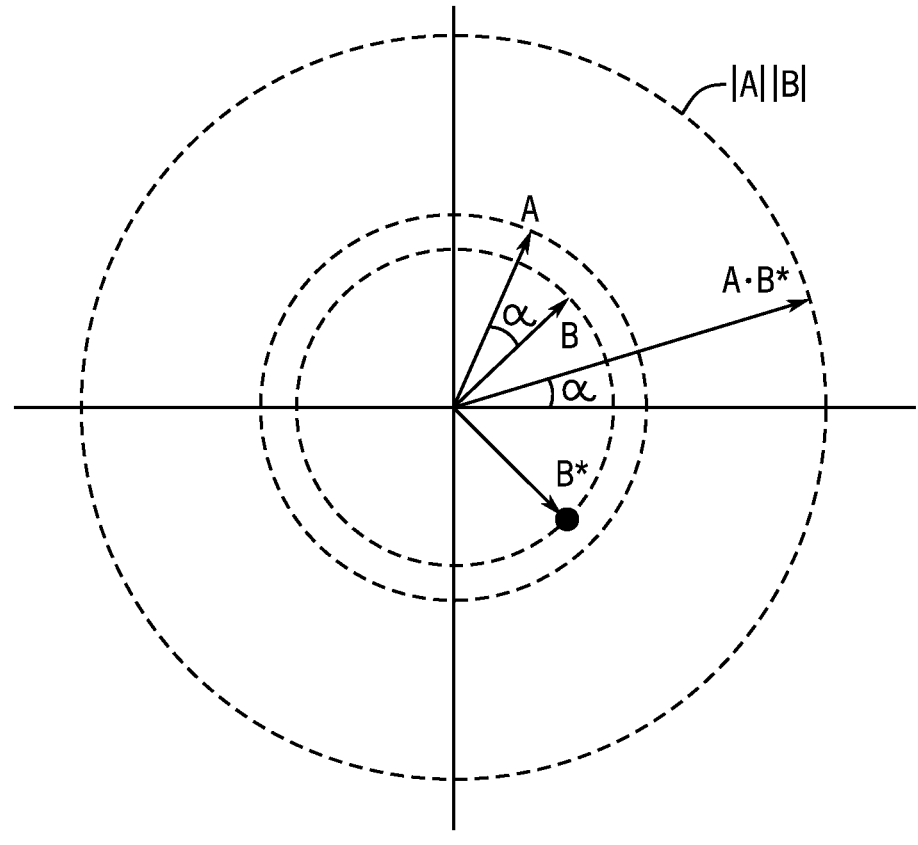

In some embodiments, the PRACH detector 1000 utilizes properties of the complex-valued IQ samples 930 that are illustrated in FIGS. 8A and 8B. FIG. 8A illustrates a plot of a complex number and its complex conjugate in the complex plane. As noted above, if the symbol j represents the square root of (−1), each IQ sample 930 can represent the complex number I+jQ. Each IQ sample 930 can be represented as a vector A on a two-dimensional plot, with the real value I plotted along the abscissa and the complex value Q plotted along the ordinate. In the graphical representation, the magnitude of the IQ sample is the length of the vector A, and the phase of the IQ sample is the angle θ of the vector A relative to the positive leg of the abscissa. Moreover, the complex conjugate A* of A is I−jQ, and has the same magnitude A and an equal but opposite phase of −θ.

FIG. 8B illustrates a property of multiplication of a complex number by the complex conjugate of another complex number, or "conjugate multiplication." For any two complex-valued numbers, designated A and B, conjugate multiplication A·B* results in another complex value with a magnitude equal to the magnitude of A multiplied by the magnitude of B, and a phase a equal to the phase difference between A and B. In other words, one could have many pairs of complex values that all have different phase angles, but if each pair has a given phase difference between the phase angles of its individual members, then conjugate multiplication of each pair produces a result with the same phase angle. Moreover, if the conjugate multiplication result for all of the pairs is summed, the fact that each conjugate multiplication result "points in the same direction" (that is, has the same phase angle) causes the conjugate multiplication results for all the pairs to reinforce each other by adding (combining) constructively, producing a vector with a very large magnitude.

Figure 11A:
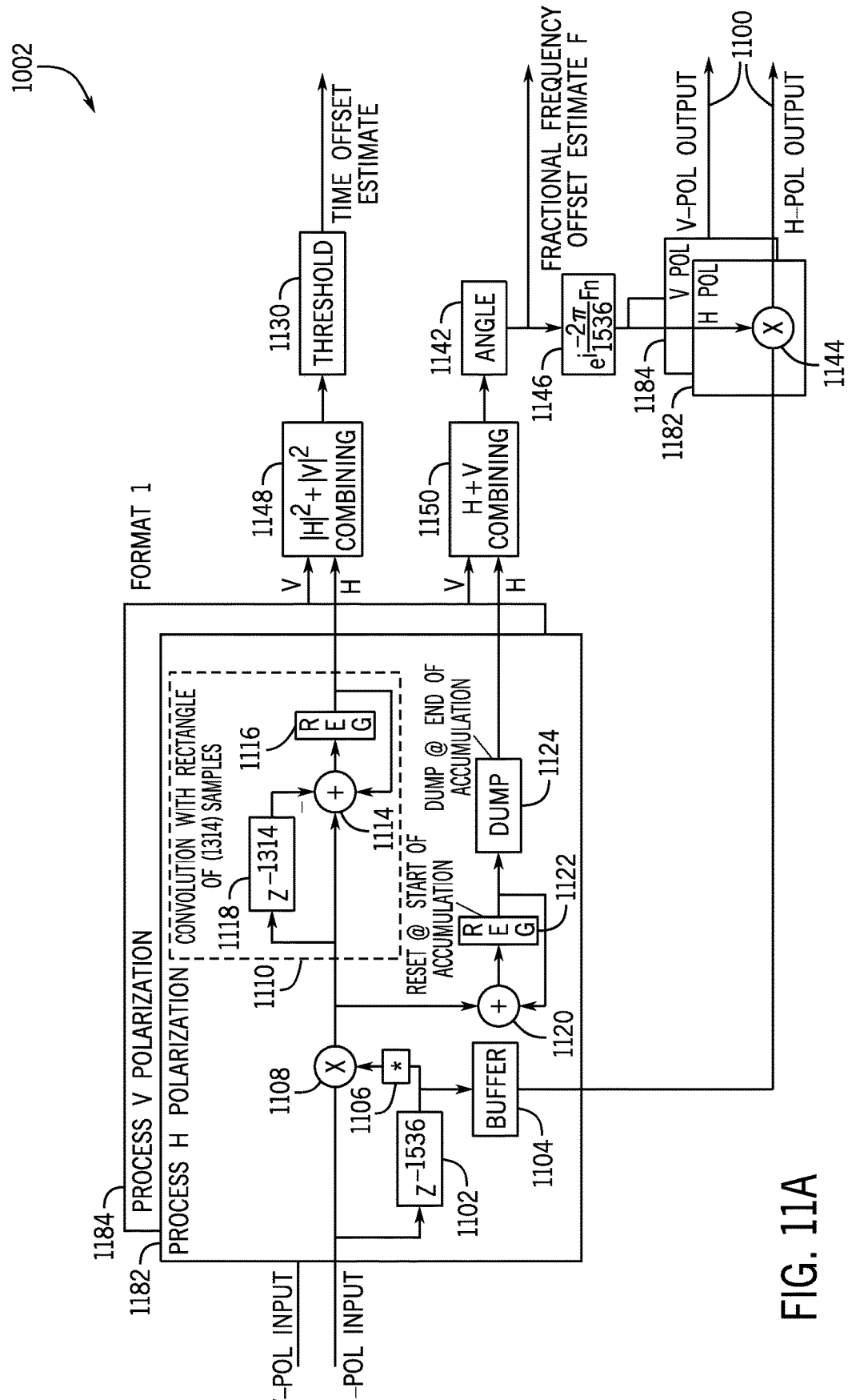
FIG. 11A illustrates a schematic block diagram of an exemplary coarse estimator that may be used for a Format 1 PRACH waveform in the PRACH detector shown in FIG. 10.
Figure 11B:
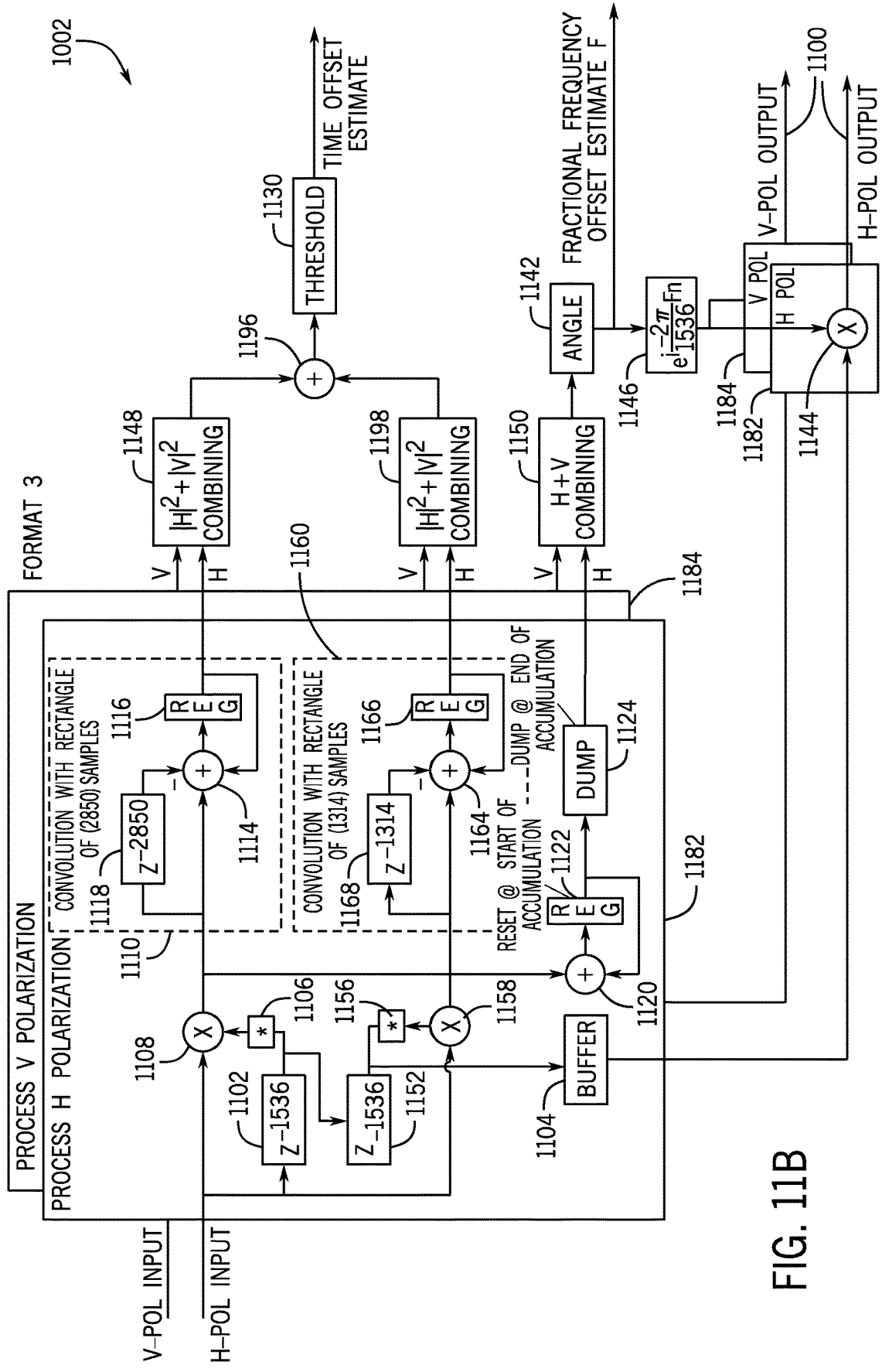
FIG. 11B illustrates a schematic block diagram of an exemplary coarse estimator that may be used for a Format 3 PRACH waveform in the PRACH detector shown in FIG. 10.
Figure 12A:
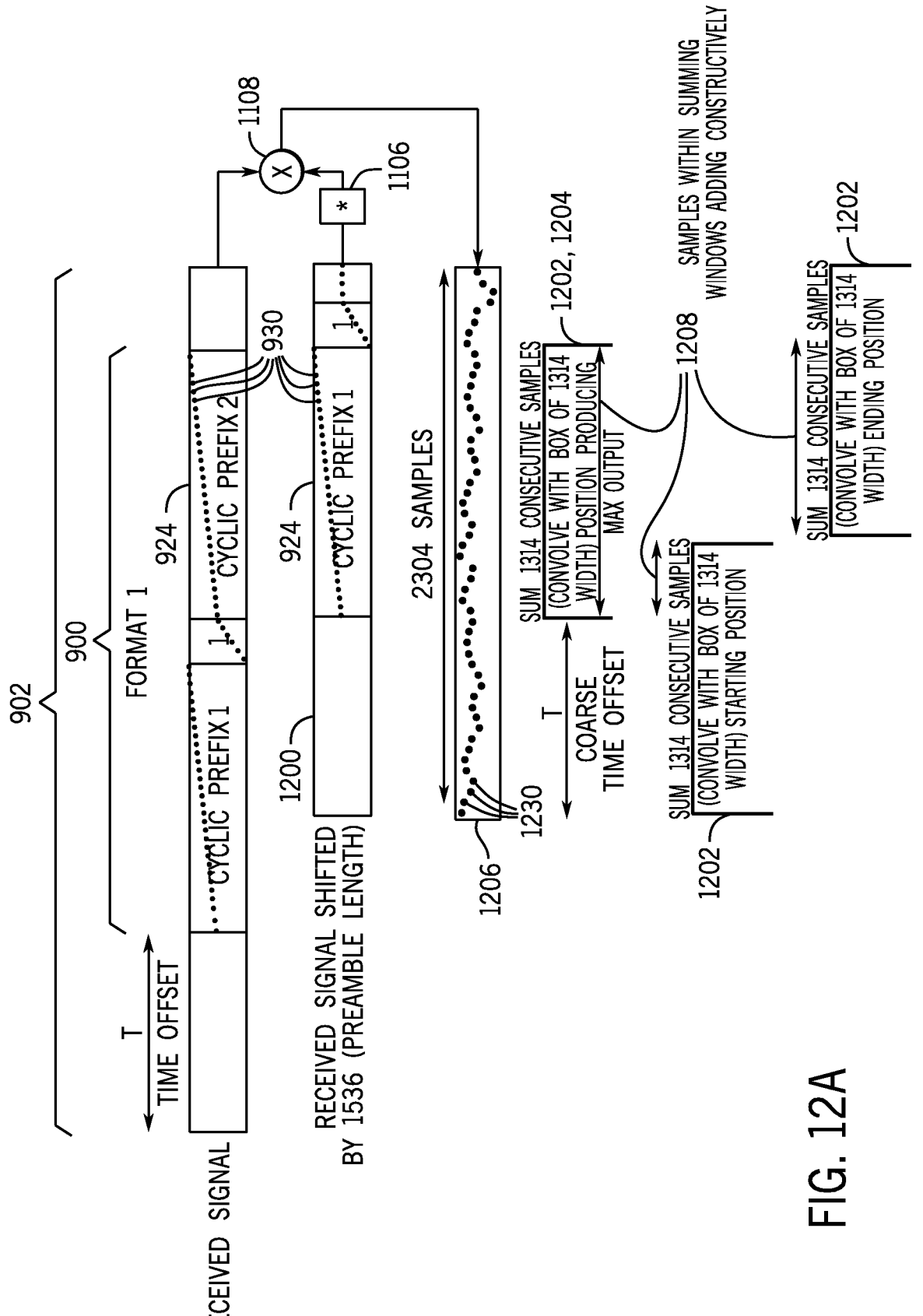
FIG. 12A illustrates a schematic diagram of an exemplary conjugate multiplication and summing process that may be implemented by the coarse estimator shown in FIG. 11A.
Figure 12B:
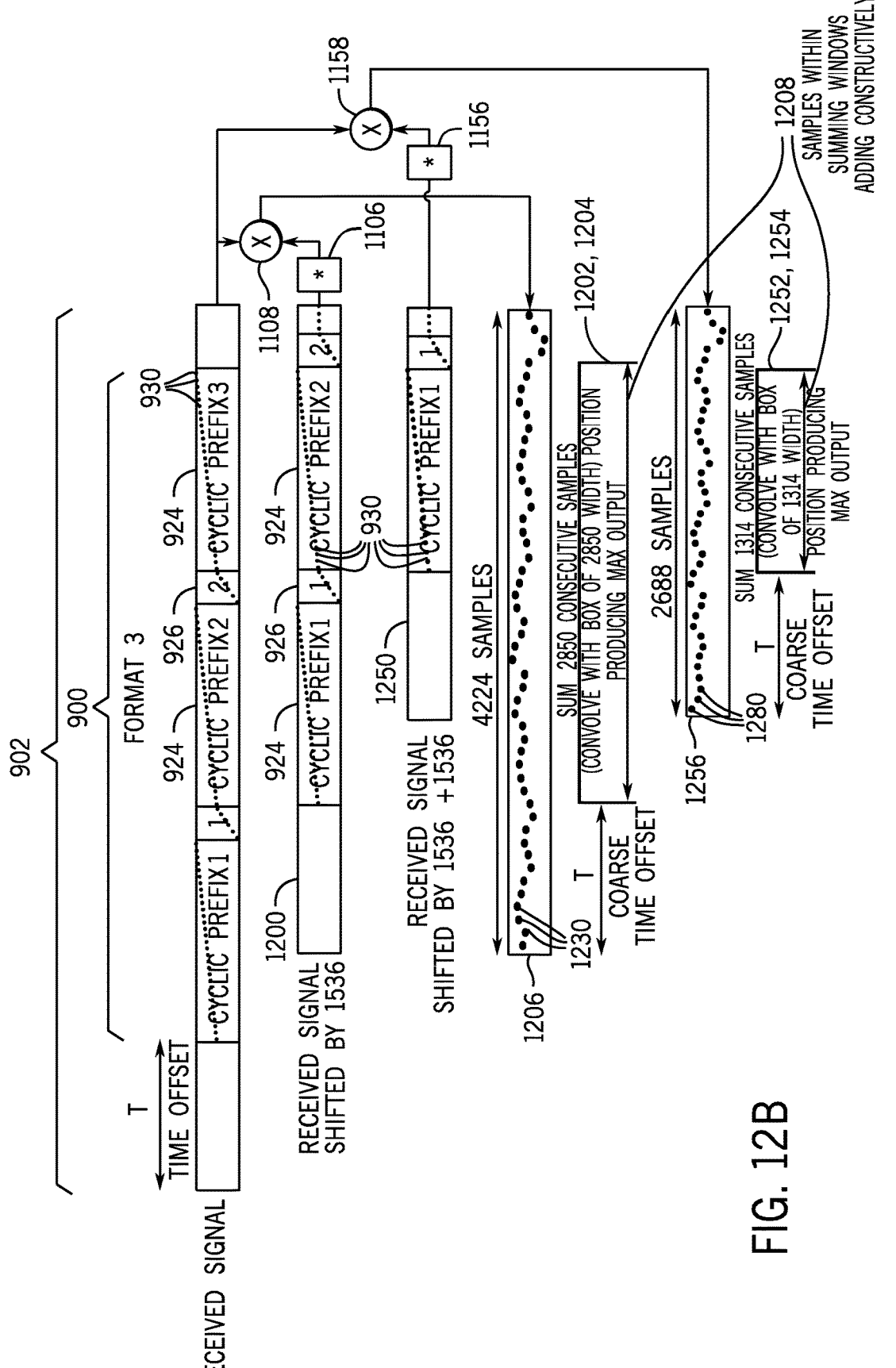
FIG. 12B illustrates a schematic diagram of an exemplary conjugate multiplication and summing process that may be implemented by the coarse estimator shown in FIG. 11B.

FIGS. 11A and 11B illustrate a schematic block diagram of an example embodiment of the coarse detector 1002 for the PRACH waveform 900 in Formats 1 and 3, respectively. FIGS. 12A and 12B illustrate a schematic diagram of an exemplary conjugate multiplication and summing process that may be implemented by the coarse detector 1002 for the PRACH waveform 900 in Formats 1 and 3, respectively.

In some embodiments, the coarse detector 1002 utilizes the conjugate multiplication property shown in FIG. 8B, as well as the repetition of samples that is inherently present in the PRACH waveform 900, to generate the coarse estimate of the residual time offset T. More specifically, referring also to FIGS. 9A and 9B, the Format 1 PRACH waveform 900 includes two copies of the CP 924, and the Format 3 PRACH waveform 900 includes three copies of the CP 924. In other words, the Format 1 PRACH waveform 900 includes two identical sequences of samples having the length of the CP 924, and the Format 3 PRACH waveform 900 includes three identical sequences of samples having the length of the CP 924. In addition, the Format 3 PRACH waveform 900 includes two identical sequences of the leading portion 926 of the preamble sequence 920.

As noted above, the received PRACH waveform 900 (that is, as received by the phased array antenna 105) is distorted to an unknown degree by noise and Doppler frequency shift f, and shifted to an unknown start position within the PRACH slot 902 by residual time offset T (as well as by residual frequency offset f). As illustrated in FIG. 11A, the coarse detector 1002 routes IQ samples 930 of the signal received in the PRACH slot 902 in parallel to a delay block 1102, set to delay the signal by the length of the preamble 920 to create a delayed PRACH slot signal 1200. In the illustrated example, the delay block 1102 is configured to delay the received signal by 1536 samples. In the visualization of FIG. 12A, each IQ sample 930 of the delayed PRACH slot signal 1200 is vertically aligned with the IQ sample 930 of the PRACH slot signal that is 1536 samples away. The repetition of samples 930 in the two copies of CP 924 in the PRACH waveform 900 means that, somewhere within the signal as received in the PRACH slot 902, there will be a window 1204 of IQ samples 930 that match the corresponding IQ samples 930 in the delayed PRACH slot signal 1200, except for the effects of noise and Doppler frequency shift. Moreover, the time offset of the beginning of the matching window 1204 from the beginning of the delayed PRACH slot signal 1200 corresponds, at least approximately, to the residual time offset T. The coarse detector 1002 is configured to find the window 1204 of matching (but for noise and Doppler frequency shift) IQ samples 930 in a way that is robust even at very low signal-to-noise ratios, and is also computationally efficient.

For example, at the 1.92 Msps sample rate in the example of Table 1 above, the Format 1 PRACH waveform 900 has two identical sequences of 1314 samples, separated by the 222 samples of the intermediate leading portion 926. Stated another way, as illustrated in FIG. 12A, if the signal received in the PRACH slot 902 is delayed by 1536 samples (the length of the preamble 920) to create the delayed PRACH slot signal 1200, then somewhere within the 3840 samples received in the PRACH slot 902, there will be a window 1204 of 1314 samples in the delayed PRACH slot signal 1200 that matches an aligned window of 1314 samples in the received signal, but for the effects of frequency shift and noise.

Due to Doppler effects, the PRACH waveform 900 as received at the phased array antenna 105 is assumed to have a residual frequency offset f that may be characterized as having an integer part I and a fractional part F. In mathematical terms, this frequency offset can be represented by multiplying the as-generated PRACH waveform 900 by:

$$e^{j\left(\frac{2\pi}{1536}\right)(I+F)n}$$

where, in this example, 1536 samples corresponds to the length of the preamble 920. For any non-zero integer value of I, the phase contribution due to the integer component I of the frequency offset between any pair of samples spaced 1536 samples away from each other is an integer multiple of 27 radians, or simply a corresponding number of full rotations around the unit circle in the complex plane. Accordingly, in the conjugate multiplication between the samples of the received PRACH waveform 900 and the samples of the delayed PRACH slot signal 1200, any non-zero integer component I of the frequency offset leads to a result that is indistinguishable from the unshifted signal, and I is not directly detectable.

On the other hand, the non-integer portion F of the residual frequency offset f (for purposes of this example, analyzed as centered around the integer value of I, therefore being in the range from −0.5 to +0.5) is a distinguishable phase offset amount that can be detected. More specifically, based on the above expression for the frequency offset, the phase difference between any sample 930 in the second CP 924 portion of the received PRACH waveform 900 and the corresponding sample 930 in the first CP 924 portion (in FIG. 12A, the "vertically aligned" sample 930) of the delayed PRACH slot signal 1200 can be expressed as:

$$\left(\frac{2\pi}{1536}\right)(F)(n+1536) - \left(\frac{2\pi}{1536}\right)(F)n = \tag{2}$$

$$\left(\frac{2\pi}{1536}\right)(F)n + \left(\frac{2\pi}{1536}\right)(F)1536 - \left(\frac{2\pi}{1536}\right)(F)n = 2\pi F$$

As described with respect to FIG. 8B, the phase difference between any two samples becomes the absolute phase of the vector result of conjugate multiplication of the samples. Thus, conjugate multiplication of any sample 930 in the second CP 924 portion of the received PRACH waveform 900 and the corresponding sample 930 in the first CP 924 portion of the delayed PRACH slot signal 1200 will produce a conjugate multiplication result 1230 having an absolute phase equal to $2\pi F$.

In the illustrated embodiment, the coarse detector 1002 includes a conjugation block 1106 operating on the delayed PRACH slot signal 1200, and a multiplication block 1108 in series with the conjugation block 1106, to generate the conjugate multiplication result 1230 for each sample 930 in the delayed PRACH slot signal 1200 and its corresponding sample 930 in the received PRACH slot signal. The complete set of conjugate multiplication results 1230 defines a conjugate multiplication window 1206 having a length corresponding to the number of sample pairs 930 available for the conjugate multiplication. For the case of a Format 1 PRACH waveform, the length of the conjugate multiplication window 1206 corresponds to the length of the PRACH slot 902 less the length of the preamble 920, which at the example 1.92 Msps sample rate corresponds to 2304 samples.

Somewhere within that conjugate multiplication window 1206 lies the matching window 1204. Moreover, because each of the conjugate multiplication results 1230 within the matching window 1204 have a phase equal to $e^{j(2\pi)F}$ as discussed above, those individual results 1230 represent vectors in the complex plane that point in the same direction (at phase angle F). In other words, if the conjugate multiplication results 1230 are added, the conjugate multiplication results 1230 within the matching window 1204 will add constructively. In contrast, conjugate multiplication results 1230 outside the matching window 1204 (that is, results 1230 that do not arise from a sample 930 in the second CP 924 portion of the received PRACH waveform 900 aligned with a corresponding sample 930 in the first CP 924 portion of the delayed PRACH slot signal 1200) will generally have different phases, representing vectors that point in different directions. These vectors do not add constructively, tending to fluctuate (rather than grow) the magnitude of the result vector when added. Accordingly, addition of the conjugate multiplication results 1230 within the matching window 1204 will yield a very large magnitude vector as compared to addition of conjugate multiplication results 1230 outside the matching window 1204.

In some embodiments, the constructive addition that occurs only within the matching window 1204 enables the coarse detector 1002 to identify of the location of the matching window 1204 within the conjugate multiplication window 1206. For example, in the illustrated embodiment, the coarse detector 1002 includes a convolution block 1110 that cycles through a plurality of potential matching windows 1202 within the conjugate multiplication window 1206, generating a vector sum of consecutive conjugate multiplication results 1230 for each of the potential matching windows 1202. Each potential matching window 1202 is selected to have the same length as the matching window 1204. The coarse detector 1002 further includes a threshold detector 1130 that determines the matching window 1204 from among the potential matching windows 1202 based on an extent to which the conjugate multiplication results 1230 in the potential matching window 1202 have added constructively. More specifically, each potential matching window 1202 includes an overlap subset 1208 of conjugate multiplication results 1230 that will add constructively (because they arise from a sample 930 in the second CP 924 portion of the received PRACH slot signal aligned, or overlapping, with a corresponding sample 930 in the first CP 924 portion of the delayed PRACH slot signal 1200), but only the actual matching window 1204 coincides completely with this overlap subset 1208.

In practice, the constructive addition within the overlap subsets 1208 will not be perfect due to the effects of noise on the received PRACH waveform 900, and indeed the signal received in the PRACH slot 902 may have a relatively poor signal-to-noise ratio due to the LEO location of the phased array antenna 105. The noise will fluctuate both the magnitude and phase of the conjugate multiplication results 1230. However, the coarse detector 1002 does not require a precise magnitude of the vector addition result in order to operate successfully, and the fluctuations will be random in phase, causing the vector direction of each conjugate multiplication result 1230 to fluctuate randomly around the value F. This random phase fluctuation effectively cancels over a large number of conjugate multiplication results 1230, and the overall effect of vector summation of the conjugate multiplication results 1230 within the overlap subset 1208 is to generate a summing vector that grows rapidly in magnitude in the direction of phase F.

For example, the threshold detector 1130 can be configured to select, as the matching window 1204, the potential matching window 1202 that produces the greatest magnitude of the vector summation result. In other words, the "threshold" may simply be the greatest magnitude of the vector summation result. Alternatively, it may be noted that a nearest one or more potential matching windows 1202 on either side of the true matching window 1204 will have overlap subsets 1208 that almost coincide with the entire window 1202, and in some cases these "nearby" potential matching windows 1202 may also produce vector summation results that are similar, or even slightly greater, in magnitude to the true matching window 1204, particularly in the presence of noise in the received PRACH slot signal. In some embodiments, the threshold detector 1130 is programmed to detect a cluster of potential matching windows 1202 that meet a threshold based on proximity of their corresponding vector summation results to the greatest magnitude from among the potential matching windows 1202. The threshold detector 1139 can then select the matching window 1204 as the potential matching window 1202 in the center of the cluster, for example. Because the coarse detector 1002 is relied upon only to detect a coarse residual time offset T, precise identification of the "true" matching window 1204 is not required, and typically any potential matching window 1202 within a few samples of the true matching window will produce a functional result for the coarse residual time offset T. Other implementations of the threshold detector 1130 are also contemplated.

In some embodiments, the convolution block 1110 includes a summer 1114 that receives the conjugate multiplication results 1230 from the multiplication block 1108, and a vector register 1116 in a feedback loop with the summer 1114. As each conjugate multiplication result 1230 is presented at the summer 1114, that conjugate multiplication result 1230 is added to the accumulated vector sum in the register 1116, such that the register 1116 is updated with a running vector sum. The convolution block 1110 further includes a subtractor delay block 1118 in series with the multiplication block 1108 and feeding into a subtraction input at the summer 1114. This arrangement enables the potential matching window 1202 to shift by one sample across the conjugate multiplication window 1206. More specifically, the subtractor delay block 1118 delays the conjugate multiplication results 1230 received from the multiplication block 1108 by the length of the CP 924, such that the summer 1114 eliminates each conjugate multiplication result 1230 from the sum in the register 1116 as that conjugate multiplication result 1230 ages out of the potential matching window 1202. Using the example 1.92 Msps sample rate, at each step the convolution block 1110 adds the next conjugate multiplication result 1230 into the accumulated vector sum in the register 1116 and also subtracts out the conjugate multiplication result 1230 from 1314 samples previous, such that the current value of the register 1116 is precisely the vector sum across the conjugate multiplication results 1230 for the corresponding potential matching window 1202 (1314 consecutive samples). In other words, as each new conjugate multiplication result 1230 arrives at the summer 1114 and the conjugate multiplication result 1230 from 1314 samples ago arrives at the subtraction port of the summer 1114, the potential matching window 1202 in FIG. 12A is moved from left to right across the conjugate multiplication window 1206. Other implementations of the convolution block 1110 are also contemplated.

After detection of the matching window 1204, the threshold detector 1130 identifies an offset of the first conjugate multiplication result 1230 in the matching window 1204 from the first sample of the conjugate multiplication window 1206 as the coarse residual time offset T. More specifically, as illustrated in FIG. 12A, the first sample of the conjugate multiplication window 1206 is aligned with the beginning of the delayed PRACH slot signal 1200, and the beginning of the matching window 1204 corresponds to the beginning of the first copy of the CP 924 within the delayed PRACH slot signal 1200, and therefore the offset between these values is an approximate measure of the residual time offset of the received PRACH waveform 900 from the beginning of the PRACH slot 902. However, other methods of identifying the coarse residual time offset from the location of the matching window 1204 are also contemplated.

In some embodiments, the coarse detector 1002 further includes a fractional frequency detector 1142 programmed to identify the non-integer (that is, the fractional) portion F of the residual frequency offset f. As noted above, the vector sum of the conjugate multiplication results 1230 within the matching window 1204 points in a phase direction corresponding to the fractional portion F. The fractional frequency detector 1142 may be programmed to resolve the phase angle of the vector sum of results from within the matching window 1204 and to output the phase angle as the fractional portion F.

Alternatively, in some embodiments, such as that illustrated in FIG. 11A, the fractional frequency detector 1142 simply resolves the phase angle of a summation of the conjugate multiplication results 1230 across the conjugate multiplication window 1206. In particular, while the overlap subsets 1208 of conjugate multiplication results 1230 add constructively in the direction corresponding to the fractional portion F, the conjugate multiplication results 1230 outside the overlap subsets 1208 typically tend to be random in phase (and thus in direction), and thus do not add constructively in any vector summation. In the illustrated embodiment, the coarse detector 1002 includes a second summer 1120 that receives the conjugate multiplication results 1230 from the multiplication block 1108, a second vector register 1122 in a feedback loop with the second summer 1120, and a dump block 1124 that outputs the accumulated vector result in the second register to the fractional frequency detector 1142 at the end of the conjugate multiplication window 1206. However, other implementations of the fractional frequency detector 1142 are also contemplated.

In some embodiments, the coarse detector 1002 is further configured to output a partially corrected PRACH slot signal 1100 based on the output of the fractional frequency detector 1142. More specifically, the coarse detector 1002 applies a reverse frequency shift, in an amount of the detected fractional portion F of the frequency offset f, to remove the fractional portion F of the Doppler shift present in the received PRACH slot signal. For example, as illustrated in FIG. 11A based on the 1.92 Msps sample rate, the coarse detector 1002 includes a multiplication block 1144 that applies a phase shift 1146, equal to $$e^{-j\left(\frac{2\pi}{1536}\right)Fn},$$

to the received PRACH slot signal. In the illustrated embodiment, the received PRACH slot signal is retrieved from a buffer 1104 in series with the delayed PRACH slot signal 1200; however, it is contemplated that the received PRACH slot signal may be buffered in and/or retrieved from any suitable location.

In some embodiments, as noted above, the input signal from the phased array antenna 105 includes separate signals for Vertical and Horizontal Polarization, denoted Vpol and Hpol in FIG. 11A. The coarse detector 1002 can be configured to process the Vpol and Hpol signals separately, and then combine the results for improved detection of the coarse residual time offset T or the residual fractional portion F of the frequency offset f. For example, as illustrated in FIG. 11A, the coarse detector 1002 can include a first block 1182 that receives the Hpol input and implements a first instance of the convolution block 1110 and, in some embodiments, a first instance of the components 1120, 1122, and 1124 used in conjunction with the fractional frequency detector 1142, and/or a first instance of the components 1104 and 1144 used in conjunction with the partially corrected PRACH signal 1100. The coarse detector 1002 can also include a second block 1184 that receives the Vpol input and implements a second instance (not shown) of the convolution block 1110 and, in some embodiments, a second instance (not shown) of the components 1120, 1122, and 1124 and/or 1104 and 1144. The first and second blocks 1182, 1184 produce separate results, based on the Hpol and Vpol inputs, respectively, for the magnitude of the vector sum of the conjugate multiplication results 1230 in the potential matching windows 1202, and also separate results for the vector sum used to detect the fractional portion F. The coarse detector 1002 can also include a magnitude combination block 1148 that combines the magnitudes of the vector sum produced by the blocks 1182 and 1184 to produce a magnitude value operated on by the threshold detector 1130, and a vector combination block 1150 that combines the vector sums produced by the blocks 1182 and 1184 to produce a vector sum operated on by fractional frequency detector 1142. The partially corrected PRACH signal 1100 can also be generated as partially corrected Hpol and Vpol PRACH signals 1100. Other implementations for combining the Hpol and Vpol inputs, as well as implementations that operate on an input other than horizontally and vertically polarized, are also contemplated.

As noted above, the Format 3 PRACH waveform 900 includes three identical sequences of samples having the length of the CP 924, plus two identical sequences of the leading portion 926 of the preamble sequence 920. Therefore, in the Format 3 case illustrated in FIG. 12B, the matching window 1204 of IQ samples 930 in the PRACH slot signal that match the corresponding IQ samples 930 in the delayed PRACH slot signal 1200, but for the effects of noise and Doppler frequency shift, will include more aligned samples 930 than the Format 1 case. Given the greater number of aligned samples, the coarse detector 1002 configuration for finding the matching window 1204 can be even more robust than in the Format 1 case, while still being computationally efficient. Again, the time offset of the beginning of the matching window 1204 from the beginning of the delayed PRACH slot signal 1200 corresponds, at least approximately, to the residual time offset T.

For example, at the 1.92 Msps sample rate in the example of Table 1 above, the Format 3 PRACH waveform 900 has three identical sequences of 1314 samples separated by two identical sequences of 222 samples of the intermediate leading portion 926. Stated another way, as illustrated in FIG. 12B, when the signal received in the PRACH slot 902 is delayed by 1536 samples (the length of the preamble 920) to create the delayed PRACH slot signal 1200, then somewhere within the 5760 samples received in the PRACH slot 902, there will be a matching window 1204 of 2850 samples in the delayed PRACH slot signal 1200 that matches an aligned window of 2850 samples in the received signal, but for the effects of frequency shift and noise. More specifically, the 2850 consecutive samples 930 in the signal received in the PRACH slot 902 that include the second CP 924, the second leading portion 926, and the third CP 924 are aligned with the 2850 consecutive samples 930 in the delayed PRACH slot signal 1200 that include the first CP 924, the first leading portion 926, and the second CP 924.

In some embodiments, the coarse detector 1002 as implemented in the Format 3 case, as illustrated in FIG. 11B, includes a similar architecture and functionality for finding the matching window 1204 as that described above for the Format 1 case in FIG. 11A. For example, the coarse detector 1002 again includes the delay block 1102 set to delay the signal by the length of the preamble 920 (in the example, 1536 samples) to create the delayed PRACH slot signal 1200; the multiplication block 1108 in series with the conjugation block 1106 to generate the conjugate multiplication result 1230 for each sample 930 in the delayed PRACH slot signal 1200 and its corresponding sample 930 in the received PRACH slot signal; and the convolution block 1110, including the vector register 1116 in a feedback loop with the summer 1114, and the subtractor delay block 1118 feeding into the subtraction input at the summer 1114, which moves the potential matching window 1202 in FIG. 12B from left to right across the conjugate multiplication window 1206. However, in order take advantage of the larger number of consecutive samples in the matching window 1204, the subtractor delay block 1118 is configured to delay the input signal by the length of the leading portion 926 plus twice the length of the CP 924 (in the example, 2850 samples), rather than by the length of a single CP 924 as in the Format 1 case. Accordingly, the conjugate multiplication window 1206 in the Format 3 case includes 4224 samples (again corresponding to the length of the PRACH slot 902 less the length of the preamble 920, here at the example 1.92 Msps sample rate). The threshold detector 1130 again analyzes magnitudes of vector sums of the conjugate multiplication results 1230, within the smaller potential matching windows 1202 across the conjugate multiplication window 1206, to detect the matching window 1204. Other implementations are also contemplated.

In some embodiments, a performance of the coarse detector 1002 in the Format 3 case may also be improved by performing an additional delay and convolution. More specifically, while the conjugate multiplication process described above for the delayed PRACH slot signal 1200 operates on the first and second CP 924 aligned respectively with the second and third CP 924, the coarse detector 1002 can also be configured to perform a similar conjugate multiplication process on the first CP 924 aligned with the third CP 924. This additional process can further enhance the detection of the coarse residual time offset T in a noisy environment.

For example, as shown in FIG. 12B, a second delayed PRACH signal 1250 can be created by delaying the signal received in the PRACH slot 902 by twice the length of the preamble 920. In the visualization of FIG. 12B, each IQ sample 930 of the second delayed PRACH slot signal 1250 is vertically aligned with the IQ sample 930 of the PRACH slot signal that is 3072 samples away. The repetition of samples 930 in the first and third copies of CP 924 in the Format 3 PRACH waveform 900 means that, somewhere within the signal as received in the PRACH slot 902, there will be a second matching window 1254 of IQ samples 930 that match the corresponding IQ samples 930 in the second delayed PRACH slot signal 1250, but for the effects of noise and Doppler frequency shift. Moreover, the time offset of the beginning of the second matching window 1254 from the beginning of the second delayed PRACH slot signal 1250 also corresponds, at least approximately, to the residual time offset T.

In some embodiments, the coarse detector 1002 includes additional components configured to perform a second conjugate multiplication process on the IQ samples 930 the signal received in the PRACH slot 902 and the corresponding aligned IQ samples 930 in the second delayed PRACH slot signal 1250, to obtain second conjugate multiplication results 1280. The complete set of second conjugate multiplication results 1280 defines a second conjugate multiplication window 1256 having a length corresponding to the number of sample pairs 930 available for the second conjugate multiplication, that is, corresponding to the length of the PRACH slot 902 less the length of two preambles 920, which at the example 1.92 Msps sample rate corresponds to 2688 samples. The coarse detector 1002 can be configured to produce a vector sum of the second conjugate multiplication results 1280 for a second plurality of matching windows 1252 within the second conjugate multiplication window 1256. One or more potential matching windows 1252 for which the vector sum best indicates constructive addition from overlap subsets 1208 can be viewed as the second matching window 1254.

To implement the second conjugate multiplication process in the Format 3 case, the coarse detector 1002 can include another set of components similar to those used for the first conjugate multiplication process. For example, the coarse detector 1002 can include a second delay block 1152 in series with the delay block 1102 and set to further delay the delayed PRACH slot signal 1200 by the length of the preamble 920 (in the example, 1536 samples) to create the second delayed PRACH slot signal 1250; a second conjugation block 1156 configured to generate the conjugates of the samples 930 in the second delayed PRACH slot signal 1250; and a second multiplication block 1158 that multiplies the output samples of the second conjugation block 1156 against the aligned samples 930 of the signal received in the PRACH slot 902 to generate the conjugate multiplication results 1280. The coarse detector 1002 can also include a second convolution block 1160, including a second vector register 1166 in a feedback loop with a second summer 1164, and a second subtractor delay block 1168 feeding into the subtraction input at the second summer 1164, to cycle the second potential matching window 1252 in FIG. 12B from left to right across the second conjugate multiplication window 1256.

The coarse detector 1002 can also include a combiner 1196 configured to combine the results of the first conjugate multiplication process and the second conjugate multiplication process in order to detect the coarse residual time offset T. In other words, while each process can produce its own approximation, based respectively on the first and second matching windows 1204, 1254, the combiner 1196 can be configured to incorporate the results of both processes to yield a final output for T. For example, the combiner 1196 can be configured to add the magnitude of the vector sum in each potential matching window 1252 to the magnitude of the vector sum in the potential matching window 1202 for the aligned sample location, and pass the result to the threshold detector 1130. For another example, the combiner 1196 can be configured to add the vector sum in each potential matching window 1252 to the vector sum in the potential matching window 1202 for the aligned sample location, and pass a magnitude of the combined vector result (or the combined vector result itself) to the threshold detector 1130. Other implementations are also contemplated.

In the illustrated embodiment, the Format 3 approach for detecting the fractional portion F of the frequency offset f, is similar to the Format 1 approach. More specifically, the fractional frequency detector 1142 can be programmed to resolve the phase angle of the vector sum of results from within the one or more of the matching windows detected by the threshold detector 1130, using the conjugate multiplication results 1230 within the corresponding matching windows 1204 and/or the second conjugate multiplication results 1280 within the corresponding second matching windows 1254, and output the phase angle as the fractional portion F. Alternatively, in some embodiments, such as that illustrated in FIG. 11B, the fractional frequency detector 1142 again simply resolves the phase angle of a summation of the conjugate multiplication results 1230 across the conjugate multiplication window 1206. Other implementations are also contemplated.

In some embodiments, the coarse detector 1002 in the Format 3 case again includes the multiplication block 1144 that applies the phase shift 1146, equal to

$$e^{-j\left(\frac{2\pi}{1536}\right)Fn}$$

using the detected fractional portion F, to the received PRACH slot signal to produce a partially corrected PRACH signal 1100. Additionally or alternatively, in certain embodiments, the coarse detector 1002 in the Format 3 case again includes a first block 1182 that receives the Hpol input and implements a first instance of one or more the components described above, a second block 1184 that receives the Vpol input and implements a second instance of the one or more of the components described above, and magnitude combination blocks 1148 and 1198 and vector combination block 1150 configured to combine the Hpol and Vpol results.

In some embodiments, the root detector 1004 relies upon additional properties of the ZC sequence in order to identify the uth root underlying each detected PRACH waveform 900. As an initial matter, an interesting relationship can be derived based on the phase difference between adjacent samples in a ZC sequence. More specifically, the phase difference between any sample n in a ZC sequence and the its adjacent sample (n−1) is:

$$\left(\frac{-\pi u(n)(n+1)}{N_{ZC}}\right) - \left(\frac{-\pi u(n-1)n}{N_{ZC}}\right) = \left(\frac{-\pi un}{N_{ZC}}\right)(n+1-n+1) = \left(\frac{-2\pi un}{N_{ZC}}\right) \quad (4)$$

In other words, the phase shift between adjacent samples in a ZC sequence varies linearly as n increases. This value holds even in the face of a frequency offset applied to the entire underlying ZC signal. Relying once again on the conjugate multiplication property of FIG. 8B, a signal in which the samples have an absolute phase corresponding to this adjacent-sample phase difference can be generated by multiplying each sample of the ZC sequence by the complex conjugate of its adjacent sample. This conjugate multiplication result signal has a form that matches a pure complex tone. A pure complex tone can be defined as:

$$S(n)=Me^{j(\alpha n+\alpha)} \quad (5)$$

Based on a comparison of equations (4) and (5), the term $-2\pi u/N_{ZC}$ for the phase of the result of the conjugate multiplication against the adjacent sample represents the frequency a of a pure complex tone. This is a useful property because the Fourier transform (FFT) of a pure complex tone is well understood. When the frequency is an integer value, the value of the FFT bin corresponding to the frequency will be related to the magnitude of the signal, while all the other FFT bin values will be zero. If the frequency is somewhat close to an integer value, all the FFT bin values will be small except the case of the FFT bin closest to the frequency. As the frequency is further removed from being an integer value, all the peripheral bin values become larger and the peak value still occurs at the bin closest to the frequency, but is relatively smaller. Since the frequency of the signal generated in this fashion includes the root index u scaled by known constant values, identifying the peak bin enables identification of u.

Accordingly, in some embodiments, the root detector 1004 is configured to detect information identifying the uth root of one or more PRACH waveforms 900 present in the signal received in the PRACH slot 902 by processing a package of the sample values in the received signal into root-detection frequency bins, comparing values of the root-detection frequency bins to a root-detection threshold, and determining the information identifying the uth root based on a bin index of a corresponding one of the root-detection frequency bins meeting the root-detection threshold.

In simple cases, to arrive at the root index u underlying the received PRACH waveform 900, one could simply perform conjugate multiplication of the samples of the received signal with their respective adjacent samples, apply an FFT to the "adjacent" conjugate multiplication result signal, and select the frequency bin with largest magnitude as corresponding to the root index u. However, this approach is complicated by the potentially large Doppler frequency shift associated with the motion of the LEO satellite 102. In the case of a critically sampled signal, for large frequency offset cases (for example, having an integer component I greater than one), the bin result for u for the frequency shifted case cannot be distinguished from a non-frequency shifted, but circularly time-shifted, ZC sequence with a root index of $u^{-1}$, where $u^{-1}$ is the modular multiplicative inverse of u.

The modular multiplicative inverse $u^{-1}$ is defined as the integer (between one and $N_{ZC}$) that satisfies the equation:

$$u \cdot u^{-1} \text{ modulo } N_{ZC}=1 \quad (3)$$

In the case of the PRACH waveform 900 of both Formats 1 and 3, $N_{ZC}$ is equal to 839. So, for example, if the UE 110 selected the uth root to be 17, the modular multiplicative inverse $u^{-1}$ of the root u is 691, because 17·691=11,747, and 11,747 modulo 839=1. In the presence of a large Doppler offset, the use of conjugate multiplication on the received PRACH signal by adjacent samples, followed by application of the FFT, could result in an inability to determine if the root index used by the UE 110 to generate the PRACH waveform was 17 or 691.

In some embodiments, the root detector 1004 solves this problem by relying on an "up-sampled" signal for the Fourier analysis. While a critically sampled signal is prone to aliasing between the actual root index and its modular multiplicative inverse, an oversampled signal removes this aliasing problem. One known method of up-sampling a signal including m samples is to take an m-point FFT of the signal, construct a new n-point frequency domain sequence by inserting zeros for additional high frequency bins to extend the frequency domain sequence to n points, and then take an n-point inverse Fourier transform (IFFT) to generate the up-sampled signal of n points. Notably, since the FFT and IFFT are inverse operations, it should also be possible to go in the opposite direction. That is, if the signal of interest has m samples when critically sampled, one could start with an up-sampled version of the signal of interest having n samples, apply an n-point FFT to generate n frequency bins, and then eliminate n−m higher-frequency bins to arrive at the m bins corresponding to the frequency domain of the critically sampled signal of interest.

At this point, an additional property of ZC sequences is useful. The FFT of the ZC sequence results in a conjugated, frequency shifted, and scaled version of the "dual" ZC sequence. The dual ZC sequence is simply the ZC sequence based on $u^{-1}$. When the length $N_{ZC}$ of the Zadoff-Chu sequence is a prime number (as is the case for the ZC sequence used to generate the PRACH waveform 900, in which $N_{ZC}$ is 839 for Formats 1 and 3), $u^{-1}$ is again the unique modular multiplicative inverse of the root u of the original ZC sequence. In other words, simply applying the FFT to a received ZC sequence produces a frequency shifted and scaled version of the dual ZC sequence.

In some embodiments, the root detector 1004 leverages this property in a novel way by treating the signal received in the PRACH slot 902, including one or more PRACH waveforms 900 each based on the root index u selected by the corresponding UE 110, as the (fictionally) "up-sampled" version of the inverse Fourier transform of a dual ZC sequence based on the root index $u^{-1}$. In other words, by generating an n-point (where n is greater than Nzc) package of samples from the signal received in the PRACH slot 902, applying an n-point FFT to generate a first set of frequency domain bins, and selecting a proper subset of Nzc bins to keep (eliminating n–Nzc higher frequency bins), the root detector 1004 can arrive at the signal corresponding uniquely to a frequency shifted version of the dual ZC sequence based on $u^{-1}$. The adjacent-sample conjugate multiplication and FFT, as described above, can then be applied to this dual ZC sequence to isolate the value of $u^{-1}$, which in turn uniquely determines u for the received PRACH waveform 900.

As an alternative to decimating the signal by eliminating bins in the frequency domain and detecting $u^{-1}$ from the dual ZC sequence as described above, the root detector 1004 can include an initial decimator block (not shown) to down-sample the input signal in the time domain, and then apply the conjugate multiplication and Fourier transform techniques described above to detect the ZC sequence (having root u) directly. However, the approach of working with the dual ZC as detailed above can be a more computationally efficient method.

Figure 13:
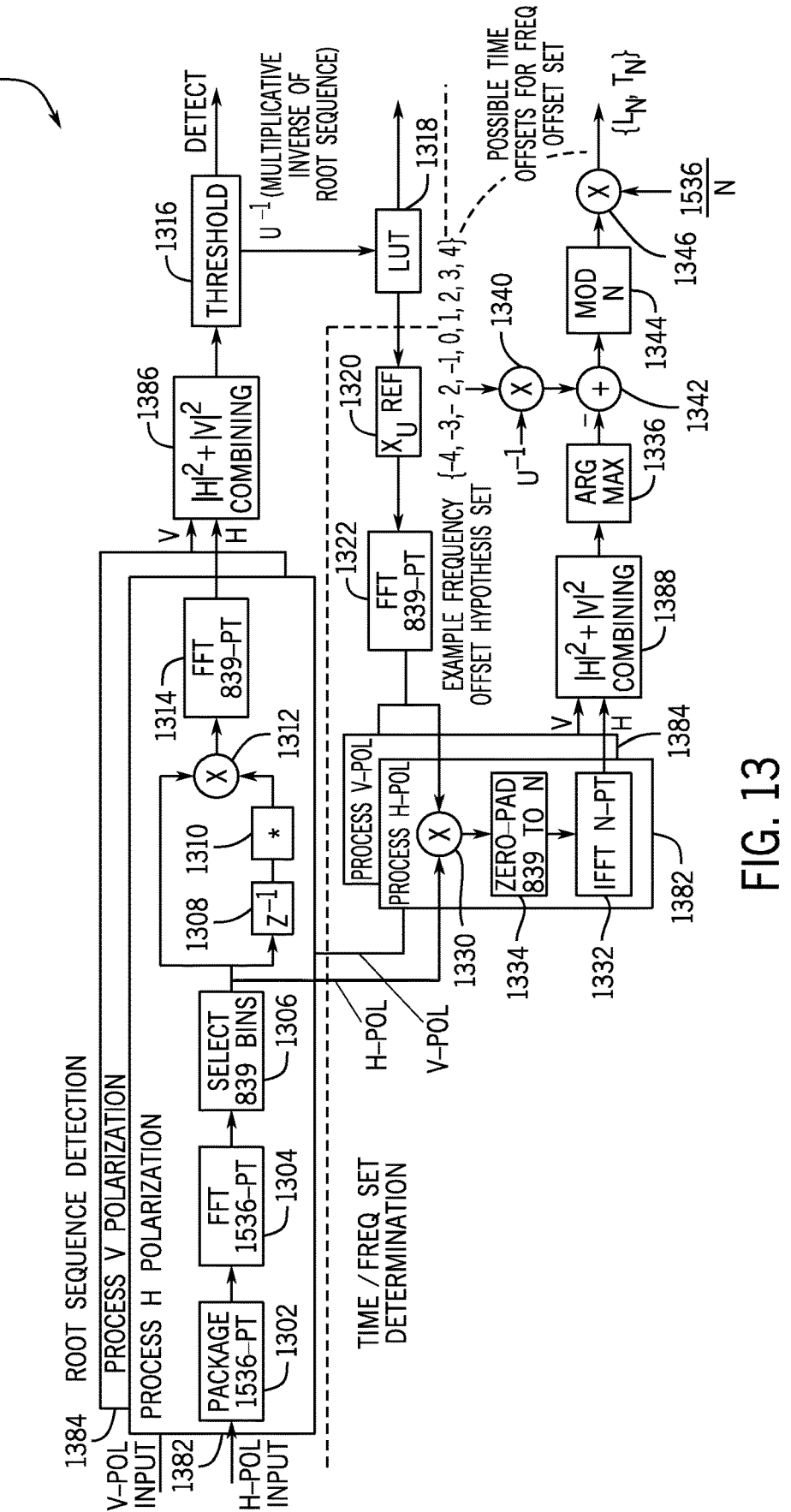
FIG. 13 illustrates a schematic block diagram of an exemplary root detector and frequency/time offset pair generator that may be used for a Format 1 PRACH waveform in the PRACH detector shown in FIG. 10.

FIG. 13 illustrates a schematic block diagram of an exemplary root detector 1004 that can apply the steps discussed above. The root detector 1004 can include a sample packager 1302 that generates the package of samples from the signal received in the PRACH slot 902. In some embodiments, the sample packager 1302 operates on the signal received in the PRACH slot 902 as previously modified in the corrected PRACH slot signal 1100 (corrected for the fractional portion F of the residual frequency offset, as discussed above). However, additional or alternative pre-processing of the signal received in the PRACH slot 902 is also contemplated.

In the exemplary embodiment, the sample packager 1302 generates a package of samples corresponding in number to the length of the preamble 920. For example, in the case of a 1.92 Msps sample rate, the package of samples includes 1536 samples. In the Format 1 case, the package of samples can be 1536 consecutive samples taken from the PRACH slot signal, for example evenly distributed about a center of the PRACH slot 902. Although the 1536 consecutive samples is likely to include a portion of the guard portion 910, it also will include a portion of the preamble 920 sufficient to enable the root-detection process to function accurately. Moreover, the use of 1536 samples reduces the computational complexity of the FFT performed subsequently in block 1304. In certain embodiments, the coarse time offset T determined by the coarse detector 1002 can be used to estimate a beginning of the PRACH signal within the PRACH slot 902, and the 1536 consecutive samples can start from the estimated beginning of the PRACH signal to facilitate selecting a larger portion of the 1536 samples from within the preamble 920.

In the Format 3 case, the sample packager 1302 also generates a package of samples corresponding in number to the length of the preamble 920. In some embodiments, the sample packager 1302 again selects 1536 consecutive samples evenly distributed about a center of PRACH slot 902, or selects the consecutive samples based on the coarse time offset T, as discussed above. Alternatively, the sample packager 1302 can be configured to add back-to-back sets of consecutive 1536 samples to arrive at the 1536 samples in the package of samples. This approach leverages the extra copy of the preamble in Format 3 to improve the signal-to-noise ratio in the package of samples.

Other package sizes and approaches for generating the package of samples are also contemplated.

As discussed above, the package of samples generated by the sample packager 1302 is treated as the up-sampled version of the dual ZC signal. Accordingly, the root detector 1004 also includes a sample-package FFT block 1304 configured to apply an n-point FFT to the package of samples, where n is the length of the package of samples. For example, in the case of 1536 samples in the package, the sample-package FFT block applies a 1536-point FFT.

The root detector 1004 can also include a bin subset selector 1306 that selects the subset of Nzc bins from the n bins produced by the sample-package FFT block 1304. As noted above, this is the equivalent of time domain down-sampling, but performed in the frequency domain (hence the need for the FFT block 1304 to generate the bins). Although a true down-sampling process in the frequency domain would not be complete unless an Nzc-point inverse Fourier transform is performed to generate the down-sampled time domain signal, in the example embodiment the root detector 1004 avoids that computationally intensive step by relying on the dual ZC property discussed above. In other words, recalling that the package of samples is being treated as an up-sampled version of the inverse Fourier transform of the dual ZC signal, the bin subset selector 1306 removes the "high frequency zero padding" associated with the frequency domain of the up-sampled signal. For both Format 1 and Format 3, Nzc is 839. Further details about the bin subset selector 1306 determines which subset of Nzc bins to keep are provided below.

The values in the Nzc bins can be treated as samples in another signal. The root detector 1004 can also include a single sample delay block 1308 and a conjugation block 1310 in series with the bin subset selector 1306 to generate adjacent sample conjugates for multiplication against the Nzc bin values in a multiplication block 1312. As described above, the adjacent-sample conjugate multiplication converts the phase difference between the values of the adjacent bins in the subset of Nzc bins into absolute phase values in the samples of the adjacent-sample conjugate multiplication result. In turn, the absolute phase values are proportional to the root index of the dual ZC sequence (which corresponds to the modular multiplicative inverse of the root index u in the original PRACH waveform 900).

The root detector 1004 can also include an Nzc-point FFT block 1314 that applies the Nzc-point FFT to the result signal from the adjacent-sample conjugate multiplication in block 1312. As discussed above, in the theoretical case of no noise, a purely integer frequency offset, and a perfect selection of the bins to retain at the bin subset selector 1306, the output of the Nzc-point FFT block 1314 would be a non-zero value at the root-detector bin index corresponding to $u^{-1}$, and a zero value in all the other root-detector bins. If the frequency is somewhat close to an integer value, all the FFT bin values will be small except the case of the FFT bin closest to the frequency. As the frequency is further removed from being an integer value, all the peripheral bin values become larger and the peak value still occurs at the bin closest to the frequency, but is relatively smaller. The root detector 1004 can also include a root threshold detector 1316 that compares the magnitude of each bin from the Nzc-point FFT to a root-detection threshold, and detects the presence of a respective PRACH waveform 900 in the PRACH slot 902 corresponding to each bin that exceeds the root-detection threshold. As noted above, in some embodiments, the corrected PRACH slot signal 1100 is used as the input to the sample packager 1302, because that signal has already been corrected to remove, at least approximately, the fractional portion F of the residual frequency offset f, which can improve the detectability of the bin with the peak value.

Returning to the operation of the bin subset selector 1306, due to the frequency shift in the dual ZC sequence, it may not be immediately clear which subset of the first set of n frequency-domain bins (produced by the sample-package FFT block 1304) corresponds to the low frequency bins that should be retained for use as the Nzc bins (samples) of the dual ZC sequence, as opposed to the higher frequency bins associated with the up-sampling that should be discarded. In practical application in the context of the satellite telecommunications system 100, however, a root-detection threshold can be set so that the index of the frequency bin meeting the root-detection threshold in block 1316 will accurately correspond to the value of $u^{-1}$ of a detected PRACH waveform 900.

First, in the limit case of a zero integer component I of the residual frequency offset f, it is clear that the lowest frequency subset of Nzc bins will be centered around the zero bin, or "direct current" bin. If the root detector 1004 is configured to handle the frequency range as from −180 degrees to +180 degrees, the zero bin is the middle bin. Alternatively, if the root detector 1004 is configured to handle the frequency range as from 0 to 360 degrees, then the zero bin is the first bin. The examples that follow treat the middle bin of the Nzc bins as the zero bin, however, the analysis is similar when the zero bin is the first bin.

The introduction of a non-zero frequency shift causes a circular rotation of the bin magnitude values around the bins, meaning that the center of the "true" subset of Nzc bins is shifted away from the middle bin. However, the phase difference between adjacent time-domain samples remains the same despite the rotation, so the adjacent-sample conjugate multiplication result from block 1312 will still produce the same absolute phase, and the magnitude of the peak bin after the Nzc-point FFT 1314 can still be detected provided the selection of Nzc bins to serve as the samples of the dual ZC sequence does not omit too many of the true (but unknown) low frequency bins.

In some embodiments, configuring the bin subset selector 1306 to select the Nzc bins centered around the middle (zero) bin is still effective even if the actual frequency shift I is another integer, such as any integer between −4 and +4. More specifically, for a small deviation between the Nzc bins selected by the bin subset selector 1306 and the "true" Nzc bins corresponding to the actual frequency shift, there will be a loss of only a few of the bins that should have been selected. As a result of missing a few of the bins, the magnitude of the bin value in the peak bin is reduced (which corresponds to a reduction in the spurious-free dynamic range (SFDR), which measures the strength of the fundamental signal relative to the strongest spurious signal in the output). Notably, because the magnitude of the ZC sequence is constant, this reduction is a function only of the mismatch between the selection made by the bin subset selector 1306 and the bins that reflect the actual frequency shift, and is not dependent on the root index of the PRACH waveform involved. Finally, in a noisy system the reduction in the magnitude in the peak bin manifests itself in a reduced range of frequency shift within which the root threshold detector 1316 can reliably identify a true peak, as opposed to a spurious noise-induced peak. In other words, as the mismatch in the selection of the Nzc bins grows larger, the magnitude of the peak bin eventually sinks to a level indistinguishable from noise. The reduced range is directly dictated by the amount of noise (more specifically, the signal-to-noise ratio) in the system.

In some embodiments, it has been empirically established that, based on the typical range of signal strength broadcast from user equipment configured to communicate with standard terrestrial cell towers, configuring the bin subset selector 1306 to select the Nzc bins centered around the middle bin (that is, the bins that would be correct if the integer frequency shift is zero) enables the root threshold detector 1316 to accurately detect $u^{-1}$ even in the presence of an integer frequency shift between −4 and +4. Moreover, in view of the orbital motion of the LEO satellite 102 and pre-compensation for Doppler shift at the cell reference point, the actual integer component I of the residual frequency offset f typically lies within the bounds of −4 and +4. However, other implementations of the bin subset selector 1306 are also contemplated.

After the root threshold detector 1316 detects the magnitude output by the Nzc-point FFT 1314 for one or more of the root-detection frequency bins as exceeding the root-detection threshold, the root threshold detector 1316 assigns the bin index of each of the one or more threshold-exceeding root-detection frequency bins as a modular multiplicative inverse $u^{-1}$ of the uth root of a corresponding detected PRACH waveform 900. The assigned modular multiplicative inverse $u^{-1}$ uniquely determines the uth root. For example, if the magnitude of the 17th root-detection frequency bin exceeds the root-detection threshold, the root threshold detector 1316 assigns 17 to be the $u^{-1}$ of a detected PRACH waveform 900, which uniquely corresponds to a root index u of 691 for the detected PRACH waveform. (Recall 17·691=11,747, and 11,747 modulo 839=1.

In some embodiments, the root detector 1004 can include a look-up table 1318 that associates each value of $u^{-1}$ with the corresponding value of u. For example, the root threshold detector 1316 assigns 17 to be the $u^{-1}$ of a detected PRACH waveform 900, and routes the value 17 to the look-up table 1318, which returns a corresponding root index u of 691 for the detected PRACH waveform. Other implementations for determining the root index u from the modular multiplicative inverse $u^{-1}$ are also contemplated. It should be noted that, in some embodiments, it is not necessary for the root detector 1004 to specifically derive or output the root u, as the reference ZC sequence based on the root u can be stored in direct association with the corresponding modular multiplicative inverse $u^{-1}$. In other words, the modular multiplicative inverse $u^{-1}$ itself can be linked directly to the ZC sequence corresponding to u.

In some embodiments, the root detector 1004 is configured to generate, for each of the one or more access signals detected by the root threshold detector 1316, potential pairs of a number of periods frequency offset $L_n$ and a time offset $T_n$ of the PRACH waveform 900 received in the PRACH slot 902 relative to the PRACH waveform 900 as generated by the corresponding UE 110. As noted above, the root detector 1004 by itself can only produce this plurality of possible pairs of frequency offset and time offset, because each pair could produce the same received signal from the reference signal based on the detected root u. More specifically, due to the form of the equation used to generate the ZC sequence, for a given root index u, an integer frequency shift of +L (with no time offset) is "equivalent" to (that is, produces the same observable ZC sequence as) a time shift of $+L-u^{-1}$. In other words, a PRACH waveform for a given root u, subjected to a frequency shift of L=+1 and no time shift, is indistinguishable from the PRACH waveform for that root u subjected to zero frequency shift and a $u^{-1}$ time shift. More generally, the PRACH waveform for a given root u, subjected to any integer +L frequency shift and any time shift T, is indistinguishable from the PRACH waveform for that root u, subjected to zero frequency shift and a time shift of $T+L \cdot u^{-1}$.

In some embodiments, the root detector 1004 employs another variation on this relationship, specifically that the PRACH waveform for a given root u, subjected to any integer +L frequency shift and a time shift of $T-L \cdot u^{-1}$, is indistinguishable from the PRACH waveform for that root u subjected to no frequency shift and to a time shift of T. For example, the root detector 1004 can be configured to correlate the package of sample values generated by the sample packager 1302 with a reference ZC sequence based on the corresponding information identifying the uth root in order to determine a reference time offset $T_0$ associated with a zero number of periods frequency offset $L_0$. More specifically, the correlation determines a precise offset T between the package of samples from the received PRACH waveform, and that precise offset corresponds to the zero frequency offset case ($L_0$, $T_0$) because the reference waveform generated from the detected root index u has no frequency offset. However, if the actual frequency offset in the received PRACH waveform 900 was any integer $L_n$, rather than zero, then the actual time offset $T_n$ corresponding to that $L_n$ must be equal to $T_0-L_n-u^{-1}$. Therefore, using the output reference time offset $T_0$ from the correlation and the modular multiplicative inverse of the detected root u, the root detector 1004 can cycle through pre-selected values of $L_n$ to produce the corresponding $T_n$ using the equation $T_0-L_n \cdot u^{-1}$.

In some embodiments, the root detector 1004 includes a reference ZC signal generator 1320 configured to generate the reference ZC signal corresponding to the information identifying the root index u. For example, the reference ZC signal generator 1320 can be configured to store the Nzc-length sequence associated with each possible root index u in a look-up table, indexed to either u or $u^{-1}$. In some such implementations, the look-up table for the reference ZC signal generator 1320 can be implemented in the same table as the look-up table 1318. Other implementations of reference ZC signal generator 1320 are also contemplated.

In some embodiments, a computational efficiency of the correlation process is improved by implementing the correlation in the frequency domain. The root detector 1004 can include a correlator FFT 1322 configured to transform the reference ZC signal into the frequency domain for input into the correlation process. For example, the correlator FFT 1322 can be configured to store the Fourier transform of the Nzc-length sequence associated with each possible root index u in a look-up table, indexed to u or $u^{-1}$. In some such implementations, the look-up table for the correlator FFT 1322 can be implemented in the same table as the look-up table 1318 or the reference ZC signal generator 1320. Other implementations of the correlator FFT 1322 are also contemplated.

The other input to the correlation, a frequency domain version of the signal received in the PRACH slot 902, can be obtained from the output of the bin subset selector 1306. An advantage to this approach is that the bin subset selector 1306 has already selected an appropriate set of Nzc bins from a frequency domain version of the PRACH slot signal. However, other methods of obtaining a frequency domain version of the received PRACH slot signal are also contemplated.

For correlation of two signals in the frequency domain, the sequence of samples in each signal can be multiplied "pointwise" (that is, the first sample in the first signal is multiplied by the first sample in the second signal, the second sample in the first signal is multiplied by the second sample in the second signal, and so forth) to produce a result sequence, and the result sequence can be inverse-transformed to generate the time domain equivalent of the correlation output. In some embodiments, the root detector 1004 includes a correlator multiplication block 1330 configured to perform the pointwise multiplication, and a correlator IFFT 1332 to perform the inverse transformation of the correlation result to the time domain. The root detector 1004 can also include a peak correlation index detector 1336 that identifies the index that holds the peak value of the time-domain correlation output. This peak location in the time-domain correlation output corresponds to the reference time offset $T_0$, which would be the time offset if the received PRACH waveform had no frequency offset, as discussed above. Other implementations of the correlation process are also contemplated.

It may be noted that the correlation results include Nzc samples, which for Formats 1 and 3 is 839, a prime number. The computational complexity of the inverse Fourier transform is greatly increased for prime numbers (and greatly reduced for numbers that are powers of two). As noted above, a larger size transform may be used if the input is appropriately zero-padded to the desired transform size. Accordingly, in some embodiments, the root detector 1004 includes a zero-padder 1334 upstream from the correlator IFFT 1332. The zero-padder 1334 is configured to pad the frequency-domain correlation results with zeros in order to apply an N-point inverse Fourier transform, where N is selected to reduce the computational complexity of the transform. For example, the zero-padder 1334 may be configured to zero-pad the frequency domain correlation results to 1024 points, and the correlator IFFT 1332 may correspondingly be configured to implement a 1024-point inverse transform, as 1024 is the smallest power of 2 larger than 839. For another example, the zero-padder 1334 and the correlator IFFT 1332 may be configured to zero-pad and implement a 1536-point inverse transform, since the root detector 1004 already implements a 1536-point transform. Other implementations of the correlator IFFT 1332 are also contemplated.

In order to generate the possible (f, T) pairs from the reference time offset $T_0$, the root detector 1004 can then implement the equation $T_0-L_n \cdot u^{-1}$, as discussed above, for each member $L_n$ of the set of frequency offset possibilities. As discussed above, in some implementations the set $L_n$ can be pre-selected to include −4, −3, −2, −1, 0, 1, 2, 3, 4, although other sets are also contemplated. In the illustrated embodiment, the root detector 1004 implements the equation via a pair-generator multiplication block 1340 configured to multiply each member of the set of $L_n$ by the detected $u^{-1}$, and a pair-generator addition block 1342 configured to subtract the output of the pair-generator multiplication block 1340 from the reference time offset $T_0$ (that is, the output from the peak correlation index detector 1336) to arrive at the $T_n$ corresponding to the $L_n$. It should be noted that the output of the peak correlation index detector 1336 can be in the "N domain" (where N is the number of points in the sequence after operation of the zero-padder 1334), and the root detector 1004 can include a modulo N block 1344 to place the $T_n$ generated by the equation within the N domain as well. Additionally, the root detector 1004 can include a domain-converter multiplication block 1346, configured to multiply each $T_n$ generated in the N domain by the length of the preamble (in the example, 1536) and divide by N to convert the $T_n$ to a sample location within the preamble, to enable a direct comparison of each $T_n$ to the coarse time offset T. Other implementations for generating the possible (f, T) pairs from the reference time offset $T_0$ are also contemplated.

In some embodiments, as noted above, the input signal from the phased array antenna 105 includes separate signals for Vertical and Horizontal Polarization, again denoted Vpol and Hpol in FIG. 13. The root detector 1004 can be configured to process the Vpol and Hpol signals separately, and then combine the results for improved detection of the reference time offset $T_0$, and the resulting set of $\{L_n, T_n\}$. More specifically, similar to the coarse detector 1002 as described above, the root detector 1004 includes a first block 1382 that receives the Hpol input and implements a first instance of one or more the components described above, a second block 1384 that receives the Vpol input and implements a second instance of the one or more of the components described above, and magnitude combination blocks 1386 and 1388 configured to combine the Hpol and Vpol results. In other words, the Nzc-point FFT 1314 and the correlation by the correlator IFFT 1332 can be performed independently on the H-pol and V-pol signal branches, and combined in a magnitude (or magnitude squared) sense. Other implementations for combining the Hpol and Vpol inputs, as well as implementations that operate on an input other than horizontally and vertically polarized, are also contemplated.

Returning to FIG. 10, the pair selector 1006 can be programmed to apply the output of the coarse detector 1002 to the output of the root detector 1004 to select the true values of frequency offset f and time offset T. More specifically, the pair selector 1006 can compare the coarse time offset T output by the coarse detector 1002 against the $T_n$ in each pair $(L_n, T_n)$ output by the root detector 1004, and can select the pair with the $T_n$ that most closely matches the coarse time offset T as corresponding to the true frequency and time offset in the PRACH signal. In some embodiments, the previously detected fractional frequency offset F can be combined with the frequency offset L of the selected pair to arrive at a more precise value for the residual frequency offset f.

Advantageously, the PRACH detector of the present disclosure is able to reliably detect frequency offset and time offset in the PRACH signal with sufficient accuracy to enable reliable operation of the satellite telecommunications system 100 even in very noisy environments. Moreover, the nature of the ZC sequences used to generate the PRACH waveforms guarantees that the time values in the pairs $(L_n, T_n)$ produced by the root detector 1004 will be "far enough from each other" (i.e., will have sufficiently large numerical differences) to ensure that the time offset of true pair will be significantly closer to the coarse time offset than the time offset of any other pair.

After the correct pair for the residual frequency and time offset is determined for the received PRACH signal, the satellite computer system 103 can send, to the corresponding UE 110, an access response formatted according to the RAN to enable the UE 110 to join the network and communicate in standard fashion. For example, in 4G LTE and 5G NR implementations, the access response can be a Random Access Response (RAR) message that provides the UE 110 with an initial, absolute Timing Advance value based on the cell reference location timing offset and the residual timing offset. The RAR can also identify the uplink resources allocated by the satellite computer system 103 to the UE 110, including the resource blocks to be used by the UE 110 for communication with the satellite telecommunications system 100. Other types of access responses are also contemplated.

FIG. 14 illustrates an example method 1400 implemented by a satellite computer system on a satellite. The satellite includes at least one antenna configured to send and receive signals to terrestrial user equipment (UE) on a radio access network (RAN) via a plurality of beams, with each of the beams having a beam footprint that defines a cell of the RAN. The RAN defines a physical random access channel (PRACH) slot and an access signal format used by the UE to request an uplink allocation from a base station platform implemented on the satellite during the PRACH slot. The access signal format (1) is based on a Zadoff-Chu (ZC) sequence having a uth root, and (2) has at least one copy of a preamble having a preamble length. The method 1400 can include steps including one or more of: receiving, via the at least one antenna, a signal in the PRACH slot, wherein an orbital motion of the satellite causes one or more access signals, transmitted in the access signal format by the one or more UE and embedded in the received signal, to include a timing offset variation and a frequency offset variation across one or more locations of the one or more UE (1402); sampling the received signal to obtain sample values, wherein the sample values represent complex values (1404); detecting, based on the sample values, a coarse time offset of the one or more access signals within the PRACH slot (1406); detecting, based on the sample values, information identifying the uth root of each of the one or more access signals (1408); generating, for each of the one or more access signals based on the identified uth root, potential pairs of a number of periods frequency offset $L_n$ and a time offset $T_n$ (1410); selecting, for each of the one or more access signals based on the detected coarse time offset, one of the potential pairs $(L_n, T_n)$ as corresponding to an actual frequency offset and an actual time offset (1412); and sending, to the one or more UE based on the selected pair for the corresponding access signal, an access response formatted according to the RAN (1414).

A system embodiment can include a satellite computer system for a satellite, the satellite including at least one antenna configured to send and receive signals to terrestrial user equipment (UE) on a radio access network (RAN) via a plurality of beams, each of the beams having a beam footprint that defines a cell of the RAN. The RAN defines a physical random access channel (PRACH) slot and an access signal format used by the UE to request an uplink allocation from a base station platform implemented on the satellite during the PRACH slot. The access signal format (1) is based on a Zadoff-Chu (ZC) sequence having a uth root, and (2) has at least one copy of a preamble having a preamble length. The satellite computer system includes at least one processor in communication with a memory, the memory storing computer-readable instructions that are executable to cause the at least one processor to perform steps that can include one or more of: receiving, via the at least one antenna, a signal in the PRACH slot, wherein an orbital motion of the satellite causes one or more access signals, transmitted in the access signal format by the one or more UE and embedded in the received signal, to include a timing offset variation and a frequency offset variation across one or more locations of the one or more UE; sampling the received signal to obtain sample values, wherein the sample values represent complex values; detecting, based on the sample values, a coarse time offset of the one or more access signals within the PRACH slot; detecting, based on the sample values, information identifying the uth root of each of the one or more access signals; generating, for each of the one or more access signals based on the identified uth root, potential pairs of a number of periods frequency offset $L_n$ and a time offset $T_n$; selecting, for each of the one or more access signals based on the detected coarse time offset, one of the potential pairs $(L_n, T_n)$ as corresponding to an actual frequency offset and an actual time offset; and sending, to the one or more UE based on the selected pair for the corresponding access signal, an access response formatted according to the RAN.

In some embodiments, the step of generating the potential pairs $(L_n, T_n)$ includes correlating a package of the sample values with a reference ZC sequence based on the corresponding information identifying the uth root. In some embodiments, the step of correlating includes performing a frequency-domain correlation between the reference ZC sequence and the package of sample values.

In certain embodiments, the step of generating the potential pairs $(L_n, T_n)$ further includes performing an inverse Fourier transform on a result of the frequency-domain correlation to obtain a time-domain result, and identifying a reference time offset $T_0$ of each of the one or more access signals as corresponding a peak value of the time-domain result, wherein the reference time offset $T_0$ is associated with a zero number of periods frequency offset $L_0$.

In some embodiments, the step of generating the potential pairs $(L_n, T_n)$ further includes determining the time offset $T_n$ for each of the potential pairs based on $T_0 - L_n \cdot u^{-1}$, wherein $u^{-1}$ is the modular multiplicative inverse of the identified uth root associated with the corresponding access signal, and wherein each $L_n$ is a preselected potential value for the number of periods frequency offset.

In certain embodiments, the step of detecting the information identifying the uth root includes processing a package of the sample values into root-detection frequency bins, comparing values of the root-detection frequency bins to a root-detection threshold, and determining the information identifying the uth root based on a bin index of a corresponding one of the root-detection frequency bins meeting the root-detection threshold.

In some embodiments, the step of processing the package of the sample values includes generating the package of sample values to include a number of samples greater than the length of the ZC sequence, transforming the package of sample values to a first set of frequency-domain bins corresponding in number to the number of samples, and selecting a subset of the first set of frequency-domain bins, the subset corresponding in number to the length of the ZC sequence.

In certain embodiments, the step of processing the package of the sample values further includes applying adjacent-sample conjugate multiplication to values of the subset of the first set of frequency-domain bins.

In some embodiments, the step of processing the package of the sample values further includes transforming results of the adjacent-sample conjugate multiplication into the values of the root-detection frequency bins.

In certain embodiments, the step of transforming the results of the adjacent-sample conjugate multiplication into the values of the root-detection frequency bins includes applying a Nzc-point Fourier transform to the results of the adjacent-sample conjugate multiplication, wherein Nzc corresponds to the length of the ZC sequence.

In some embodiments, the step of determining the information identifying the uth root based on the bin index of the corresponding one of the root-detection frequency bins meeting the root-detection threshold includes, for each root-detection frequency bin meeting the root-detection threshold, assigning the bin index of the root-detection frequency bin as a modular multiplicative inverse of the uth root, wherein the information identifying the uth root is the assigned modular multiplicative inverse.

In certain embodiments, the at least one antenna includes a horizontally polarized (H-POL) antenna and a vertically polarized (V-POL) antenna, the step of sampling the received signal includes separately sampling the received signals from the H-POL and V-POL antennas such that the sample values include separate sets of H-POL sample values and V-POL sample values, and the step of processing the package of the sample values into the root-detection frequency bins includes processing a package of the H-POL sample values into H-POL root-detection frequency bins, processing a package of the V-POL sample values into V-POL root-detection frequency bins, and combining results of the H-POL root-detection frequency bins and the V-POL root-detection frequency bins.

In some embodiments, the step of detecting the coarse time offset includes performing preamble-length-shifted conjugate multiplication of the sample values against corresponding sample values obtained by delaying the received signal by the preamble length.

In certain embodiments, the access signal format further has a cyclic prefix (CP) attached to the front of the at least one copy of the preamble, the CP has a CP length and is copied from an end of the preamble sequence, and the step of detecting the coarse time offset further includes (1) summing, for each sample window of a plurality of sample windows having the CP length, vector values generated by the preamble-length-shifted conjugate multiplication in the sample window to obtain a plurality of conjugate-multiplication vector sums, wherein a magnitude of one or more vector sums of the plurality of conjugate-multiplication vector sums meets a magnitude threshold, and (2) determining the coarse time offset of the one or more access signals based on an offset of one or more of the sample windows corresponding to the one or more vector sums.

In some embodiments, the actual frequency offset for each of the one or more access signals corresponds to a sum of the selected number of periods frequency offset $L_n$ and a fractional portion F, and the steps further include estimating the fractional portion F based on a phase of an aggregate vector value obtained by summing vector values generated by the preamble-length-shifted conjugate multiplication.

In certain embodiments, the at least one antenna includes a horizontally polarized (H-POL) antenna and a vertically polarized (V-POL) antenna, the step of sampling the received signal includes separately sampling the received signals from the H-POL and V-POL antennas such that the sample values include separate sets of H-POL sample values and V-POL sample values, the step of performing the preamble-length-shifted conjugate multiplication includes performing the preamble-length-shifted conjugate multiplication separately for the H-POL sample values and the V-POL sample values, and the steps further include obtaining the aggregate vector value by combining results of the preamble-length-shifted conjugate multiplication for the H-POL sample values and the preamble-length-shifted conjugate multiplication for the V-POL sample values.

Figure 15:
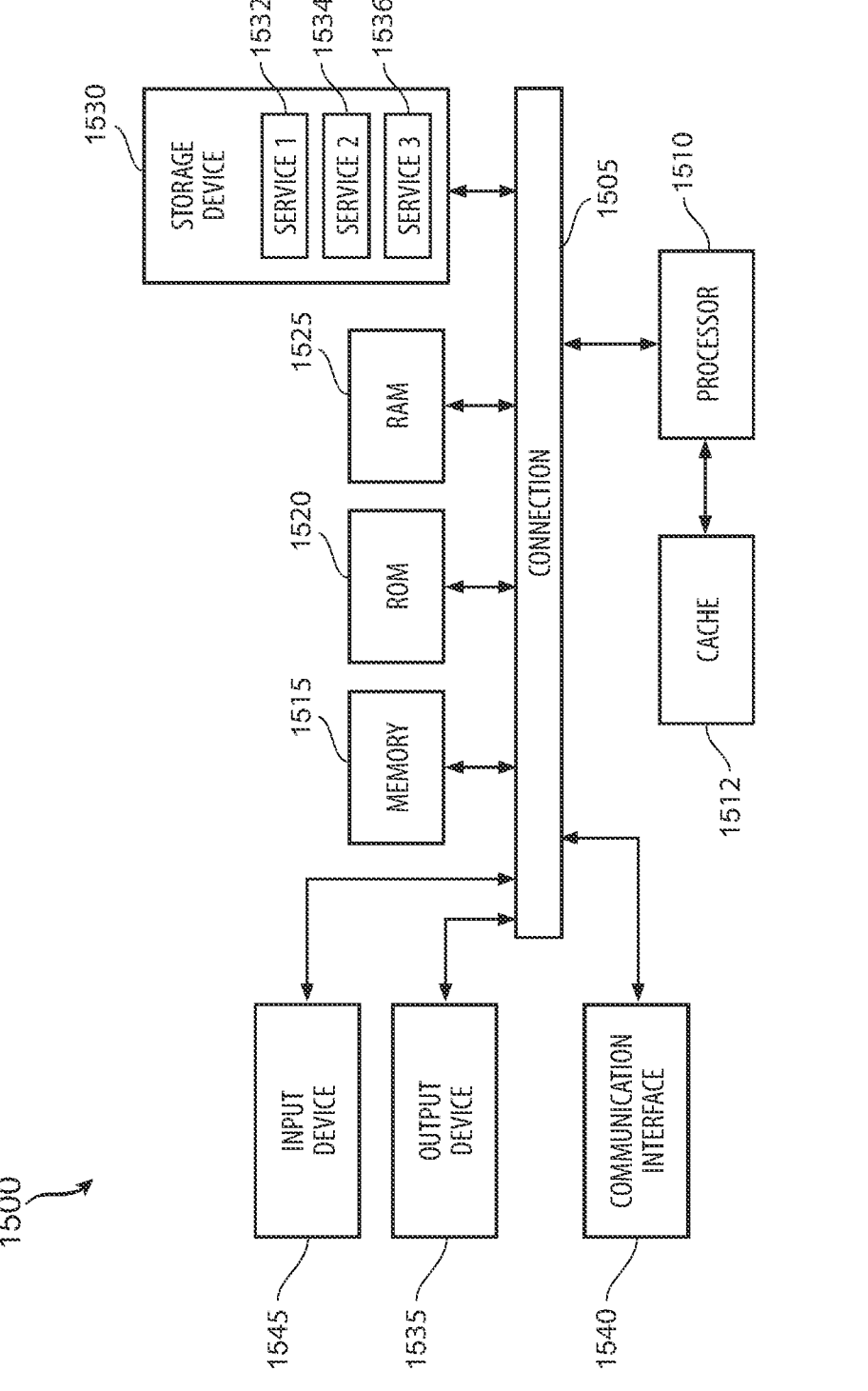
FIG. 15 illustrates a computer system that can be implemented with other aspects of the present disclosure.

FIG. 15 illustrates an example computer device that can be used in connection with any of the systems or components of the satellite computer system 103, the gateway terminal 104, the PoP 140, the cellular core 141, the terrestrial telecommunications provider 200, the UE 110, the user terminal 112, the ground-based server 150, or other components disclosed herein. In this example, FIG. 15 illustrates a computing system 1500 including components in electrical communication with each other using a connection 1505, such as a bus. System 1500 includes a processing unit (CPU or processor) 1510 and a system connection 1505 that couples various system components including the system memory 1515, such as read only memory (ROM) 1520 and random access memory (RAM) 1525, to the processor 1510. The system 1500 can include a cache of high-speed memory connected directly with, in close proximity to, or integrated as part of the processor 1510. The system 1500 can copy data from the memory 1515 and/or the storage device 1530 to the cache 1512 for quick access by the processor 1510. In this way, the cache can provide a performance boost that avoids processor 1510 delays while waiting for data. These and other modules can control or be configured to control the processor 1510 to perform various actions. Other system memory 1515 may be available for use as well. The memory 1515 can include multiple different types of memory with different performance characteristics. The processor 1510 can include any general purpose processor and a hardware or software service, such as service 1-1532, service 2-1534, and service 3-1536 stored in storage device 1530, configured to control the processor 1510 as well as a special-purpose processor where software instructions are incorporated into the actual processor design. The processor 1510 may be a completely self-contained computing system, containing multiple cores or processors, a bus, memory controller, cache, etc. A multi-core processor may be symmetric or asymmetric.

To enable user interaction with the system 1500, an input device 1545 can represent any number of input mechanisms, such as a microphone for speech, a touch-sensitive screen for gesture or graphical input, keyboard, mouse, motion input, speech and so forth. An output device 1535 can also be one or more of a number of output mechanisms known to those of skill in the art. In some instances, multimodal systems can enable a user to provide multiple types of input to communicate with the system 1500. The communications interface 1540 can generally govern and manage the user input and system output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof.

The storage device 1530 can include services 1532, 1534, 1536 for controlling the processor 1510. Other hardware or software modules are contemplated. The storage device 1530 can be connected to the system connection 1505. In one aspect, a hardware module that performs a particular function can include the software component stored in a computer-readable medium in connection with the necessary hardware components, such as the processor 1510, connection 1505, output device 1535, and so forth, to carry out the function.

In some embodiments, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A satellite computer system for a satellite, the satellite including at least one antenna configured to send and receive signals to terrestrial user equipment (UE) on a radio access network (RAN) via a plurality of beams, each of the beams having a beam footprint that defines a cell of the RAN, the RAN defining a physical random access channel (PRACH) slot and an access signal format used by the UE to request an uplink allocation from a base station platform implemented on the satellite during the PRACH slot, the access signal format (1) based on a Zadoff-Chu (ZC) sequence having a uth root, and (2) having at least one copy of a preamble having a preamble length, the satellite computer system comprising at least one processor in communication with a memory, the memory storing computer-readable instructions that are executable to cause the at least one processor to perform steps including:

receiving, via the at least one antenna, a signal in the PRACH slot, wherein an orbital motion of the satellite causes one or more access signals, transmitted in the access signal format by the one or more UE and embedded in the received signal, to include a timing offset variation and a frequency offset variation across one or more locations of the one or more UE;

sampling the received signal to obtain sample values, wherein the sample values represent complex values;

detecting, based on the sample values, a coarse time offset of the one or more access signals within the PRACH slot;

detecting, based on the sample values, information identifying the uth root of each of the one or more access signals;

generating, for each of the one or more access signals based on the identified uth root, potential pairs of a number of periods frequency offset $L_n$ and a time offset $T_n$;

selecting, for each of the one or more access signals based on the detected coarse time offset, one of the potential pairs $(L_n, T_n)$ as corresponding to an actual frequency offset and an actual time offset; and sending, to the one or more UE based on the selected pair for the corresponding access signal, an access response formatted according to the RAN.

2. The satellite computer system according to claim 1, wherein the step of generating the potential pairs $(L_n, T_n)$ includes correlating a package of the sample values with a reference ZC sequence based on the corresponding identified uth root.

3. The satellite computer system according to claim 2, wherein the step of correlating includes performing a frequency-domain correlation between the reference ZC sequence and the package of sample values.

4. The satellite computer system according to claim 3, wherein the step of generating the potential pairs $(L_n, T_n)$ further includes:

performing an inverse Fourier transform on a result of the frequency-domain correlation to obtain a time-domain result; and identifying a reference time offset $T_0$ of each of the one or more access signals as corresponding a peak value of the time-domain result, wherein the reference time offset $T_0$ is associated with a zero number of periods frequency offset $L_0$.

5. The satellite computer system according to claim 4, wherein the step of generating the potential pairs $(L_n, T_n)$ further includes determining the time offset $T_n$ for each of the potential pairs based on $T_0 - L_n \cdot u^{-1}$, wherein $u^{-1}$ is a modular multiplicative inverse of the identified uth root associated with the corresponding access signal, and wherein each $L_n$ is a preselected potential value for the number of periods frequency offset.

6. The satellite computer system according to claim 1, wherein the step of detecting the information identifying the uth root includes:

processing a package of the sample values into root-detection frequency bins;

comparing values of the root-detection frequency bins to a root-detection threshold; and determining the information identifying the uth root based on a bin index of a corresponding one of the root-detection frequency bins meeting the root-detection threshold.

7. The satellite computer system according to claim 6, wherein the step of processing the package of the sample values includes:

generating the package of sample values to include a number of samples greater than the length of the ZC sequence;

transforming the package of sample values to a first set of frequency-domain bins corresponding in number to the number of samples; and selecting a subset of the first set of frequency-domain bins, the subset corresponding in number to the length of the ZC sequence.

8. The satellite computer system according to claim 7, wherein the step of processing the package of the sample values further includes applying adjacent-sample conjugate multiplication to values of the subset of the first set of frequency-domain bins.

9. The satellite computer system according to claim 8, wherein the step of processing the package of the sample values further includes transforming results of the adjacent-sample conjugate multiplication into the values of the root-detection frequency bins.

10. The satellite computer system according to claim 9, wherein the step of transforming the results of the adjacent-sample conjugate multiplication into the values of the root-detection frequency bins includes applying a Nzc-point Fourier transform to the results of the adjacent-sample conjugate multiplication, wherein Nzc corresponds to the length of the ZC sequence.

11. The satellite computer system according to claim 6, wherein the step of determining the information identifying the uth root based on the bin index of the corresponding one of the root-detection frequency bins meeting the root-detection threshold includes, for each root-detection frequency bin meeting the root-detection threshold:

assigning the bin index of the root-detection frequency bin as a modular multiplicative inverse of the uth root, wherein the information identifying the uth root is the assigned modular multiplicative inverse.

12. The satellite computer system according to claim 6, wherein the at least one antenna includes a horizontally polarized (H-POL) antenna and a vertically polarized (V-POL) antenna, wherein the step of sampling the received signal includes separately sampling the received signals from the H-POL and V-POL antennas such that the sample values include separate sets of H-POL sample values and V-POL sample values, wherein the step of processing the package of the sample values into the root-detection frequency bins includes:

processing a package of the H-POL sample values into H-POL root-detection frequency bins;

processing a package of the V-POL sample values into V-POL root-detection frequency bins; and combining results of the H-POL root-detection frequency bins and the V-POL root-detection frequency bins.

13. The satellite computer system according to claim 1, wherein the step of detecting the coarse time offset includes performing preamble-length-shifted conjugate multiplication of the sample values against corresponding sample values obtained by delaying the received signal by the preamble length.

14. The satellite computer system according to claim 13, wherein the access signal format further has a cyclic prefix (CP) attached to a front of the at least one copy of the preamble, wherein the CP has a CP length and is copied from an end of the preamble sequence, and wherein the step of detecting the coarse time offset further includes:

summing, for each sample window of a plurality of sample windows having the CP length, vector values generated by the preamble-length-shifted conjugate multiplication in the sample window to obtain a plurality of conjugate-multiplication vector sums, wherein a magnitude of one or more vector sums of the plurality of conjugate-multiplication vector sums meets a magnitude threshold; and determining the coarse time offset of the one or more access signals based on an offset of one or more of the sample windows corresponding to the one or more vector sums.

15. The satellite computer system according to claim 13, wherein the actual frequency offset for each of the one or more access signals corresponds to a sum of the selected number of periods frequency offset $L_n$ and a fractional portion F, and wherein the steps further include estimating the fractional portion F based on a phase of an aggregate vector value obtained by summing vector values generated by the preamble-length-shifted conjugate multiplication.

16. The satellite computer system according to claim 15, wherein the at least one antenna includes a horizontally polarized (H-POL) antenna and a vertically polarized (V-POL) antenna, wherein the step of sampling the received signal includes separately sampling the received signals from the H-POL and V-POL antennas such that the sample values include separate sets of H-POL sample values and V-POL sample values, wherein the step of performing the preamble-length-shifted conjugate multiplication includes performing the preamble-length-shifted conjugate multiplication separately for the H-POL sample values and the V-POL sample values, and wherein the steps further include obtaining the aggregate vector value by combining results of the preamble-length-shifted conjugate multiplication for the H-POL sample values and the preamble-length-shifted conjugate multiplication for the V-POL sample values.

17. A method implemented by a satellite computer system on a satellite, the satellite including at least one antenna configured to send and receive signals to terrestrial user equipment (UE) on a radio access network (RAN) via a plurality of beams, each of the beams having a beam footprint that defines a cell of the RAN, the RAN defining a physical random access channel (PRACH) slot and an access signal format used by the UE to request an uplink allocation from a base station platform implemented on the satellite during the PRACH slot, the access signal format (1) based on a Zadoff-Chu (ZC) sequence having a uth root, and (2) having at least one copy of a preamble having a preamble length, the method comprising steps performed by the satellite computer system including:

receiving, via the at least one antenna, a signal in the PRACH slot, wherein an orbital motion of the satellite causes one or more access signals, transmitted in the access signal format by the one or more UE and embedded in the received signal, to include a timing offset variation and a frequency offset variation across one or more locations of the one or more UE;

sampling the received signal to obtain sample values, wherein the sample values represent complex values;

detecting, based on the sample values, a coarse time offset of the one or more access signals within the PRACH slot;

detecting, based on the sample values, information identifying the the uth root of each of the one or more access signals;

generating, for each of the one or more access signals based on the identified uth root, potential pairs of a number of periods frequency offset $L_n$ and a time offset $T_n$;

selecting, for each of the one or more access signals based on the detected coarse time offset, one of the potential pairs $(L_n, T_n)$ as corresponding to an actual frequency offset and an actual time offset; and sending, to the one or more UE based on the selected pair for the corresponding access signal, an access response formatted according to the RAN.

18. The method according to claim 17, wherein the step of detecting the coarse time offset includes performing preamble-length-shifted conjugate multiplication of the sample values against corresponding sample values obtained by delaying the received signal by the preamble length.

19. The method according to claim 18, wherein the access signal format further has a cyclic prefix (CP) attached to a front of the at least one copy of the preamble, wherein the CP has a CP length and is copied from an end of the preamble sequence, and wherein the step of detecting the coarse time offset further includes:

summing, for each sample window of a plurality of sample windows having the CP length, vector values generated by the preamble-length-shifted conjugate multiplication in the sample window to obtain a plurality of conjugate-multiplication vector sums, wherein a magnitude of one or more vector sums of the plurality of conjugate-multiplication vector sums meets a magnitude threshold; and determining the coarse time offset of the one or more access signals based on an offset of one or more of the sample windows corresponding to the one or more vector sums.

20. The method according to claim 18, wherein the actual frequency offset for each of the one or more access signals corresponds to a sum of the selected number of periods frequency offset $L_n$ and a fractional portion F, and wherein the steps further include estimating the fractional portion F based on a phase of an aggregate vector value obtained by summing vector values generated by the preamble-length-shifted conjugate multiplication.

* * * * *